(12) United States Patent
Kim et al.

(10) Patent No.: US 11,012,767 B2
(45) Date of Patent: May 18, 2021

(54) HUB FOR COMMUNICATION NETWORK, AND MANUFACTURING METHOD THEREFOR

(71) Applicant: LG ELECTRONICS INC., Seoul (KR)

(72) Inventors: Dooyul Kim, Seoul (KR); Kyoungtae Kim, Seoul (KR); Sanghoon Chi, Seoul (KR); Jisung Ryu, Seoul (KR); Kyeonggyu Goo, Seoul (KR); Dajeong Eom, Seoul (KR); Sangin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 383 days.

(21) Appl. No.: 16/068,085

(22) PCT Filed: Jul. 6, 2016

(86) PCT No.: PCT/KR2016/007335
§ 371 (c)(1),
(2) Date: Jul. 3, 2018

(87) PCT Pub. No.: WO2017/119563
PCT Pub. Date: Jul. 13, 2017

(65) Prior Publication Data
US 2020/0374611 A1      Nov. 26, 2020

Related U.S. Application Data

(60) Provisional application No. 62/341,566, filed on May 25, 2016.

(30) Foreign Application Priority Data

Jan. 4, 2016   (KR) ........................ 10-2016-0000329

(51) Int. Cl.
*H04R 1/02* (2006.01)
*H04W 88/06* (2009.01)
(Continued)

(52) U.S. Cl.
CPC ............... *H04R 1/028* (2013.01); *H01Q 1/42* (2013.01); *H04L 67/125* (2013.01); *H04L 67/16* (2013.01); *H04L 67/36* (2013.01); *H04W 88/06* (2013.01)

(58) Field of Classification Search
CPC .......... H04R 1/028; H04R 1/02; H04R 1/023; H04R 1/025; H01Q 1/42; H04L 67/125; H04L 67/16; H04L 67/36
See application file for complete search history.

(56) References Cited

U.S. PATENT DOCUMENTS 4,916,439 A    4/1990  Estes et al.
9,036,858 B1   5/2015  Reeves et al.
(Continued)

FOREIGN PATENT DOCUMENTS

KR     10-2012-0050040 A     5/2012

OTHER PUBLICATIONS

Veho, "Veho 360 M4 Bluetooth Wireless Speaker," Dec. 24, 2012, URL:https://www.mobilefun.co.uk/veho-360-m4-bluetooth-wireless-speaker-black-37364#p1, 4 pages.

*Primary Examiner* — Jason R Kurr
(74) *Attorney, Agent, or Firm* — Birch, Stewart, Kolasch & Birch, LLP

(57) ABSTRACT

A hub includes a hub body having a speaker for outputting sound; a communication module disposed in the hub body and wirelessly communicating with peripheral devices; a hub base for supporting the hub body at a lower side thereof; a cover coupled to an upper part of the hub body and displaying, on an upper surface thereof, an interface screen (Continued)

formed on the basis of the information transmitted and received through the communication module; and a grille formed in the shape of a vertically long cylinder, which has a plurality of through-holes, such that the hub body is disposed therein, the upper end is coupled to the cover, and the lower end is coupled to the hub base.

21 Claims, 47 Drawing Sheets

(51) Int. Cl.
*H04L 29/08* (2006.01)
*H01Q 1/42* (2006.01)

(56) References Cited

U.S. PATENT DOCUMENTS

| | | |
|---|---|---|
| 9,304,736 B1 * | 4/2016 | Whiteley ......... G06Q 20/40145 |
| 9,641,919 B1 * | 5/2017 | Poole ..................... H04R 1/025 |
| 2006/0003709 A1 | 1/2006 | Wood |
| 2012/0118451 A1 | 5/2012 | Berning et al. |
| 2014/0086431 A1 | 3/2014 | Martin et al. |
| 2014/0315620 A1 | 10/2014 | Wells |
| 2015/0104042 A1 | 4/2015 | Ito |
| 2016/0345086 A1 * | 11/2016 | Chamberlin ........... H04R 1/025 |
| 2017/0006374 A1 * | 1/2017 | Song ...................... F16H 35/18 |

* cited by examiner

A3

A3

(a)

(b)

HUB FOR COMMUNICATION NETWORK, AND MANUFACTURING METHOD THEREFOR

CROSS REFERENCE TO RELATED APPLICATIONS

This application is the National Phase of PCT International Application No. PCT/KR2016/007335, filed on Jul. 6, 2016, which claims priority under 35 U.S.C. 119(e) to U.S. Provisional Application No. 62/341,566, filed on May 25, 2016 and under 35 U.S.C. 119(a) to Patent Application No. 10-2016-0000329, filed in the Republic of Korea on Jan. 4, 2016, all of which are hereby expressly incorporated by reference into the present application.

TECHNICAL FIELD

The present invention relates to a hub that constitutes a network via communication with peripheral devices.

BACKGROUND ART

Techniques that construct a network in a certain space, such as a home or an office, using devices that communicate with each other in a wired or wireless manner are known. Various devices having a communication function are connected to the network.

Conventionally, a home appliance, such as a washing machine, a refrigerator, or an air conditioner, is connected to an access point (AP), which is connected to the Internet, in a wired or wireless manner, thereby establishing a network. Such a home appliance shares information with a terminal (e.g., a smart phone) connected to the Internet. This method is limited with respect to the functions that may be implemented via the terminal since the information obtained from the home appliance is limited. For example, when attempting to control a refrigerator using the terminal, since sensors provided in the refrigerator are unchangeable, the information that the terminal may share with the refrigerator is also limited.

Recently, Internet-of-Things (IoT) technology has been attracting attention as a technology that may overcome the problems described above. This is a technology that allows things to share information therebetween by connecting the things over a wired or wireless network. IoT technology adds communication, sensor functions, etc. to various devices to enable the device itself to receive or transmit information and process the information so as to be automatically driven.

In response to this diversified network environment, it is necessary to develop a hub that is capable of synthetically managing devices and of more actively communicating with a user based on information that is shared with the devices.

Meanwhile, there is a need for an appropriate interface and an operation device for operating the interface, in order to allow the user to easily grasp the information exchanged with IoT devices via mutual communication and to control the devices.

In addition, because it is necessary for the operation device to operate correctly, and moreover, because the operation sensation of the operation device has a very important influence on the feeling of quality experienced by the user, a method for improving the feeling of quality obtained from the operation device is needed.

In this respect, it is conceivable to provide a hub including a display that outputs an interface screen and a window provided above the display so that the interface screen is visible from the outside. Particularly, since the window is a part that constitutes the external appearance of the hub, it is necessary to consider factors that affect the external appearance of the hub by adding the window.

In general, in the case of a small home appliance having a display panel, such as an LCD or an LED, the display panel is fixed on a PCB by a piece of double-sided tape. However, in this case, it is not easy to correctly attach the display panel at a predetermined position. In addition, since a normal PCB is obtained by processing a flat plate having a predetermined standard, it is difficult to form a device, such as a rib, that guides the correct position of the display panel over the PCB or that prevents movement of the display and the PCB to maintain them at the correct position once the display has been provided on the PCB, even if external shocks or shaking occurs.

Meanwhile, a hub body including a speaker is disposed in a cylindrical metal grille having multiple through-holes therein. Thus, when a communication module is disposed in the hub body to wirelessly communicate with peripheral devices, communication may not be smoothly performed due to signal interference (or radio wave cutoff) due to the grille.

Considering various factors, such as the design aspect of products, harmony with the surrounding environment, and the aesthetic appearance apparent to the user, the upper surface of the hub may be formed in a circular shape. In this case, it is necessary to form the upper surface of the hub so as to configure an external appearance having a sense of unity in cooperation with the side surface that extends downwards from the outer periphery of the upper surface when the user views the hub from above.

Meanwhile, since the hub body including the speaker is disposed in the cylindrical grille having the through-holes, in the case in which the grille is configured to have an elliptical cross-section, the metal grille itself has elasticity and restoring force, and therefore, is not easy to maintain in an elliptical shape.

In addition, there are many points to consider in order to form the grille that has not only an elliptical cross-sectional shape but also a cylindrical shape, in which an opening in the upper end thereof is within a plane inclined at a predetermined angle relative to the horizontal plane.

In addition, the hub may include a speaker to function as an audio system that reproduces music. In this case, the grille surrounding the speaker is formed with the through-holes, through which sound may be emitted. Since the through-holes determine the quality of sound and are closely related to the rigidity of the grille itself, it is necessary to consider how the through-holes are formed.

In addition, it is necessary to provide a method for effectively dissipating heat generated from various electrical components, such as a control unit (or a controller). Moreover, when a radiation plate formed of a metal material is applied, it is necessary to take measures to prevent the radiation plate from vibrating due to the output of the speaker provided in the hub body.

Meanwhile, in the development of such a hub, there is a need to provide measures to firmly support the hub on the floor, thereby preventing breakage due to overturning, and to prevent electrical components provided in the hub from being flooded even if the hub is mounted on floor having water thereon, such as a kitchen countertop, a bathroom, or a sink.

In addition, although the hub becomes smaller and lighter and the mobility thereof becomes better, in this case, there is a problem in that a cord that supplies a voltage to the hub is separated during the movement of the hub.

DISCLOSURE

Technical Problem

It is an object of the present invention to provide a hub that displays an interface screen that displays information exchanged through a communication module, which performs wireless communication with a peripheral device. In particular, it is an object of the present invention to provide an interface that enables a user to easily grasp information exchanged with Internet-of-Thing devices, which have recently been attracting attention, by mutual communication therebetween, and that is capable of controlling these devices.

It is another object of the present invention to provide a hub in which an interface is displayed at an optimal position in consideration of visibility.

It is another object of the present invention to provide a hub in which external visibility of a coupling region between components is minimized. In particular, it is another object of the present invention to provide a hub in which a coupling region between components is concealed by a cylindrical grille.

It is another object of the present invention to provide a structure in which a hub body including a speaker is disposed in a cylindrical grille, a cover is coupled to the upper side of the grille, and a hub base is coupled to the lower side of the grille, these components providing a hub with an external appearance having a sense of unity.

It is another object of the present invention to provide a hub in which a grille is fixed without a separate fastening member, such as a bolt, when the grille is formed of a metal material.

It is another object of the present invention to provide a hub in which a cylindrical metal grille obtains a regular shape due to the plasticity of a metal material thereof in the process of coupling the grille to a cover and a hub base.

It is another object of the present invention to provide a hub in which a main PCB is disposed between a hub base and a hub body.

It is another object of the present invention to provide a hub that is capable of communicating with an accessory through a communication module, setting a function of the accessory, and managing a home network based on information received from the accessory.

It is another object of the present invention to provide a hub that is capable of managing a home appliance, such as sensing the state thereof or controlling the operation thereof, using a function provided from an accessory, which is provided separately from the home appliance, via communication with the accessory.

It is another object of the present invention to provide a hub in which the upper surface of a display, on which information is displayed, has a circular shape and is tilted at a predetermined angle relative to the horizontal plane, and in which the upper end of a grille is coupled to a cover, on which the display is provided, so that the upper end of the grille and the cover are formed on a continuous curved contour.

It is another object of the present invention to provide a hub in which a display that outputs an interface screen and a window through which the screen of the display is visible are provided on a cover coupled to the upper portion of a hub body, and a in which user can operate the interface by pressing the window. The hub body is provided with a communication module, which performs wireless communication with a peripheral device, and information exchanged through the communication module is displayed on the interface screen. Thereby, it is another object of the present invention to provide a hub that allows a user to easily grasp information exchanged through various devices, such as Internet-of-Things devices, which have recently been attracting attention, via mutual communication, and to operate the interface so as to control the devices via a simple operation of pressing predetermined portions of the window.

The cover includes a display PCB, on which the display is mounted, and a tact switch is disposed on each of the front, rear, left, and right sides of the display PCB on the basis of the display. In addition, the cover further includes a support plate disposed above the display to support the window, and the window support plate is supported by multiple support bosses and is provided on the lower surface thereof with operation protrusions at positions corresponding to the respective tact switches. When a certain portion of the window is pressed, the window support plate is bent around a portion thereof that is supported by the support bosses, so that the operation protrusions press the tact switches. In this structure, the user operates the tact switches by selectively pressing four areas on the window corresponding to the respective tact switches. That is, the window functions as a button for operating the tact switches. It is another object of the present invention to ensure that this function is correctly performed by all of the four areas.

It is another object of the present invention to provide a hub in which support bosses are disposed at an appropriate position to allow four areas on a window support plate (each area being provided with operation protrusions), which correspond respectively to four tact switches, to be smoothly bent about the support bosses.

The window support plate is formed in a central portion thereof with an opening so that the screen of the display is visible from above through the opening. Typically, a panel constituting the display has a rectangular shape having a horizontal length longer than a vertical length, and is horizontally disposed in the transverse direction of the hub. The opening in the window support plate is also formed to have a longer length in the transverse direction (or in the horizontal direction) than in the longitudinal direction (or the vertical direction) so as to correspond to the shape of the panel. In this case, the window support plate is formed with the operation protrusions on the front, rear, left, and right areas about the opening. However, since the opening is shaped so as to be longer in the transverse direction than in the longitudinal direction, among the four areas of the window support plate, the front and rear areas and the left and right area have different widths, so that the distance between the support bosses and the operation protrusions varies depending on the area in which the support bosses are formed. Therefore, it is another object of the present invention to eliminate this difference.

It is another object of the present invention to provide a hub that includes a display, which displays an interface screen, which displays information exchanged through a communication module, which performs wireless communication with a peripheral device, and a window, through which the interface screen is visible from the outside, the window constituting the upper portion of the hub. Here, the window is located in an open area of the upper surface of a cover housing constituting the upper portion of the hub. It is another object of the present invention to provide a consistent distance between the side surface of the window and the inner surface of the cover housing, which defines the open area, in any region when the window is tilted relative to the horizontal plane in consideration of the line of sight of a user who views the window.

It is another object of the present invention to design the shape of a cover housing such that a mold, used to form the external appearance of the cover housing, and a mold, used to form a portion of the inner surface of the cover housing, which defines the area in which the window is disposed, may be taken out in different directions.

It is another object of the present invention to provide a hub that displays an interface screen, which displays information exchanged through a communication module, which performs wireless communication with a peripheral device. In particular, it is another object of the present invention to allow a display panel, which outputs the interface screen, to remain at a predetermined position even if external shocks are applied to the hub or even when the hub is moved.

It is another object of the present invention to provide a hub that is capable of holding a display disposed above a display PCB without a risk of shaking using a structure (partition plate) that supports the display PCB.

It is another object of the present invention to provide a hub that is capable of correctly indicating the installation position of a display panel. In particular, it is another object of the present invention to provide a hub in which, in the case in which a window base or a window is positioned above the display panel, the display panel is positioned at a position corresponding to an opening formed in the window or the window base or an observation window (transparent portion), and the hub reliably holds the display panel at the position.

The window, through which the screen of the display panel is visible, may be transparent in a certain portion (observation window) in which the interface screen is visible, and the remaining portion may be provided with a film attached thereto, or may be colored. In this case, it is another object of the present invention to provide a hub in which a display panel is provided at a correct position so that a screen may be correctly positioned at a predetermined position within the window.

It is another object of the present invention to provide a hub that prevents signal interference or blocking due to a grille in a configuration in which a hub body including a speaker is disposed in a cylindrical metal grille having multiple through-holes therein and in which a communication module, which performs wireless communication with peripheral devices, is disposed in the hub body.

It is another object of the present invention to find an appropriate position for mounting an antenna, which is connected to a communication module, to the exterior of a grille.

It is another object of the present invention to provide a hub that prevents the transmission and reception performance of a signal through an antenna from being hindered by a display PCB.

It is another object of the present invention to provide a hub that minimizes distortion of an interface screen by realizing a nearly right angle between the upper surface of the hub on which the interface screen is displayed and the line of sight of a user who is located in front of the screen.

It is another object of the present invention to give a sense of unity to the overall external appearance of a hub when a circular window constituting the upper surface of the hub is tilted relative to the horizontal plane.

It is another object of the present invention to configure a grille in an appropriate form so as to give a sense of unity to the overall external appearance of a hub.

It is another object of the present invention to increase the area of a front surface of a grille (i.e. the area of the grille viewed from the front) so as to increase the amount of sound to be discharged to the front of the hub, among the sound output from a speaker, in a configuration in which the grille is formed with multiple through-holes for discharging sound and the speaker is located inside the grille.

Considering the case in which the hub is placed on a shelf, since a wall surface provided with the shelf is located at the rear of the hub, even if the hub is pushed rearwards, the wall surface may prevent the hub from completely overturning or from falling down from the shelf. However, the hub is vulnerable to being overturned when external force is applied to the left or right side thereof. Therefore, it is another object of the present invention to solve this problem.

It is another object of the present invention to form a greater number of through-holes in a grille in a structure in which a speaker is provided in a hub body and in which the hub body is disposed inside the cylindrical grille.

It is another object of the present invention to devise an arrangement pattern of through-holes so as to secure the rigidity of a grille even if a large number of through-holes is formed in the grille.

It is another object of the present invention to provide a hub in which the area in which through-holes are formed is specified so as to give sufficient rigidity to the upper end and the lower end of a grille, which are respectively coupled to a cover and a hub base.

It is another object of the present invention to provide a hub that includes a radiation plate, which dissipates heat generated from various electrical components, such as a control unit (or a controller).

It is another object of the present invention to provide a hub in which a main PCB and a radiation plate, which dissipates heat from the main PCB, are disposed in a space provided between a hub body and a hub base.

It is another object of the present invention to provide a hub that prevents vibration output from a speaker, provided in a hub body, from being transmitted to a radiation plate.

It is another object of the present invention to prevent a hub from overturning by increasing the frictional force between the floor on which the hub is placed and the hub.

It is another object of the present invention to provide a hub in which a base body, which constitutes a hub base for supporting a hub body, is not wetted even if the base body is mounted on a floor having water thereon.

It is another object of the present invention to provide a space in which an adapter provided in a power cord in the bottom of a hub is accommodated.

It is another object of the present invention to provide a hub from which a power cord is not easily separated.

It is another object of the present invention to provide a method of manufacturing a hub including a cylindrical metal grille having multiple through-holes formed therein, a hub body disposed inside the grille and including a speaker, a cover coupled to the upper portion of the hub body for displaying an interface screen through an upper surface thereof, and a hub base for supporting the hub body from below. In particular, it is a further object of the present invention to provide a manufacturing method by which the cylindrical grille, the circular upper end of which is within a plane that is tilted relative to the horizontal plane at a predetermined angle, is deformed naturally in a manufacturing process due to the characteristics of a metal material thereof, thereby obtaining a predetermined elliptical cross-sectional shape.

Technical Solution

In accordance with one aspect of the present invention, a hub includes a communication module disposed in a hub body including a speaker, and performs wireless communication with a peripheral device (e.g., an Internet-of-Thing device having a sensor) through the communication module, and an interface screen is displayed on the upper surface of the hub based on information exchanged through the communication module.

In the hub, the hub body is disposed inside a cylindrical grille formed with a plurality of through-holes therein so that sound output from the speaker may be emitted. The upper end of the grille is coupled to a cover, which displays the interface screen, and the lower end of the grille is coupled to a hub base.

The coupling between the grille and the cover is not realized using a separate fastening member, such as a bolt, but an upper end holding portion, which takes the form of a rib and is formed on the cover, is inserted into an opening defined by the upper end of the grille. The coupling between the grille and the hub base is also realized such that a lower end holding portion, which takes the form of a rib and is formed on the hub base, is inserted into an opening defined by the lower end of the grille.

The grille may be formed by processing a metal plate. The upper end holding portion and the lower end holding portion are in close contact with the inner surface of the grille, respectively. Thus, the upper end of the grille formed of a metal material is deformed so as to correspond to the shape of the upper end holding portion, and the lower end of the grille is deformed so as to correspond to the shape of the lower end holding portion. That is, by forming the upper end holding portion and the lower end holding portion in appropriate shapes, the grille may be shaped into a desired shape, and by this method, the grille may maintain an elliptical cross-sectional shape.

The cover may include a cover housing coupled to the hub body and having an opening formed in the upper surface thereof, and a display may be disposed in the cover housing to output the interface screen. In addition, a window formed of a transparent material is disposed in the opening, so that the interface screen is visible through the window.

The window is formed by processing a transparent plate material into a circular shape, and is disposed so as to tilt upwards from the front to the rear. A vector obtained by orthogonally projecting the normal vector to the upper surface of the window onto a predetermined horizontal plane faces forwards. That is, when viewed from the lateral side in the state in which the window is installed, only the side surface of the window, which forms a thickness, is visible, the front end of the side surface becomes the lowest portion, the rear end of the side surface becomes the highest portion, the front end of the side surface is located in front of the hub, and the rear end of the side surface is located behind the hub.

The upper surface of the window may be within the same plane as the upper end of the cover housing. Thus, the upper surface of the hub has an external appearance that provides a sense of unity.

The window may have a circular shape (more particularly, a completely circular shape). In this case, a shape of the window orthogonally projected onto the horizontal plane is a shape in which a length in the longitudinal direction is shorter than a length in the transverse direction. In particular, when the window has a circular shape, a shape of the window orthogonally projected onto the horizontal plane is an elliptical shape in which a length in the longitudinal direction is shorter than a length in the transverse direction. Thus, in order for the hub to have an external appearance that provides a sense of unity, the cross section of the grille may have an elliptical shape. The shaping of the grille may be achieved by forming the upper end holding portion and the lower end holding portion into an elliptical shape.

A display PCB may be disposed in the cover housing to support the display from below. On the upper surface of the display PCB, tact switches are disposed to operate the interface. The tact switches may be disposed symmetrically in front, rear, left, and right directions.

A window base may further be disposed in the cover housing to support the window from below. The window base functions to support the window and also functions as a button for selectively operating the tact switches. Specifically, the window base may include a window support plate, which is disposed above the display to support the window and is formed with an opening, through which the screen of the display is exposed, and a support boss protruding downwards from the window support plate and coupled to the cover housing.

When a user presses the area corresponding to the tact switch on the window, which is in close contact with the window support plate, the window support plate is slightly bent around the support boss, so that a press protrusion protruding from the lower surface of the window support plate operates the tact switch at a position corresponding thereto.

The cover housing may be configured to include a cylindrical sidewall, and the inside of the sidewall may be divided into upper and lower regions by a partition plate. Then, the partition plate may be formed with an insertion boss into which a support boss protruding from the window support plate is inserted.

The window support plate may be formed with an opening through which the screen of the display provided thereunder is exposed. The opening in the window support plate may have a shape corresponding to the shape of a general display panel, and may be formed such that a length in the longitudinal direction is shorter than a length in the transverse direction. In this case, the support boss may include an area of the window support plate located in front of the opening and an area of the window support plate behind the opening.

The hub body may include a speaker case in which the speaker is accommodated, and the speaker case may be coupled to the cover inside the grille. The cover may be formed with a plurality of fastening bosses, which extends horizontally, and the speaker case may be formed with a boss insertion groove recessed from a front surface or a rear surface thereof, and an opening is formed in the upper surface of the speaker case so that the fastening boss may be inserted into the boss insertion groove from above.

The speaker case may be coupled to the hub base. The coupling between the speaker case and the hub base may be implemented inside the grille. The fastening boss protrudes from the lower surface of the speaker case so as to be coupled to the hub base. The hub base may be formed with an insertion boss into which the fastening boss is inserted.

A fastening hole, which communicates with the insertion boss, may be formed in the lower surface of the hub base, and the bolt may be fastened to the fastening boss by passing through the fastening hole from below the hub base.

A main PCB may be disposed between the lower surface of the speaker case and the base body. A controller may be disposed on the main PCB to control various electrical devices, such as the speaker, the communication module, and the display, and may have a circuit connection with the display PCB.

A volume switch may be disposed on the display PCB to increase or decrease the volume of the speaker, and a volume button may be provided on the cover housing to operate the volume switch. An opening may be formed in the sidewall of the cover housing, and the volume button may be fixed in the opening in the sidewall.

The hub base may include a base body coupled to the fastening boss of the speaker case, and a support rubber fixed to the lower surface of the base body.

The communication module may include, for example, a Wi-Fi module, a Bluetooth module, a ZigBee module, a Z-wave module. The Wi-Fi module and the Bluetooth module may be disposed on the rear surface of the speaker case. In particular, the Wi-Fi module and the Bluetooth module may be integrally configure an assembly that is detachably attached to the speaker. The ZigBee communication module and/or the Z-wave communication module may be disposed on the side surface of the speaker.

According to another aspect of the present invention, a hub includes a communication module disposed in a hub body including a speaker, and performs wireless communication with a peripheral device (e.g., an Internet-of-Thing device having a sensor) through the communication module, and an interface screen is displayed on the upper surface of the hub based on information exchanged through the communication module.

A cover housing may be coupled to the upper portion of the hub body, and a display, which displays the interface screen, may be disposed in the cover housing. The cover housing may include a tubular sidewall extending vertically and a partition plate extending from the inner surface of the sidewall to divide an inside of the sidewall into upper and lower regions.

A display PCB may be disposed on the partition plate, and the display and four tact switches may be disposed on the upper surface of the display PCB. Here, the four tact switches may be arranged in the front, rear, left, and right areas about the display, and the tact switches may perform various functions, and for example, may be used to operate the interface screen.

A window base having an opening, which exposes the interface screen, may be disposed in the cover housing, and the opening may be formed such that a length in the transverse direction is longer than a length in the longitudinal direction. Specifically, the window base may include operation protrusions, which protrude downwards from the window support plate at positions corresponding to the four tact switches, respectively, and which operate the tact switches by a pressure applied to the support plate, and a plurality of support bosses, which protrudes downwards from the window support plate and is coupled to the partition plate so as to separate the window support plate from the display PCB.

Since a length of the opening in the transverse direction is longer than a length of the opening in the longitudinal direction, the area of the window support plate at the left or right side of the opening is smaller than the area of the window at the front or rear side of the opening, and there is a specific difference between the sizes of the areas when the window support plate has a substantially circular shape. Therefore, when the support bosses are formed in a relatively narrow area, the distance between the operation protrusions and the support bosses, which are within the area, is reduced. This means that a force applied to the window support plate in the relatively narrow area and the distance to the support bosses, i.e. the moment arm are reduced, and therefore, a larger force is required to operate the tact switches in the relatively narrow area. Therefore, the support bosses may be formed on the window support plate in the area at the front or rear side of the opening.

However, in this case, the operation protrusions on the left or right side of the opening are sufficiently separated from the support bosses on the window support plate, so as to smoothly operate the tact switches. On the other hand, the operation protrusions in the area at the front or rear side of the opening are relatively close to the support bosses, so that a larger force needs to be applied to the front or rear area. Therefore, in order to eliminate an operation difference between these areas, the window support plate may be formed with a slit, which extends in the transverse direction between the support bosses and the opening in the respective front and rear areas about the opening.

According to another aspect of the present invention, a hub includes a hub body including a speaker that outputs sound, a communication module disposed in the hub body to perform wireless communication with a peripheral device, a hub base configured to support the hub body from below, a disk-shaped window formed of a transparent material, a display that outputs an interface screen configured based on information exchanged through the communication module, and a cover housing coupled to the upper portion of the hub body, the display being disposed inside the cover housing, the window being disposed above the display, the cover housing having an opening formed in an upper surface thereof so that the window is disposed in the opening.

The opening in the cover housing is located in a plane that forms an acute angle with a horizontal plane. That is, a normal vector to the plane forms an acute angle with the horizontal plane. Furthermore, the normal vector to the plane, in which the opening is formed, forms an acute angle with the horizontal plane, and a vector obtained by orthogonally projecting the normal vector onto the horizontal plane faces forwards. In this structure, the opening has a lowest portion positioned in front of the hub and a highest portion positioned behind the hub.

A portion of the inner surface of the cover housing, which is within a predetermined distance from the upper end defining the opening, is parallel to the normal vector, and the window is disposed in an area defined by a portion of the inner surface of the cover housing that is parallel to the normal vector.

The upper surface of the window is disposed so as to face the direction that the normal vector faces. Thus, the portion of the inner surface of the cover housing that defines the area in which the window is disposed is also parallel to the side surface of the window.

In another aspect of the present invention, the upper surface of the window is parallel to the plane, in which the opening in the cover housing is included, and if expressed differently, the normal vector to the upper surface of the window forms an acute angle with the horizontal plane, and the vector obtained by orthogonal projecting the normal vector faces forwards.

According to another aspect of the present invention, a hub includes a hub body including a speaker and a communication module disposed in the hub body. The communication module may perform wireless communication with a peripheral device (e.g., an Internet-of-Thing device having a sensor) through the communication module, and an interface configured based on information exchanged through the communication module may be output through a display panel.

The upper portion of the hub body may be coupled to the cover housing. The cover housing may include a tubular sidewall extending vertically and a partition plate extending from an inner surface of the sidewall to divide the inside of the sidewall into upper and lower regions.

A display PCB may be disposed on the partition plate, and the display panel may be disposed on the display PCB. The display PCB includes substrate arms extending in front, rear, left and right directions. Thus, quadrant regions are defined by the four substrate arms.

At least one rib may protrude upwards from the partition plate, and the rib may come into contact with the periphery of the display panel through the quadrant regions defined by the four substrate arms.

According to another aspect of the present invention, a hub includes at least one communication module disposed in a hub body including a speaker, and performs wireless communication with a peripheral device (e.g., an Internet-of-Thing device having a sensor) through the at least one communication module, and an interface screen is displayed on the upper surface of the hub based on information exchanged through the at least one communication module.

In the hub, the hub body is disposed in a cylindrical metal grille having a plurality of through-holes therein so that sound output from the speaker may be emitted. The hub body is provided with a first communication module, which performs wireless communication with the peripheral device, and at least one antenna connected to the first communication module is disposed outside the grille.

The upper portion of the hub body is coupled to a cover housing, and a display PCB is disposed in the cover housing. A display, which outputs an interface screen configured based on information exchanged through the first communication module, may be disposed on the upper surface of the display PCB.

The antenna may be disposed on an inner surface of the cover housing. The cover housing may include a tubular sidewall, which is disposed above the grille and extends in the vertical direction, and a partition plate, which extends from the inner surface of the sidewall to divide the inside of the sidewall into upper and lower regions. The display PCB may be disposed on the upper surface of the partition plate. An appropriate position of the antenna may be the inner surface of the sidewall.

In particular, the sidewall may be formed such that a height from the upper end of the grille gradually increases from the front to the rear. In this case, by arranging the antenna at a rear portion of the sidewall, a sufficient distance between the antenna and the grille may be secured.

According to another aspect of the present invention, a hub includes a communication module disposed in a hub body including a speaker, and performs wireless communication with a peripheral device (e.g., an Internet-of-Thing device having a sensor) through the communication module, and an interface screen is displayed on the upper surface of the hub based on information exchanged through the communication module.

In the hub, the hub body is disposed in a cylindrical grille formed with a plurality of through-holes therein so that sound output from the speaker may be emitted, the upper end of the grille is coupled to a cover, which displays the interface screen, and the lower end of the grille is coupled to the hub base.

An opening is formed in the upper surface of the cover housing, and a window is disposed in the opening. The opening is within a first plane, which forms a first angle relative to the horizontal plane. The cover housing includes a cylindrical sidewall disposed above the grille, and the opening is a region surrounded by the upper end of the sidewall. The opening may have a circular shape, and may have a completely circular shape. In this case, a shape of the outer periphery of the opening orthogonally projected onto the horizontal plane has a short diameter in the direction of a vector obtained by orthogonally projecting a first normal vector, which extends upwards from the first plane, onto the horizontal plane, and a long diameter in a direction perpendicular to the vector obtained by the orthogonal projection.

Since the horizontal cross section of the grille also has a shape corresponding to the shape of the opening orthogonally projected onto the horizontal plane, the shape of the grille viewed from the front has a larger width in the transverse direction than that when a horizontal cross section has a circular shape. Thus, the amount of sound emitted forwards is increased.

The outer periphery of the upper end of the sidewall may be formed in a circular shape, and a horizontal cross section of the grille corresponds to a shape of the outer periphery orthogonally projected onto the horizontal plane. Thus, when the hub is viewed from above, the cover housing and the grille form an external appearance having a sense of unity.

The opening in the cover housing is arranged in the same direction as a vector obtained by orthogonally projecting the normal vector, which extends upwards from the first plane, onto the horizontal plane when the lowest point and the highest point of the opening are orthogonally projected onto the horizontal plane. That is, when a vector obtained by orthogonally projecting the normal vector onto the horizontal plane faces the front of the hub, the opening in the cover housing is also located in a plane that is tilted upwards from the front to the rear. In this case, the window may also be disposed so as to tilt in the same manner as the opening. The upper surface of the window may be located on a plane, in which the opening is formed.

With this structure, the upper surface of the window, through which the screen of the display is visible, is disposed to face forwards and upwards, and therefore the line of sight of the user who is located in front of the hub and the upper surface of the window form a greater angle, as compared to the case in which the window is arranged horizontally.

The lower surface of the hub base has a shape corresponding to the horizontal cross section of the elliptical grille. Specifically, the lower surface of the hub base has an elliptical shape having a long diameter in the transverse direction and a short diameter in the longitudinal direction.

According to another aspect of the present invention, a hub may include a hub body including a speaker and a communication module disposed in the hub body. The hub may perform wireless communication with a peripheral device (e.g., an Internet-of-Thing device having a sensor) through the communication module, and an interface configured based on information exchanged through the communication module may be displayed on the upper surface of the cover.

The hub body may be disposed in a cylindrical metal grille. A plurality of through-holes may be formed in the grille so that sound output from the speaker may be emitted to the outside.

The through-holes may include first through-holes and second through-holes having a smaller diameter than the first through-holes, and patterns composed of the first through-holes and the second through-holes may be repeatedly arranged in all directions. In this arrangement of the four-directional continuous patterns, the second through-holes having a small diameter are formed between the first through-holes having a relatively large diameter, so that the area in which the sound output from the speaker is emitted may be increased, and the grille may achieve structural stability.

According to another aspect of the present invention, a hub includes a communication module disposed in a hub body including a speaker, and performs wireless communication with a peripheral device (e.g., an Internet-of-Thing device having a sensor) through the communication module, and an interface screen is displayed on the upper surface of the hub based on information exchanged through the communication module.

The hub body is disposed in a cylindrical grille formed with a plurality of through-holes therein so that sound output from the speaker may be emitted, the upper end of the grille is coupled to a cover, which displays the interface screen, and the lower end of the grille is coupled to the hub base.

The hub body includes a speaker case having a cavity (or a borehole) in which the speaker is accommodated, the communication module being disposed on the outer surface of the speaker case. A plurality of support bosses, which protrudes downwards from the lower surface of the speaker case, may support a radiation plate.

A main PCB, which has a circuit connection with the communication module and the speaker, may be disposed between the hub body and the hub base, and the radiation plate may be disposed between the main PCB and the lower surface of the hub body (more particularly, the lower surface of the speaker case).

In particular, since the speaker case forms a cavity (borehole), vibration due to the output of the speaker may be transmitted to the lower surface of the speaker case. Therefore, in order to reduce the output vibration of the speaker transferred to the radiation plate, it is necessary to separate the radiation plate from the lower surface of the speaker case.

In this aspect, the radiation plate has a plurality of support tabs, which extends from a flat plate portion, in which a plurality of support boss through-holes is formed, through which the support bosses respectively pass, and the support tabs are fastened to the support bosses from below the flat plate portion, so that the flat plate portion is held at a position spaced apart from the lower surface of the speaker case.

According to another aspect of the present invention, a hub includes a hub body including a speaker that outputs sound, a communication module disposed in the hub body to perform wireless communication with a peripheral device, a hub base configured to support the hub body from below, a cover coupled to the upper portion of the hub body and configured to display an interface screen configured based on information exchanged through the communication module through an upper surface thereof, and a grille having a vertically elongated cylindrical shape and formed with a plurality of through-holes therein, the hub body being disposed inside the grille, the upper end of the grille being coupled to the cover and the lower end of the grille being coupled to the hub base.

In order for the hub to be firmly supported, a sufficient frictional force needs to be applied between a floor on which the hub is disposed and the hub base. To this end, the hub base may include a base body having a rubber insertion groove formed in a lower surface of a bottom portion thereof, and a support rubber inserted into the rubber insertion groove.

The support rubber serves to separate the base body from the floor. In this aspect, the support rubber may include a rubber body extending in an elongated shape so as to correspond to the rubber insertion groove and coupled to the rubber insertion groove, and a plurality of support protrusions protruding from the rubber body to the outside of the rubber insertion groove.

In addition, the base body may be formed with a depression, which receives an adapter of a power cord. An opening may be located in the lower surface of the bottom portion of the base body, and the depression may include a side surface extending upwards from the periphery of the opening, and an upper surface extending from the upper end of the side surface to face the opening.

A socket for insertion of an output terminal of the power cord may be provided on the side surface of the depression, and a cord fixing groove may be formed in the base body to prevent the output terminal from being easily separated from the socket.

Specifically, an outer opening may be formed in the outer surface of an outer wall portion of the base body, an inner opening may be formed in the side surface of the depression, the lower surface of the bottom portion may be formed with a cord insertion hole, which interconnects the outer opening and the inner opening, and the cord fixing groove may be recessed from the cord insertion hole to form a passage, through which a cord, which supplies a voltage, passes between the outer opening and the inner opening.

A method of the present invention relates to a method of manufacturing a hub including a cylindrical metal grille having a plurality of through-holes formed therein, a hub body disposed inside the grille and including a speaker and a communication module, a cover coupled to the upper portion of the hub body and configured to display an interface screen configured based on information exchanged through the module via the upper surface thereof, and a hub base, which supports the hub body from below.

In particular, when defining a cylindrical main mold having an upper end, which is formed by a circular opening in a plane tilted at a predetermined angle relative to a horizontal plane, and an elliptical lower end, which is formed by orthogonally projecting the upper end onto the horizontal plane, with the manufacturing method of the present invention, the grille may be shaped according to the shape of the main mold.

Such a manufacturing method may include the following steps.

(a) step; A flat metal plate is formed to have a contour corresponding to the deployed shape of the main mold, and is processed to have a plurality of through-holes therein. By removing an unnecessary portion of the flat metal plate through etching, the flat metal plate may be processed to have a contour corresponding to the deployed shape of the main mold and to have the through-holes therein. Stainless steel is suitable as a material of the flat metal plate.

The contour of the flat metal plate may be processed such that both sides become straight lines that extend vertically at the middle of a finished grille rear surface.

(b) step: A cylindrical grille is formed by bonding both sides of the processed flat metal plate to each other so that a side corresponding to the upper end of the main mold becomes an upper end and a side corresponding to the lower end of the main mold becomes a lower end. At this time, the upper and lower ends of the grille may have irregular shapes since the cylindrical grille is naturally bent and deformed due to the characteristics of a metal material.

(c) step; A cover is formed with an upper end holding portion having a shape corresponding to the upper end of the main mold, a hub base is formed with a lower end holding portion having a shape corresponding to the lower end of the main mold, and the upper end holding portion formed on the cover is inserted into an opening formed in the upper surface of the grille so that the cover and the grille are assembled with each other. At this time, the upper end of the grille is shaped so as to correspond to the upper end holding portion.

(d) step: The lower end holding portion formed on the hub base is inserted into an opening formed in the lower surface of the grille, so that the lower end of the grille is shaped so as to correspond to the lower end holding portion.

A hub of the present invention includes a hub body including a speaker that outputs sound, a communication module disposed in the hub body to perform wireless communication with a peripheral device, a hub base configured to support the hub body from below, a cover coupled to the upper portion of the hub body and configured to display an interface screen, configured based on information exchanged through the communication module, through the upper surface thereof, and a grille having a vertically elongated cylindrical shape and formed with a plurality of through-holes therein, the hub body being disposed inside the grille, the upper end of the grille being coupled to the cover, and the lower end of the grille being coupled to the hub base.

The cover may include a cover housing coupled to the hub body and having an opening formed in the upper surface thereof, a display disposed in the cover housing to output the interface screen, and a window disposed in the opening in the cover housing, through which the interface screen is visible from above the display.

The cover housing may include a cylindrical sidewall extending upwards so as to be disposed above the grille, and an upper end holding portion extending from the sidewall and inserted into the grille from above the grille, the upper end holding portion coming into contact with the inner surface of the grille so as to maintain the shape of the upper end of the grille. The cover may further include a display PCB disposed in the cover housing, the display being mounted on the upper surface of the display PCB, and a window base disposed below the window to support the window. The window base may include a window support plate disposed above the display to support the window and having an opening, which exposes the screen of the display, and a support boss protruding downwards from the window support plate so as to be coupled to the cover housing. The cover housing may further include a partition plate extending from the inner peripheral surface of the sidewall to divide the inside of the sidewall into upper and lower regions, the display PCB being disposed on the upper surface of the partition plate. The partition plate may be formed with an insertion boss into which the support boss is inserted. The window support plate and the partition plate may be disposed parallel to the window, respectively.

The opening in the window support plate may have a longer length in the transverse direction than a length in the longitudinal direction. The support boss may be formed in each of an area of the window support plate located behind the opening and an area of the window support plate located in front of the opening. The display PCB may have a through-hole through which the support boss passes at a position corresponding to at least one of a plurality of support bosses.

A tact switch may be disposed on the upper surface of the display PCB in each of four-directional areas about the display, and the window base may be formed with operation protrusions protruding downwards from the window support plate at positions corresponding to the four tact switches to operate the tact switches by a pressure applied through the window.

The window may be disposed so as to tilt upwards from the front to the rear, a vector obtained by orthogonally projecting the normal vector to the upper surface onto a predetermined horizontal plane may be disposed so as to face forwards, the grille may be formed of a metal material, and a shape of the grille orthogonally projected onto the horizontal plane may correspond to a shape of the window orthogonally projected onto the horizontal plane. The window may have a circular shape.

The cover housing may include a plurality of fastening bosses protruding from the upper end holding portion and coupled with the hub body. The hub body may include a speaker case in which the speaker is received, and the speaker case may have boss insertion grooves into which the fastening bosses are inserted, respectively. The speaker case may include a front case having a sound output hole through which a vibrating plate of the speaker is exposed, and a rear case coupled to the front case to form a space in which the speaker is accommodated between the front case and the rear case. At least one of the fastening bosses may protrude rearwards from a front portion of the upper end holding portion, and at least a remaining one of the fastening bosses may protrude forwards from a rear portion of the upper end holding portion, at least one of the boss insertion grooves may be recessed rearwards in the front surface of the front case and may form an opening in the upper surface of the front case so that a fastening boss protruding rearwards from the front portion of the upper end holding portion is inserted into the boss insertion groove from above, and at least a remaining one of the boss insertion grooves may be recessed forwards from the rear surface of the rear case and may form an opening in the upper surface of the rear case so that the fastening boss protruding forwards from the rear portion of the upper end holding portion is inserted into the boss insertion groove from above.

A plurality of fastening bosses may protrude downwards from the lower surface of the speaker case. The base body may further include insertion bosses protruding upwards from the inner surface of the base body, the fastening bosses being inserted into the insertion bosses.

The hub may further include a main PCB disposed between the lower surface of the speaker case and the base body and having a circuit connection with the display PCB.

The hub may further include a volume switch disposed on the display PCB to increase or decrease the volume of the speaker. An opening may be formed in the sidewall of the cover housing, and the hub may further include a volume button fixed in the opening in the sidewall and configured to be operated by an external force so as to operate the volume switch.

The base may include a base body having an open upper surface and defining a predetermined space therein, and a support rubber fixed to the lower surface of the base body. The base body may include a base bottom portion formed with a rubber insertion groove into which the support rubber is inserted, and a base outer wall portion extending upwards from the periphery of the bottom portion and disposed below the grille.

The base may include a lower end holding portion extending from the base outer wall portion and inserted into the grille from below the grille to come into contact with the inner surface of the grille so as to maintain the shape of the lower end of the grille.

The communication module may include a Wi-Fi module and a Bluetooth module, and the Wi-Fi module and the Bluetooth module may be detachably coupled to the hub body together.

The communication module may include a ZigBee communication module disposed on the side surface of the hub body.

A hub of the present invention may include a hub body having a speaker that outputs sound, a communication module disposed in the hub body to perform wireless communication with a peripheral device, a hub base configured to support the speaker from below, a cover housing including a tubular sidewall coupled to the upper portion of the speaker and vertically extending from the upper side of the speaker and a partition plate extending from the inner surface of the sidewall to divide the inside of the side into upper and lower regions, a display configured to output an interface screen configured based on information exchanged through the communication module, a display PCB disposed on the upper surface of the partition plate to support the display from below thereof and having tact switches in front, rear, left, and right areas about the display, a window base disposed above the display and having an opening, which exposes the screen, the window base having a longer length in the transverse direction than a length in the longitudinal direction, and a window formed of a transparent material and disposed on the upper surface of the window base to cover the opening. The window base may include a window support plate having an opening and an upper surface on which the window is disposed, operation protrusions protruding downwards from the window support plate at positions corresponding to the four tact switches and configured to operate the tact switches by a pressure applied to the support plate, and a plurality of support bosses protruding downwards from the window support plate and coupled to the partition plate to separate the window support plate from the display PCB, at least one of the support bosses may be formed in each of a front area and a rear area of the opening, and the window support plate may be formed with a slit, which extends in the transverse direction between the support boss and the opening in each of the areas.

A pair of support bosses may be arranged in the transverse direction in each of the front area and the rear area.

The cover housing may further include an insertion boss protruding downwards from the partition plate at a position corresponding to the support boss, the support boss being inserted into the insertion boss. The cover housing may further include a bolt passing through the lower end of the insertion boss and fastened to the support boss.

The window may be formed of a transparent synthetic resin member, and may be attached to the window support plate. The window support plate may be tilted upwards from the front to the rear at a predetermined angle relative to a predetermined horizontal plane. The support boss may form an angle complementary to an angle, formed by the window support plate and the predetermined horizontal plane, with the window support plate. The window support plate may be colored translucent or opaque, except for at least a portion thereof in the area corresponding to the opening. A translucent or opaque film may be attached to the lower surface of the window support plate, except for at least a portion of the area corresponding to the opening.

The operation protrusions may be disposed symmetrically.

A hub of the present invention includes a hub body including a speaker that outputs sound, a communication module disposed in the hub body to perform wireless communication with a peripheral device, a hub base configured to support the hub body from below, a disc-shaped window formed of a transparent material, a display configured to output an interface screen configured based on information exchanged through the communication module, and a cover housing coupled to the upper portion of the hub body, the display being disposed inside the cover housing, the window being disposed above the display, the cover housing having an opening formed in the upper surface thereof so that the window is disposed in the opening. A normal vector to a predetermined plane, in which the opening is formed, may form an acute angle with the horizontal plane, a vector obtained by orthogonally projecting the normal vector onto the horizontal plane may face forwards, a certain portion of the inner surface of the cover housing within a predetermined distance from the upper end defining the opening may be parallel to the normal vector, and the upper surface of the window may be disposed to face the direction that the normal vector faces within the area defined by a portion of the inner surface of the cover housing that is parallel to the normal vector.

The hub may further include a grille having a vertically elongated cylindrical shape and formed with a plurality of through-holes therein, the hub body being disposed inside the grille, the upper end of the grille being coupled to the cover, and the lower end of the grille being coupled to the hub base. The cover housing may include a sidewall, which extends vertically and is disposed above the grille, and an upper end holding portion, which extends from the sidewall so as to be inserted into the grille from above the grille and comes into contact with the inner surface of the grille so as to maintain the shape of the upper end of the grille. A portion of the inner surface of the cover housing, which is parallel to the normal vector, may be within the inner surface of the sidewall.

The outer side surface of the sidewall may be parallel to the normal vector, or may be gradually spaced farther apart from the normal vector with decreasing distance to the lower side thereof, on a cut plane obtained by cutting the cover housing along an arbitrary vertical plane.

The window may have a circular shape.

The window may be formed to have a constant thickness, and the side surface thereof may be perpendicular to the upper surface and the lower surface thereof. The side surface of the window may form a constant distance from a portion of the inner surface of the cover housing, which is parallel to the normal vector, at any position.

A hub of the present invention includes a hub body including a speaker that outputs sound, a communication module disposed in the hub body to perform wireless communication with a peripheral device, a hub base configured to support the hub body from below, a disc-shaped window formed of a transparent material, a display configured to output an interface screen configured based on information exchanged through the communication module, and a cover housing coupled to the upper portion of the hub body, the display being disposed inside the cover housing, the window being disposed above the display, the cover housing having an opening formed in the upper surface thereof so that the window is disposed in the opening. The window may be disposed in an area defined by the inner surface of the cover housing, and may be disposed in the area defined by a predetermined portion of the inner surface defining the opening, which extends downwards from the upper end. A normal vector to the upper surface of the window may form an acute angle with the horizontal plane, a vector obtained by orthogonally projecting the normal vector onto the horizontal plane may face forwards, and the portion of the inner surface of the cover housing, which defines the area, may be parallel to the side surface of the window.

A hub of the present invention includes a hub body including a speaker that outputs sound, a communication module disposed in the hub body to perform wireless communication with a peripheral device, a cover housing including a tubular side wall, which is coupled to the upper portion of the hub body and extends vertically, and a partition plate, which extends from the inner side surface of the sidewall to divide the inside of the sidewall into upper and lower regions, a display panel disposed inside the cover housing and configured to output an interface screen configured based on information exchanged through the communication module, and a display PCB disposed on the partition plate, the display panel being disposed on the upper surface of the display PCB, and the display PCB including substrate arms extending in four front, rear, left, and right directions from a central portion. The cover housing may further include a rib, which protrudes upwards from the partition plate, and passes through one of quadrant regions divided by the substrate arms so as to come into contact with the periphery of the display panel.

The display panel may have a rectangular shape. A plurality of ribs may be provided such that one rib comes into contact with a first side of the display panel and a remaining rib comes into contact with a second side of the display panel, which is parallel to the first side of the display panel.

Another remaining one of the plurality of ribs may come into contact with a third side of the display panel, which interconnects the first side and the second side of the display panel.

The display panel may be disposed such that the first side extends in the transverse direction.

The rib, which comes into contact with the first side of the display panel, and the rib, which comes into contact with the second side of the display panel, may pass through different areas among the quadrant regions divided by the substrate arms.

The hub may include a window base, which includes a window support plate disposed in the cover housing above the display panel and having an opening, which exposes the screen, and a plurality of support bosses protruding downwards from the window support plate and coupled to the partition plate so as to separate the window support plate from the display PCB, and a window formed of a transparent material and disposed on the upper surface of the window base in the cover housing to cover the opening, and at least one of the support bosses may pass through one of the quadrant regions divided by the substrate arms and be coupled to the partition plate. A through-hole may be formed in the substrate, and a remaining one of the plurality of support bosses may pass through the through-hole.

The cover housing may further include a plurality of insertion bosses protruding downwards from the partition plate, into which the plurality of support bosses are inserted, respectively.

The substrate arms may be provided with tact switches, respectively, and the tact switches may be disposed in front, rear, left, and right regions about the display PCB. The tact switches may be arranged symmetrically.

The cover housing may further include a rib protruding upwards from the partition plate and passing through one of the quadrant regions divided by the substrate arms so as to come into contact with the periphery of the display PCB.

A hub of the present invention includes a hub body including a speaker that outputs sound, a first communication module disposed in the hub body to perform wireless communication with peripheral devices, at least one antenna connected to the first communication module to transmit and receive a wireless communication signal, a hub base configured to support the hub body from below, a cover housing coupled to the upper portion of the hub body, a display PCB disposed in the cover housing, a display disposed on the upper surface of the display PCB and configured to output an interface screen configured based on information exchanged through the first communication module, a window formed of a transparent material and disposed above the display so that the screen is visible therethrough, and a grille having a vertically elongated cylindrical shape and formed with a plurality of through-holes therein, the hub body being disposed inside the grille, the grille having an upper end coupled to the cover housing and a lower end coupled to the hub base. The cover housing may be disposed above the grille, and may include a vertically extending tubular sidewall and a partition plate extending from the inner surface of the sidewall to divide the inside of the sidewall into upper and lower regions, the display PCB being disposed on the upper surface of the partition plate. The antenna may be disposed on the inner surface of the sidewall.

The sidewall may be gradually increased in height from the upper end of the grille from the front to the rear, and the antenna may be disposed on the rear portion of the sidewall. The first communication module may be disposed on a rear surface of the speaker. The at least one antenna may include a first antenna and a second antenna disposed on the left and right sides of the rear portion of the inner surface, respectively. The first communication module may be a Wi-Fi module.

The hub may further include a second communication module disposed in the hub body and configured to perform wireless communication with the peripheral devices according to a protocol different from that of the first communication module, and an antenna connected to the second communication module to transmit and receive a wireless communication signal. The antenna connected to the second communication module may be disposed on the front portion of the inner side surface of the sidewall. The second communication module may be disposed on a rear portion of the hub body. The first communication module may be a Wi-Fi module, and the second communication module may be a Bluetooth module.

The hub may further include a communication module assembly in which the Wi-Fi module and the Bluetooth module are integrally formed, and the communication module assembly may be separably coupled to the rear portion of the speaker.

The hub may further include a ZigBee module disposed on the side portion of the speaker and an antenna connected to the ZigBee module to transmit and receive a ZigBee communication signal. The antenna connected to the ZigBee module may be disposed on the front portion of the inner surface of the sidewall.

Any one of the antenna connected to the Bluetooth module and the antenna connected to the ZigBee module may be disposed on the left side of the front portion of the inner surface of the sidewall and the remaining one may be disposed on the right side of the front portion of the inner surface of the sidewall.

The hub may further include a piece of tape, which attaches the antenna to the sidewall.

The antenna may be take the form of a film that is bent so as to correspond to the contour of the inner surface of the sidewall.

The antenna may be disposed below the partition plate.

A hub of the present invention includes a hub body including a speaker that outputs sound, a communication module disposed in the hub body to perform wireless communication with a peripheral device, a hub base configured to support the hub body from below, a cover housing coupled to the upper portion of the hub body and having an opening formed in the upper surface thereof, the opening being formed in a first plane having a first angle relative to a horizontal plane, a display disposed in the cover housing and configured to output an interface screen configured based on information exchanged through the communication module, a window disposed in the opening so that the screen of the display is visible therethrough when viewing from above, and a grille having a vertically elongated cylindrical shape and formed with a plurality of through-holes therein, the hub body being disposed inside the grille, the grille having an upper end coupled to the cover housing and a lower end coupled to the hub base. The cover housing may include a cylindrical sidewall disposed above the grille and having an upper end defining the opening, and the upper end of the sidewall may have a circular outer periphery, and the grille may have a horizontal cross-sectional shape corresponding to a shape of the outer periphery orthogonally projected onto the horizontal plane.

When the lowest point and the highest point of the opening are orthogonally projected onto the horizontal plane, these points may be arranged in the same direction as a vector obtained by orthogonally projecting the normal vector, which extends upwards from the first plane, onto the horizontal plane. The upper surface of the window may be tilted in the same direction as a plane in which the opening is formed. The upper surface of the window may be located on the plane in which the opening is formed.

The opening may have a circular shape.

The upper surface of the window may have a circular shape corresponding to the opening. The upper surface of the window and the lower surface of the window may have the same shape as the opening, and the side surface that interconnects the upper surface of the window and the lower surface of the window may be perpendicular to the upper surface add the lower surface of the window. The side surface of the window may be spaced apart from the inner surface of the sidewall. The inner surface of the sidewall may be parallel to the side surface of the window at any portion of the window opposite the side surface.

A shape of the outer periphery orthogonally projected onto the horizontal plane may have a short diameter in the direction of a vector obtained by orthogonally projecting a first normal vector, which extends upwards from the first plane, onto the horizontal plane, and a long diameter in a direction perpendicular to the vector obtained by the orthogonal projection.

The horizontal cross section of the grille may have an elliptical shape. The elliptical shape may have a short diameter in the direction of a vector obtained by orthogonally projecting a first normal vector onto the horizontal plane, and a long diameter in a direction perpendicular to the vector obtained by the orthogonal projection. The lower surface of the hub base may have a shape corresponding to the elliptical shape.

The opening defined by the upper end of the grille may be within a second plane forming a second angle relative to the horizontal plane, and a vector obtained by orthogonally projecting a second normal vector, which extends upwards from the second plane, may face the same direction as the vector obtained by orthogonally projecting the first normal vector onto the horizontal plane.

A hub of the present invention includes a hub body including a speaker that outputs sound, a communication module disposed in the hub body to perform wireless communication with a peripheral device, a hub base configured to support the hub body from below, a cover coupled to the upper portion of the hub body and configured to display an interface screen, configured based on information exchanged through the communication module, through the upper surface, and a grille having a vertically elongated cylindrical shape and formed with a plurality of through-holes therein, the hub body being disposed inside the grille, the upper end of the grille being coupled to the cover and the lower end of the grille being coupled to the hub base. The through-holes may include first through-holes and second through-holes having a smaller diameter than the first through-holes, and patterns composed of the first through-holes and the second through-holes may be repeatedly arranged in all directions.

The grille may be formed with a lower end periphery, in which the through-holes are not formed, in an area from the lower end to a first boundary parallel to the lower end, and may be formed with an upper end periphery, in which the through-holes are not formed, in an area from the upper end to a second boundary, which is located above the first boundary and is parallel to the first boundary.

In any one of columns in which the patterns are repeated, two or more ones of the through-holes may be gradually reduced in diameter with decreasing distance to the first boundary, so that the diameter of the through-hole closest to the first boundary may be minimized.

In any one of columns in which the patterns are repeated, two or more ones of the through-holes may be gradually reduced in diameter with decreasing distance to the second boundary, so that the diameter of the through-hole closest to the second boundary may be minimized.

The grille may be horizontally symmetrical with respect to a predetermined vertical line when viewed from the rear, and a portion of the grille, which extends from the lower end to the upper end along the vertical line and has a constant width, may not be formed with the through-holes.

The uppermost point of the upper end of the grille may meet the vertical line. The grille forms a cylinder by welding both sides of a flat metal plate, so that the welding of both sides may be made along the vertical line. Through polishing, a welding bead of both sides may be removed from the outer surface of the grille, but may remain on the inner surface of the grille.

A groove may be formed in the upper end of the grille. The groove may be positioned on the vertical line.

The entire area of the outer surface of the grille may be formed with hair lines, which are processed by an abrasive paper having a predetermined particle size. The hair lines may extend in the horizontal direction.

The lower end periphery of the grille may be formed with a hole through which a USB port is installed.

The grille may be formed of stainless steel.

A hub of the present invention includes a hub body including a speaker that outputs sound, a communication module disposed in the hub body to perform wireless communication with a peripheral device, a hub base configured to support the hub body from below, a cover coupled to the upper portion of the hub body and configured to display an interface screen, configured based on information exchanged through the communication module, via the upper surface thereof, a grille having a vertically elongated cylindrical shape and formed with a plurality of through-holes therein, the hub body being disposed inside the grille, the grille having an upper end coupled to the cover and a lower end coupled to the hub base, a main PCB disposed between the hub body and the hub base and having a circuit connection with the communication module and the speaker, and a radiation plate formed of a metal material and disposed between the main PCB and the lower surface of the hub body. The hub body may include a speaker case having a cavity in which the speaker is accommodated, the communication module being disposed on the outer surface of the speaker case, and a plurality of support bosses protruding downwards from the lower surface of the speaker case. The radiation plate may include a flat plate portion formed with a plurality of support boss through-holes, through which the respective support bosses pass, and a plurality of support taps extending from the flat plate portion and fastened to the support bosses from below the flat plate portion so as to maintain the flat plate portion so as to be spaced apart from the lower surface of the speaker case.

The flat plate portion may be disposed at a position spaced apart from the main PCB. Each of the support taps may include a vertical portion extending downwards from the flat plate portion and a horizontal portion extending horizontally from the vertical portion and having a fastening hole therein, and a plurality of bolts may pass through the fastening holes in the support taps from below so as to be fastened to the support bosses.

The grille may be formed of a metal material, and the radiation plate and the grille may be connected to each other via a conductor.

The flat plate portion may be formed with a heat radiation hole.

The speaker case may further include a plurality of fastening bosses extending downwards from the lower surface, and the flat plate portion may be further formed with a plurality of fastening boss through-holes, through which the respective fastening bosses pass. The hub base may be formed with a plurality of insertion bosses, into which the fastening bosses, which have passed through the respective fastening boss through-holes, are inserted.

The hub base may be formed in the lower surface thereof with a plurality of fastening holes, which communicate with the insertion boss through-holes, respectively, so that bolts are inserted thereinto from below the base. The bolts, which have passed through the fastening holes formed in the lower surface of the base, may be fastened to the fastening bosses.

The main PCB may have a plurality of through-holes, through which the respective fastening bosses pass.

The main PCB may be supported by the upper end of each insertion boss.

The fastening boss through-holes may be formed in each of the quadrant regions divided by two straight lines, which pass through the center of the flat plate portion and are perpendicular to each other. The support boss through-holes may be formed in each of at least two of the quadrant regions.

The support boss through-holes may be formed in two areas of the quadrant regions, which are arranged diagonally.

The radiation plate may be formed of aluminum.

A hub of the present invention includes a hub body including a speaker that outputs sound, a communication module disposed in the hub body to perform wireless communication with a peripheral device, a hub base configured to support the hub body from below, a cover coupled to the upper portion of the hub body and configured to display an interface screen, formed based on information exchanged through the communication module, via the upper surface thereof, and a grille having a vertically elongated cylindrical shape and formed with a plurality of through-holes therein, the hub body being disposed inside the grille, the grille having an upper end coupled to the cover and a lower end coupled to the hub base. The hub base may include a base body having a rubber insert groove formed in the lower surface of a bottom portion thereof and an outer wall portion extending upwards from the periphery of the bottom portion so as to be coupled to the lower end of the grille, and a support rubber inserted into the rubber insertion groove, a portion of the support rubber protruding to the outside of the rubber insertion groove.

The base body may further include at least one boss protruding upwards from the bottom portion so as to be coupled to the hub body, and at least one fastening hole may be formed in the rubber insertion groove so as to communicate with each boss.

The rubber insertion groove may be formed to extend along a predetermined circumference.

A portion of the bottom portion surrounded by the rubber insertion groove may be formed with a depression, which is recessed upwards from the lower surface of the bottom portion. An opening may be located in the lower surface of the bottom portion, and the depression may include a side surface extending upwards from the periphery of the opening, and an upper surface extending from the upper end of the side surface to face the opening. The base body may further include a socket provided on the side surface of the depression so that an output terminal of a power cord is inserted thereinto. An entrance of the socket, into which the output terminal is inserted, may be open forwards.

The rubber insertion groove may take the form of an arc extending from one end to the other end with a constant curvature, and the base body may be formed with a cord fixing groove, which fixes the power cord, between both ends of the rubber insertion groove. The outer surface of the outer wall portion may have an outer opening formed therein, an inner opening may be formed in the side surface of the depression, and the lower surface of the bottom may be formed with a code insertion hole, which interconnects the outer opening and the inner opening. The cord fixing groove may be recessed from the cord insertion hole so as to form a passage through which a cord, which supplies a voltage, passes between the outer opening and the inner opening. The passage may be reduced in width from the outer opening to the inner opening. The cord insertion hole may be reduced in width from the outer opening to the inner opening.

The inner surface of the passage may be provided with a plurality of insertion hole reduction protrusions on both sides of the code insertion hole so as to reduce the width of the code insertion hole.

The support rubber may include a rubber body extending in a shape corresponding to the rubber insertion groove and coupled to the rubber inserting groove, and a plurality of support protrusions protruding from the rubber body to the outside of the rubber insertion groove. The support protrusions may be disposed symmetrically. The support protrusions may be disposed at an interval of 90 degrees about the center of the bottom portion.

A manufacturing method of the present invention relates to a method of manufacturing a hub including a cylindrical metal grille having a plurality of through-holes formed therein, a hub body disposed inside the grille and including a speaker and a communication module, a cover coupled to the upper portion coupled to the hub body and configured to display an interface screen configured based on information exchanged through the communication module through the upper surface thereof, and a hub base configured to support the hub body from below, wherein, when defining a cylindrical main mold having an upper end, which is formed by a circular opening in a plane tilted at a predetermined angle relative to a horizontal plane, and an elliptical lower end, which is formed by orthogonally projecting the upper end onto the horizontal plane, the cover is formed with an upper end holding portion having a shape corresponding to the lower end of the main mold and the hub base is formed with a lower end holding portion having a shape corresponding to the upper end of the main mold, the method includes (a) processing a flat metal plate to have a contour that corresponds to a deployed form of the main mold and to have a plurality of through-holes formed therein, (b) configuring the cylindrical grille by bonding both sides of the processed flat metal plate such that a side corresponding to the upper end of the main mold becomes an upper end and a side corresponding to the lower end of the main mold becomes a lower end, the upper end and the lower end of the cylindrical grille having irregular shapes obtained by deformation of the flat metal plate, (c) shaping the upper end of the grille so as to correspond to the upper end holding portion by inserting the upper end holding portion formed on the cover into an opening formed in the upper surface of the grille, and (d) shaping the lower end of the grille so as to correspond to the lower end holding portion by inserting the lower end holding portion formed on the hub base into an opening formed in the lower surface of the grille.

The step (a) may include a step of etching the flat metal plate to form the contour that corresponds to the deployed form of the main mold and form the through-holes. The flat metal plate may be formed of stainless steel.

In the step (b), the bonding between both sides of the flat metal plate may be performed by welding. The step (a) may be performed such that both the sides in the contour of the flat metal plate becomes a straight line that extends vertically at the center of the rear surface of the grille. The method of manufacturing the hub may further include processing a hole for installing an USB port in a welded portion of both the sides.

The method of manufacturing the hub may further include processing a recess that is recessed from the upper end of the grille into the welded portion of both the sides.

The method of manufacturing the hub may further include polishing the welded portion of both the sides on the outer surface of the grille.

The method of manufacturing the hub may further include polishing the entire area of the outer surface of the grille to form a hair line.

The method of manufacturing the hub may further include coating the grille formed with the hair lines. The grille may be coated by electro-deposition.

The method of manufacturing the hub may further include laser engraving a mark on the outer surface of the grille.

The method of manufacturing the hub may further include attaching a porous filter to the inner surface of the grille.

Advantageous Effects

A hub of the present invention provides an interface screen for displaying information exchanged through a communication module, which performs wireless communication with a peripheral device, thereby managing various types of peripheral devices and easily grasping information acquired from Internet-of-Things devices.

In addition, visibility is improved by displaying the interface screen on the upper surface of the hub. In particular, visibility is further improved by arranging the interface screen at an incline.

In addition, since a coupling region between components is formed inside a cylindrical grille, the external appearance of the hub is improved.

In addition, since the upper and lower ends of the grille are coupled respectively to a cover and a hub base via fitting, the grille may be fixed without a separate fastening member, such as a bolt.

In addition, in the process of coupling the cylindrical metal grille to the cover and the hub base, the upper and lower ends of the grille are deformed to have a regular shape using the plasticity of a metal material thereof, which simplifies the shaping of the grille.

In addition, by disposing a main PCB between the hub base and a hub body, utilization of space is improved.

In addition, through communication with an accessory provided separately from a home appliance, it is possible to manage the home appliance, that is, to sense the state of the home appliance or to control the operation of the home appliance, by utilizing a function provided through the accessory. In particular, even if the type of the home appliance or the accessory is changed, the present invention may be applied to the changed devices as long as the above-described interface configuration is changed, which improves versatility and expandability.

In addition, since the upper end of the grille and the cover are formed on a continuous curved contour, a sense of unity of the external appearance is improved.

In addition, by providing the interface screen for displaying information exchanged through the communication module, which performs wireless communication with a peripheral device, it is possible to manage various types of peripheral devices and to easily grasp the information acquired from Internet-of-Things devices.

In addition, since a window, which is disposed on the upper surface of the hub so as to expose the screen, functions as a button for operating the interface, there is no need to provide a separate button, so that a simple external appearance may be realized.

In addition, since specific areas on the window, through which the screen of the display on which the interface is output is visible, may function as buttons for operating the interface, the operation of the interface may be performed more intuitively. For example, in the window, four areas on the front, rear, left, and right sides of the area in which the interface screen is exposed may function as buttons. Accordingly, the menus displayed on the interface may be scrolled in four directions, or the menu selection in respective directions may be easily performed.

In addition, the operability of the respective areas of the window, which function as buttons, becomes uniform. Such uniform operability also means that respective tact switches are operated correctly so as to correspond to the respective pressed areas.

In addition, in the hub of the present invention, the window tilted relative to the horizontal plane and the inner surface of a cover housing surrounding the side surface of the window are formed parallel to each other, so that the distance between the window and the inner surface of the cover housing may be consistent in any portion, which may provide an aesthetically pleasing external appearance to the upper surface of the hub.

In particular, even when the window is circular, a consistent distance between the window and the inner surface of the cover housing may be maintained.

In addition, even when the hub is moved or even if external shocks are applied to the hub, the display panel, which outputs the interface screen, may remain at a predetermined position without a risk of shaking, which may prevent the interface screen, which is visible through the window, from being shifted to one side.

In addition, since the position at which the display panel is to be installed may be grasped through a rib formed on a partition plate, which supports the display panel, it is possible to prevent assembly failure during a manufacturing process.

In addition, in the window through which the screen of the display panel is visible, a certain portion (observation window), through which the interface screen is visible, may be transparent, and the remaining portion may be provided with a film attached thereto or may be colored. In this case, it is possible to install the display panel at a correct position so as to prevent failure, such as shifting of the screen to one side in the observation window, and to maintain the screen at a correct position.

In addition, the hub of the present invention may avoid interference or blocking of signals due to the metal grille by placing an antenna of the communication module at the outside of the metal grille. In addition, by disposing the antenna, connected to the communication module, on the inner surface of the cover housing located above the grille, the antenna is not exposed to the outside of the hub, which secures an aesthetically pleasing external appearance of the hub.

In addition, when the antenna is spaced apart from the display PCB, which is disposed inside the cover housing, as far as possible, it is possible to reduce signal interference due to a magnetic field generated by current flowing through the display PCB.

In particular, a sidewall of the hub may be configured in a manner such that the height thereof from the upper end of the grille gradually increases from the front to the rear. In this case, by disposing the antenna on the rear portion of the sidewall, it is possible to secure a sufficient distance between the antenna and the grille.

Since the hub of the present invention is formed such that the upper surface of the hub on which the interface screen is displayed is tilted relative to the horizontal plane, as compared with a case in which the upper surface is horizontal, it is possible to form a greater angle between the upper surface and the line of sight of the user who is located in front of the hub, which minimizes distortion of the screen as experienced by the user.

In addition, the horizontal cross-sectional shape of the grille is formed so as to correspond to the shape that is obtained when the tilted upper surface is orthogonally projected onto a horizontal plane. As such, when viewed from above, the overall external appearance of the hub forms a shape having a sense of unity.

In addition, by forming the grille such that the horizontal cross-sectional shape thereof is an elliptical shape having a length in the transverse direction longer than a length in the longitudinal direction, the area over which the sound output from the speaker inside the grille is emitted forwards is increased, as compared with the case in which the horizontal cross-sectional shape of the grille is circular.

In addition, when the lower surface of the hub base is formed into an elliptical shape that is longer in the transverse direction than in the longitudinal direction, the hub is not easily overturned by the external force acting in the transverse direction.

In the hub of the present invention, the grille is processed such that first through-holes and second through-holes having a smaller diameter than that of the first through-holes are repeated in succession in four directions, so as to increase the area over which the sound output from the speaker disposed inside the grille is emitted, which enables acquisition of improved sound quality.

In addition, even if a large number of through-holes is formed in the grille, sufficient rigidity of the grille may be secured.

In addition, the grille has an area in which no through-holes are formed at the upper and lower ends thereof, which are respectively coupled to the cover and the hub base, which secures firm coupling between the grille and the cover and the hub base.

The hub of the present invention may dissipate heat generated from various electric elements, such as a control unit (or a controller), using a radiation plate.

In addition, since the hub body is provided with the speaker, there is provided a space between the hub body and the hub base in order to prevent the vibration output from the speaker from being directly transmitted to the hub base. By providing the main PCB and the radiation plate in this space, it is possible to reduce the dead space and to utilize the space as a space in which the heat radiated from the radiation plate dissipates.

In addition, by separating a flat plate portion of the radiation plate from the lower surface of the hub body, it is possible to prevent the vibration output from the speaker from being transmitted to the flat plate portion, thereby reducing the vibration of the radiation plate and the noise caused thereby.

The hub of the present invention is not easily overturned due to the frictional force acting between a support rubber and the floor on which the hub is placed.

In addition, even if the hub is placed on a floor having water thereon, since the base body is spaced apart from the floor by the support rubber, it is possible to prevent the base body from being wetted.

In addition, since an adapter provided in a power cord is accommodated in a groove formed in the bottom of the hub, it is possible to prevent the periphery of the hub from being disturbed by the adapter.

In addition, since the groove for fixing the power cord is formed in the base body, even if the power cord is pulled by an unnecessary external force or even if the hub is lifted, the tension is dispersed and the power cord is not easily separated.

In a method of manufacturing the hub according to the present invention, in the state in which both ends of a metal flat plate are rolled so that the metal plate has a cylindrical shape, the upper and lower ends of the grille have an irregular shape. However, since the upper and lower ends are naturally deformed to have a regular shape in the subsequent process of assembling the grille with the cover housing and the hub body, there is no need for a separate step for shaping, and the manufacturing process is simplified.

In addition, it is possible to easily realize a cylindrical grille shape having an upper end, in which a circular opening is formed in a plane that is tilted at a predetermined angle relative to the horizontal plane, and a lower end having an elliptical shape obtained by orthogonally projecting the upper end onto the horizontal plane.

DESCRIPTION OF DRAWINGS

FIG. 6b illustrates cross-sectional views of a grille taken from the respective portions illustrated in FIG. 6a.

BEST MODE

Figure 1:
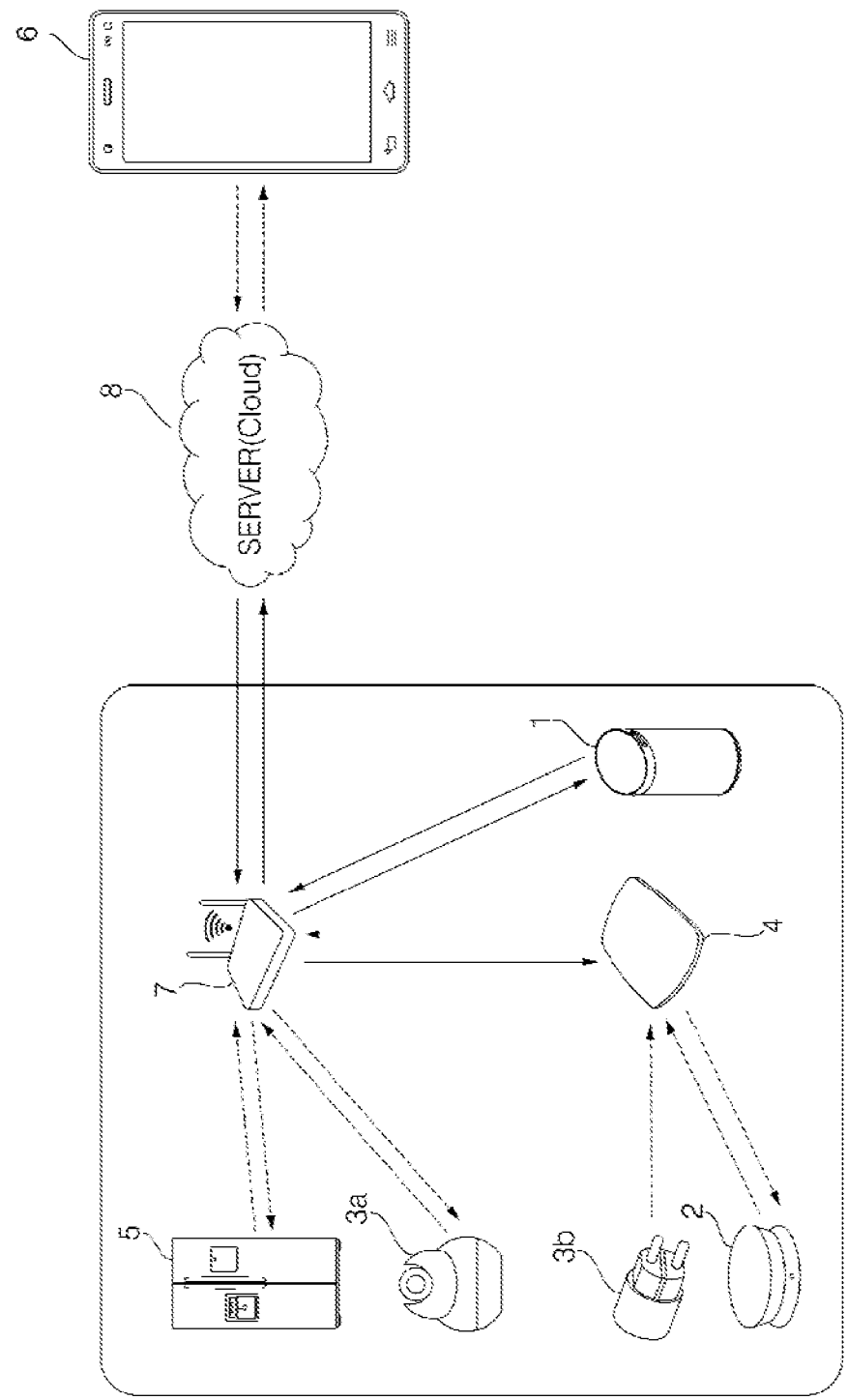
FIG. 1 illustrates a home network system according to an embodiment of the present invention.

The advantages and features of the present invention and the way of attaining them will become apparent with reference to embodiments described below in detail in conjunction with the accompanying drawings. The present invention, however, are not limited to the embodiments disclosed hereinafter and may be embodied in many different forms. Rather, these exemplary embodiments are provided so that this disclosure will be through and complete and will fully convey the scope to those skilled in the art. The scope of the present invention should be defined by the claims. Throughout the specification, the same or similar elements are denoted by the same reference numerals.

In addition, the terms "first", "second", and the like, when used in the claims, are given in the order described in the claims, and when the same words are written after the terms, these terms are merely intended to distinguish the corresponding elements from each other, and do not become proper nouns through combination with the words. Thus, it is noted that a constituent element, to which the term "first", "second", or the like is given, should be understood through the limitations set forth in the claims and the detailed description of the invention.

FIG. 1 illustrates a home network system according to an embodiment of the present invention.

A network system is a collection of devices that establish a network through mutual communication within a certain space, such as a home or an office. As one embodiment of such a network system, FIG. 1 illustrates a home network system built in a home.

Referring to FIG. 1, the network system according to the embodiment of the present invention may include accessories 2, 3a and 3b, a gateway 4, an access point 7, and a hub 1.

The accessories 2, 3a and 3b, the gateway 4, the access point 7, and/or the hub 1 may communicate with each other according to a predetermined communication protocol, and this communication may be realized based on technologies, such as Wi-Fi, Ethernet, ZigBee, Z-wave, and Bluetooth.

"Wi-fi" is originally a trademark of the Wi-Fi Alliance, but is a term that has come to be commonly used to refer to wireless communication technology. "Wi-Fi" refers to a series of technologies that support wireless LAN (WLAN) connection between devices according to the general rules defined by the WLAN standard (IEEE 802.11), device-to-device connection (Wi-Fi P2P), wireless LAN connectivity, and PAN/LAN/WAN configurations. Hereinafter, the term "Wi-Fi module" is defined as a device that performs wireless communication based on Wi-Fi technology.

"Ethernet" is a networking technology according to the Institute of Electrical and Electronics Engineers (IEEE) 802.3 standard, and is the most representative standard for local area network (LAN) hardware, protocols, and cables. "Ethernet" mainly uses Carrier Sense Multiple Access with Collision Detection (CSMA/CD) for data transmission. Hereinafter, the term "Ethernet module" is defined as a device that performs communication based on Ethernet technology.

"ZigBee" is a wireless network technology for configuring a private communication network using a small, low-power digital radio and performing communication using the network, and is a communication method conforming to the rules defined by the IEEE 802.15. Owing to its small size, low power consumption, and low cost, "ZigBee" is in the limelight as a solution for establishing ubiquity, such as a home network, and is utilized for intelligent home networks, telecommunication of a local area network in a building or the like, industrial device automation, logistics, human interface, telematics, environmental monitoring, and military applications, for example.

The ZigBee protocol is composed of a physical layer, a media access control (MAC) layer, a network layer, and an application layer. The physical layer and the MAC layer of ZigBee are defined in the IEEE 802.15.4 standard.

A ZigBee network layer supports routing and addressing for a tri-structure and a mesh structure, and as an application profile, a ZigBee home network public profile and a ZigBee smart energy profile are representatively used. In addition, "RF4CE", which is a new ZigBee specification, defines a simple network stack for star topology and a solution for remote control of home appliances. "RF4CE" uses a 2.4 GHz frequency band, and provides security using AES-128.

"ZigBee" is mainly used in fields in which a low transmission rate is sufficient and a long battery life and security are required, and is suitable for periodic or intermittent data transmission, or data transmission for simple signal transmission of, for example, sensors and input devices. Examples of the applications fields thereof include wireless lighting switches, household watt-hour meters, traffic management systems, and other personal and industrial devices that require near-field low-speed communication. "ZigBee" has advantages in that it is relatively simple and inexpensive compared to other WPAN technologies, such as Bluetooth or Wi-Fi. Hereinafter, the term "ZigBee module" is defined as a device that performs wireless communication based on the ZigBee technology.

"Z-wave" is a wireless transmission scheme designed for devices that require low power and low bandwidth, such as home automation and sensor networks, and the main object thereof is to provide reliable communication between one or more nodes and control units in a wireless network. "Z-wave" is composed of a physical layer, a media access control (MAC) layer, a transmission layer, a routing layer, and an application layer, uses a 900 MHz band (Europe: 869 MHz and USA: 908 MHz) and a 2.4 GHz band, and supports speeds of 9.6 kbps, 40 kbps, and 200 kbps. Hereinafter, the term "Z-wave module" is defined as a device that performs wireless communication based on the Z-wave technology.

The accessory 2 may be installed at an arbitrary position desired by a user, and may include various sensors, such as a temperature sensor, a humidity sensor, a vibration sensor, a proximity sensor, and an infrared (IR) sensor. Information obtained by these sensors may be transmitted to the hub 1 through a network, and conversely, signals for controlling the sensors may be transmitted from the hub 1 to the accessory 2.

In addition, the accessory 2 may be configured to enable the remote control of peripheral home appliances located nearby. For example, the accessory 2 may include a transmission device that transmits an infrared signal in response to a control signal transmitted over the network.

Meanwhile, the infrared sensor may include a transmitter for emitting infrared light and a receiver for receiving the infrared light emitted from the transmitter when the infrared light is reflected by an object.

The access point 7 is a device that relays wireless equipment so as to be connected to the network, and connects a home network to the Internet. For example, a home appliance 5, the hub 1, and the accessory 3b may be connected to the access point 7 in a wired manner (e.g., Ethernet) or in a wireless manner (e.g., Wi-Fi).

The gateway 4 is a device that connects networks having different protocols to each other so that the networks may exchange information with each other. For example, the gateway 4 may relay the accessories 2 and 3b and the access point 7 by converting a ZigBee (or Z-wave) type signal received from the accessory 2 or 3b into a Wi-Fi type signal.

Meanwhile, the home network system may be connected to the Internet via the access point 7, and may be connected to a server 8 that provides a service through the Internet. The server (or cloud) 8 may be managed by a manufacturer who manufactures the accessories 2, 3a and 3b and/or the hub 1, a seller who sells the same, or a service provider who makes a contract with the manufacturer or the seller. The server 8 stores software and data, and the data may be received from a home network. When there is a request from the hub 1, the server 8 may transmit the stored software or data to the home network via the Internet.

The server 8 can exchange information with a mobile terminal, such as a personal computer (PC) or a smart phone connected to the Internet. The information transmitted from the hub 1 or the accessories 2, 3a and 3b may be stored in the server 8, and this information may be transmitted to the mobile terminal 6 connected to the server 8. In addition, the information transmitted from the mobile terminal 6 may also be transmitted to the hub 1 or the accessory 2, 3a and 3b by way of the server 8. Thus, the hub 1 and the accessories 2, 3a and 3b may be controlled by the mobile terminal 6.

Since a smart phone, which is a kind of mobile terminal 6 and has recently come to be widely used, provides a convenient graphic-based UI, it is possible to control the accessories 2, 3a and 3b or to process and display the information received from the accessories 2, 3a and 3b using the UI. In addition, by updating an application installed in the smart phone, the range of functions that may be implemented by the accessories 2, 3a and 3b may be expanded or changed. However, it may also be possible to control the accessories 2, 3a and 3b or to display the information received from the accessory 2, 3a and 3b using the hub 1 alone without using the mobile terminal 6.

The communication between the hub 1 and the accessories 2, 3a and 3b may be realized via the gateway 4 and the access point 7. Specifically, signals (or information) output from the accessories 2 and 3b may be transmitted to the hub 1 by way of the gateway 4 and the access point 7 in sequence, and conversely, the information output from the hub 1 may be transmitted to the accessories 2 and 3b by way of the access point 7 and the gateway 4 in sequence. In some embodiments, communication between the accessories 2, 3a and 3b and the hub 1 is possible even when the network is disconnected from the Internet.

In addition to the accessories 2, 3a and 3b described above, various kinds of accessories may be provided in some embodiments. For example, the accessory may be configured to include an air quality sensor that senses the quality of air, a smart plug, a CT sensor, Nest temperature controller, a sleep sensor, or the like.

The accessory may be attached to the home appliance 5. For example, an accessory having a vibration sensor may be attached to a washing machine to sense the vibration generated during the operation of the washing machine, and a signal output from the vibration sensor depending on the sensed vibration may be transmitted to the network.

Alternatively, the accessory may be attached to a place other than the home appliance 5. For example, when it is desired to detect the opening and closing of a door in a residence, an accessory having a motion detection sensor (e.g., an infrared sensor) may be attached to a wall surface to detect the opening and closing operation of the door. When the opening and closing operation of the door in the residence is not detected for a long period of time, there is a possibility that a resident has met with trouble, and information about this situation may be provided to a preset mobile terminal 6.

Additionally, in the case in which the accessory having the motion detection sensor is used to detect the operation of opening and closing of a refrigerator door and the operation of opening and closing of the refrigerator door is not detected for a long period of time, there is a possibility that the resident has met with trouble, and information about this situation may be provided to the preset mobile terminal 6.

In these various embodiments, a signal transmitted from the accessory over the network may be received by the mobile terminal 6, and an application mounted in the mobile terminal 6 may grasp information regarding the operating state of the home appliance 5 (e.g., the occurrence of unbalance of the washing machine) or the opening and closing of the door by analyzing the received signal. The information or the results derived by processing the information (e.g., a warning that indicates the abnormal operation of the washing machine, or a notice that asks to check the condition of the resident due to the absence of the opening and closing operation of the door for a long period of time) may be displayed on the display of the mobile terminal 6 or through the speaker.

Meanwhile, the hub 1 may include a microphone (not illustrated), and may extract a command from the voice input through the microphone according to a voice recognition program installed in advance therein and may perform control in response to the command.

Figure 2:
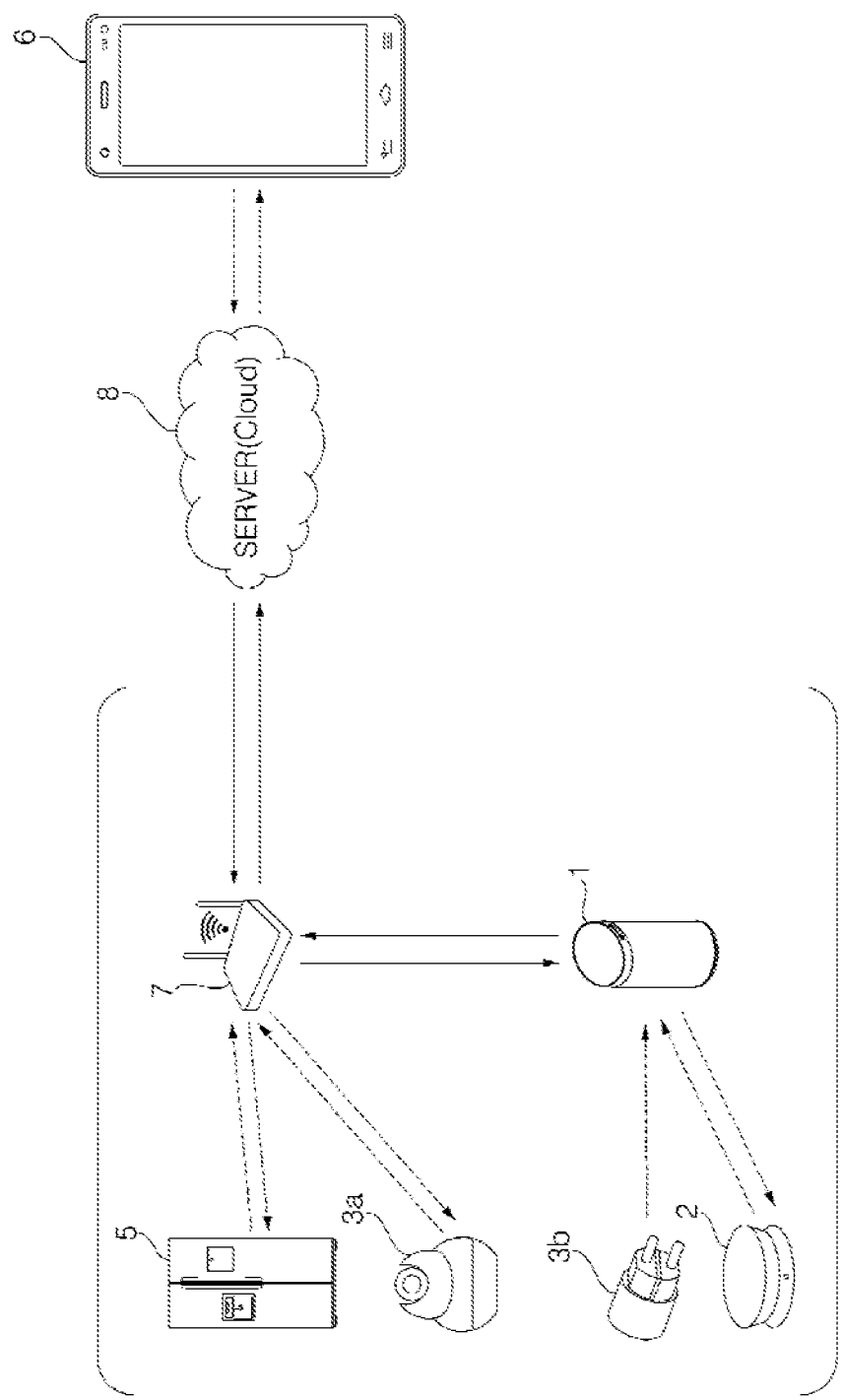
FIG. 2 illustrates a home network system according to another embodiment of the present invention.

FIG. 2 illustrates a home network system according to another embodiment of the present invention.

Compared with the above-described embodiment, the home network system according to another embodiment of the present invention has differences therewith in that the gateway 4 is not provided and in that the hub 1 additionally performs the function of the gateway 4, but the remaining features are substantially the same as those in the above-described embodiment.

The accessories 2 and 3b may communicate directly with the hub 1 without sharing the gateway 4 (see FIG. 1). The accessories 2 and 3b and the hub 1 may be in communication with each other via ZigBee. In this case, each of the accessories 2 and 3b and the hub 1 may include a ZigBee module.

Figure 3:
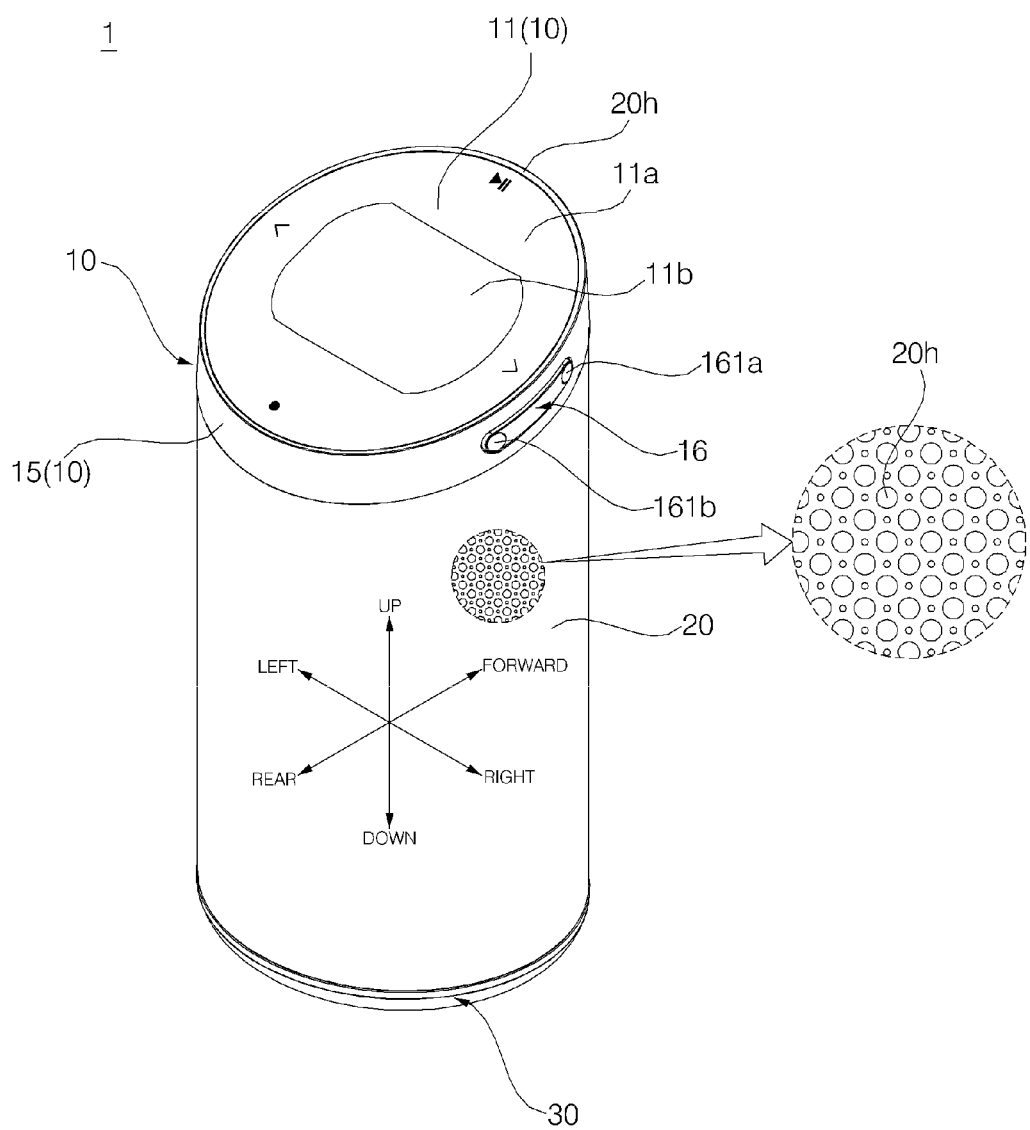
FIG. 3 is a perspective view illustrating a hub according to an embodiment of the present invention.
Figure 6A:
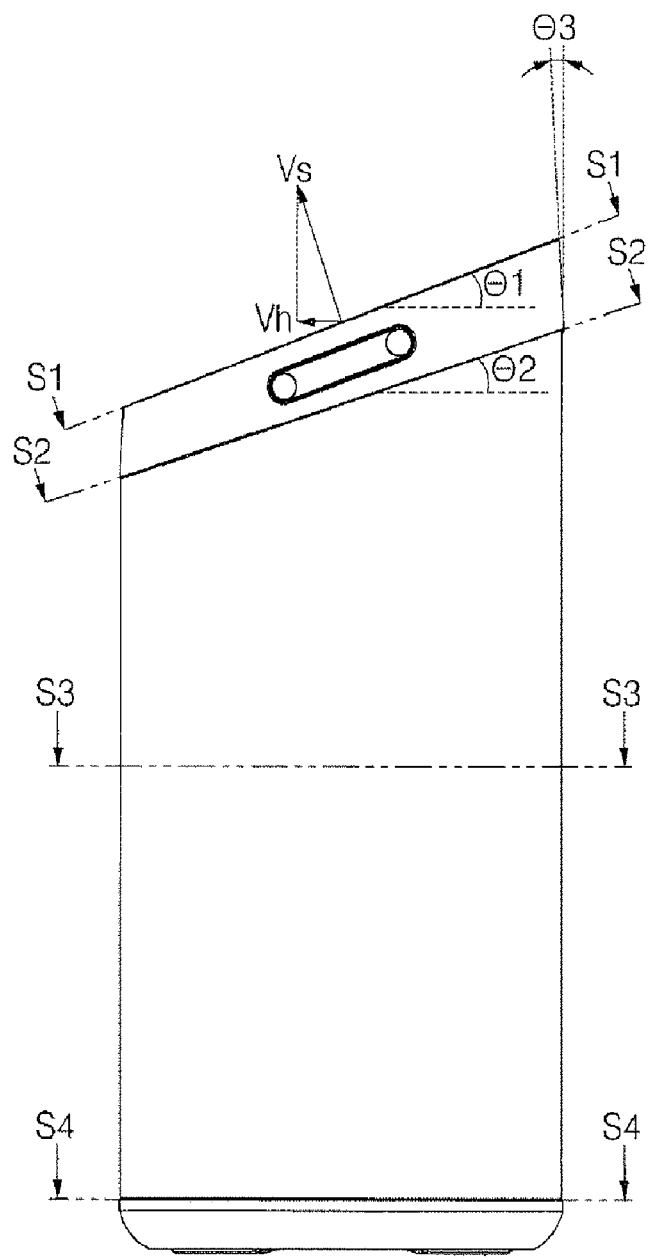
FIG. 6a is a right side view of the hub.
Figure 6B:
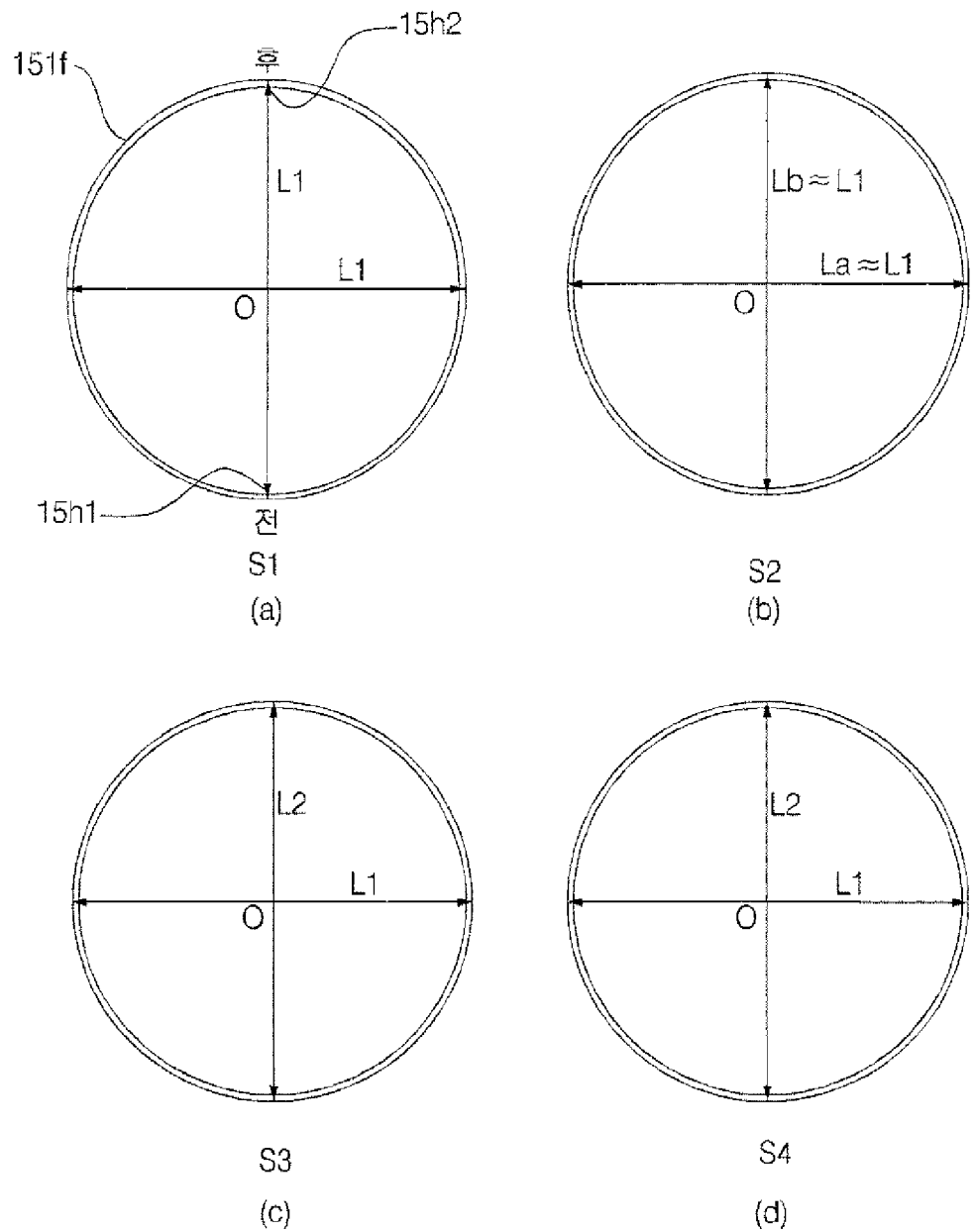
Figure 7:
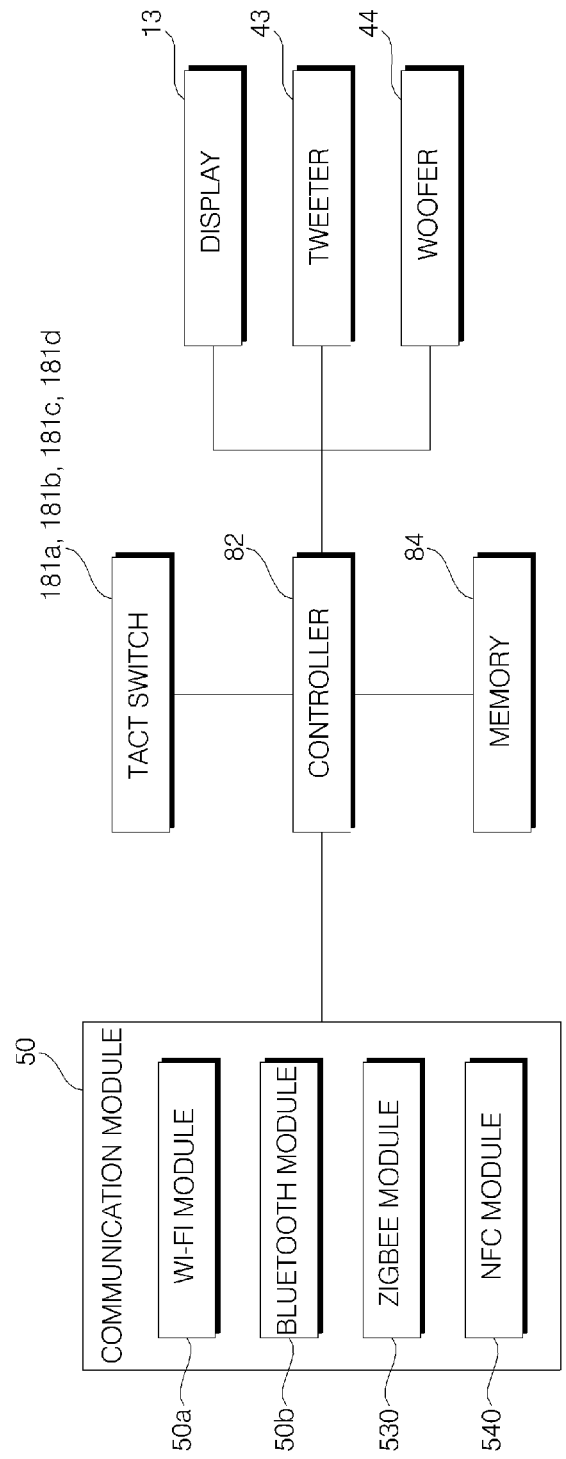
FIG. 7 is a block diagram illustrating the control relationship between major elements constituting the hub.
Figure 8:
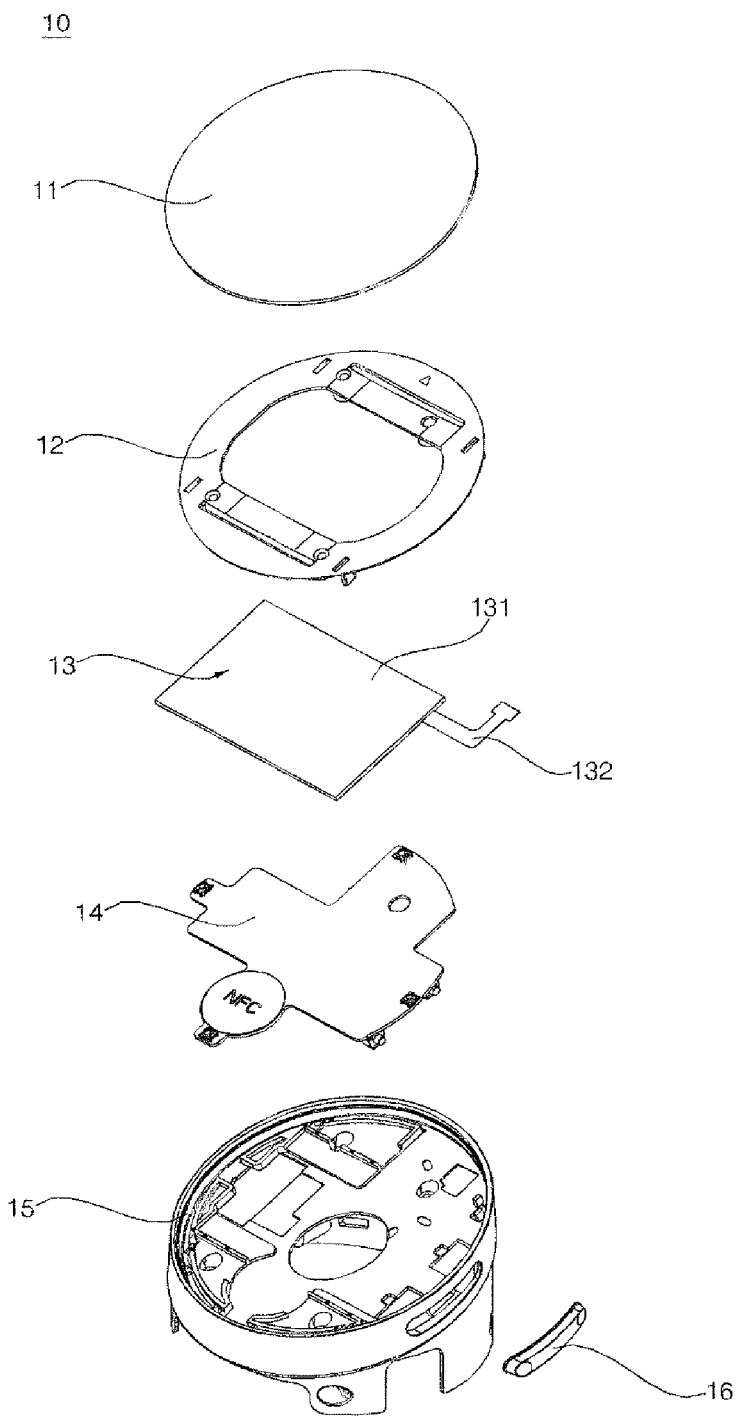
FIG. 8 is an exploded perspective view of a cover.
Figure 9:
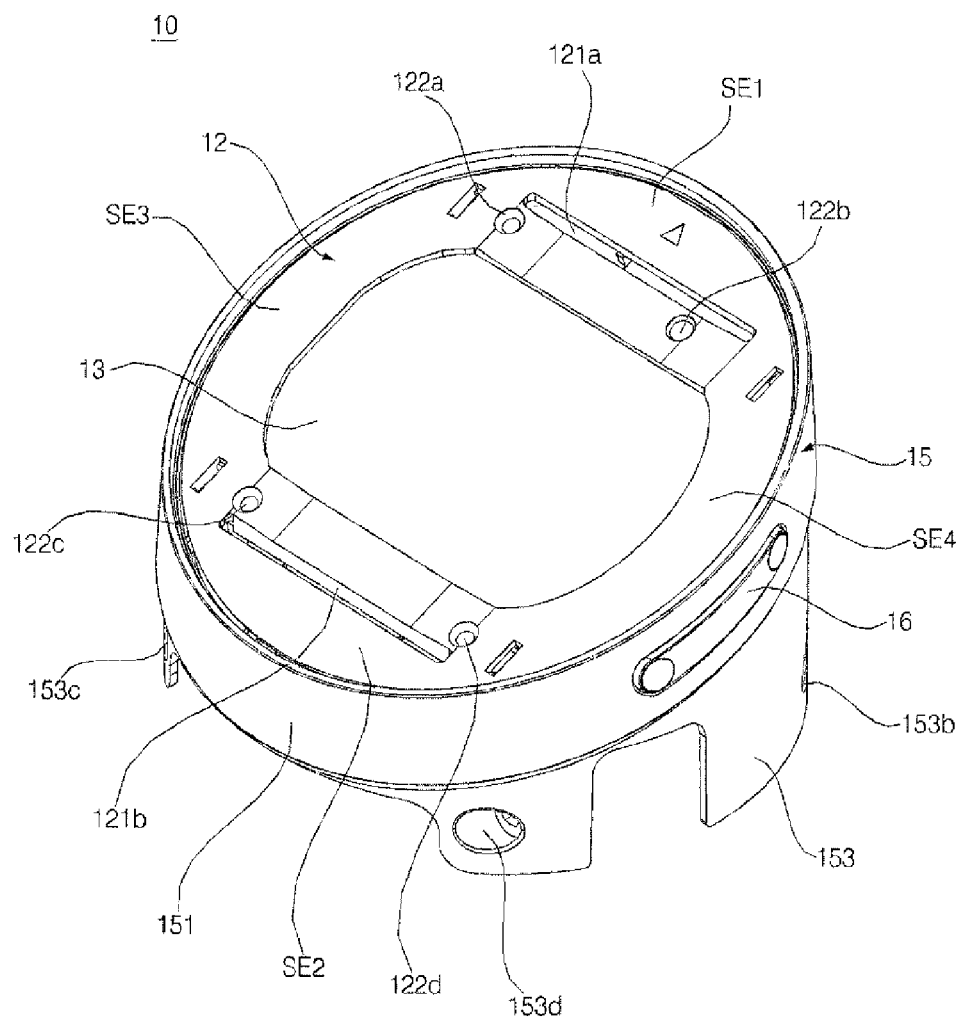
FIG. 9 illustrates the cover, from which a window is removed.

FIG. 3 is a perspective view illustrating a hub according to an embodiment of the present invention. FIG. Illustrates a front view (a) of the hub and a cross-sectional view (b) taken along line A1-A1 illustrated in (a). FIG. 5 illustrates an enlarged view of portions indicated by dotted lines in FIG. 4. FIG. 6a is a right side view of the hub. FIG. 6b illustrates cross-sectional views of a grille taken from the respective portions illustrated in FIG. 6a. FIG. 7 is a block diagram illustrating the control relationship between major elements constituti0ng the hub. FIG. 8 is an exploded perspective view of a cover. FIG. 9 illustrates the cover, from which a window is removed.

Referring to FIGS. 3 to 9, the hub 1 according to an embodiment of the present invention may include a cover 10, a hub body 40, a grille 20, and a hub base 30. The hub body 40 may be supported by the hub base 30 located thereunder, and the cover 10 may be coupled to the upper portion of the hub body 40.

The hub body 40 is disposed inside the grille 20. It is not necessary to completely dispose the entire hub body inside the grille 20, and as in the embodiment, a portion of the hub body 40 may protrude through the upper end of the grille 20. The grille 20 is formed with multiple through-holes 20h, has a vertically elongated cylindrical shape, and surrounds the hub body 40.

A porous filter (not illustrated) may be attached to the inner surface of the grille 20 to prevent dust from entering the grille 20 through the through-holes 20h. The filter may be formed of a material having fine pores, such as a mesh or a nonwoven fabric. The filter may be attached to the inner surface of the grille 20 by an adhesive member, such as a piece of double-sided tape. The filter also serves to conceal speakers 43 and 44 and body cases 41 and 42, which are disposed inside the grille 20, from being visible from the outside through the through-holes 20h.

In FIG. 3, the through-holes 20h are formed in a portion of the grille 20 and are omitted in the remaining portions, but this omission is merely to prevent the drawing from being complicated. The through-holes 20h may be formed in the greater part of the area of the grille 20 (see FIG. 38) so that sound output from the speakers 43 and 44, which will be described below, may spread evenly through the through-holes 20h in all of the front, rear, left, and right directions.

The cover 10 may include a window 11, a window base 12, a display 13, a display printed circuit board (PCB) 14, and a cover housing 15. The window 11, the window base 12, the display 13, and the display PCB 14 may be disposed within the cover housing 15.

Figure 4:
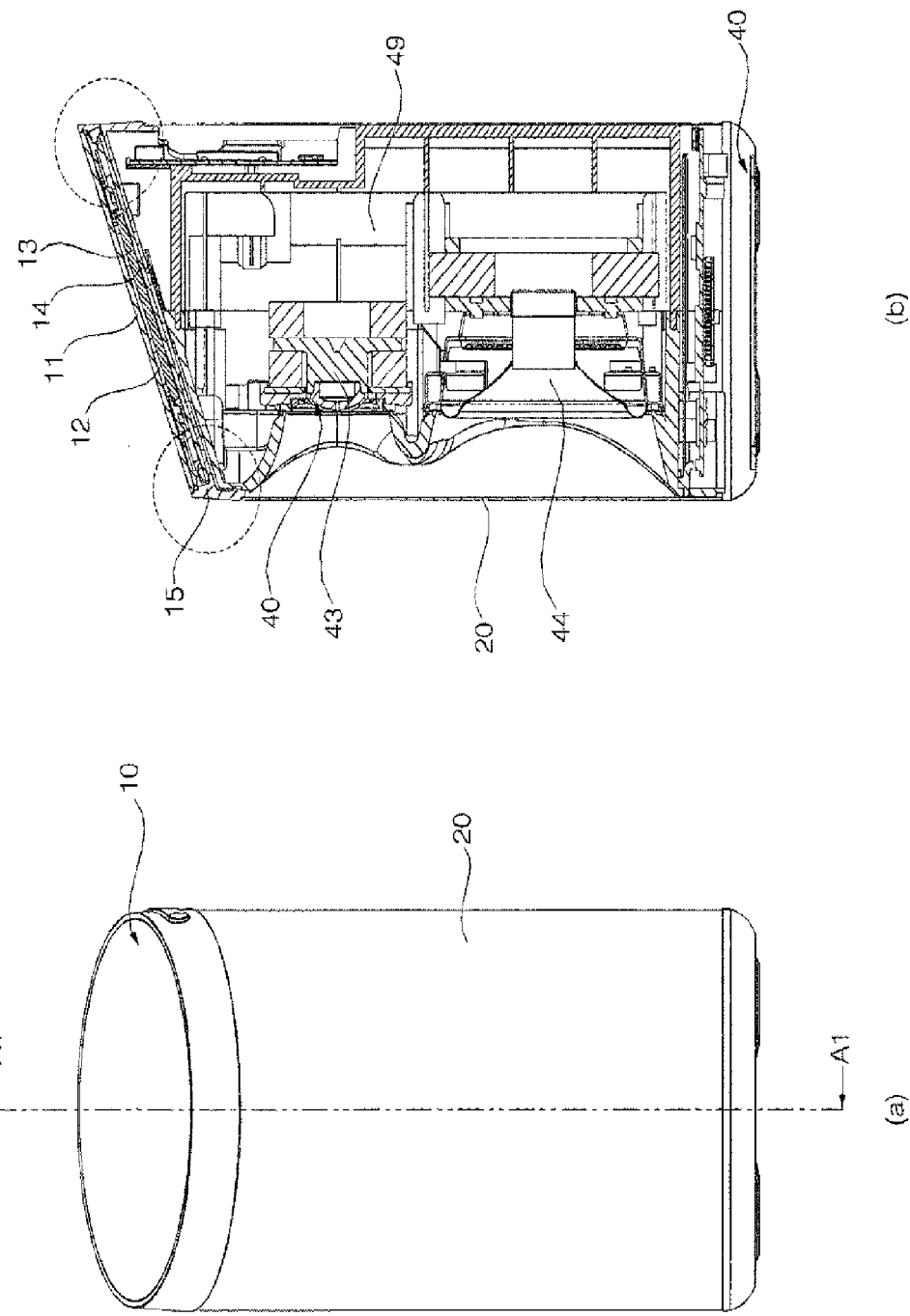
FIG. 4 illustrates a front view (a) of the hub and a cross-sectional view (b) taken along line A1-A1 illustrated in (a).
Figure 5:
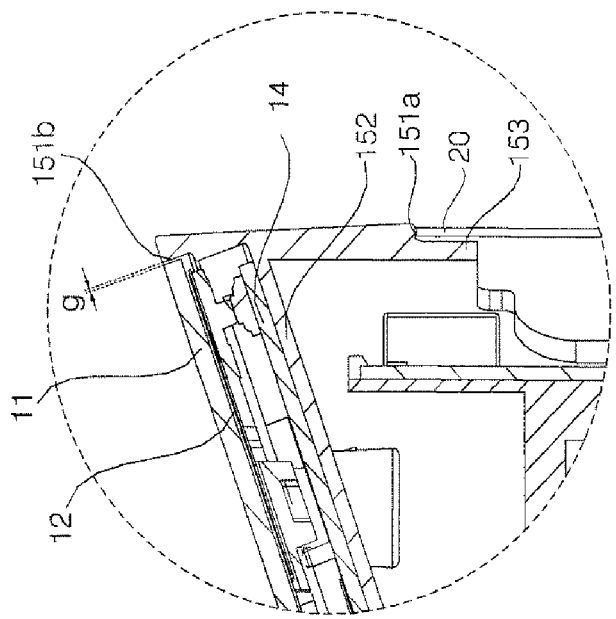
FIG. 5 illustrates an enlarged view of portions indicated by dotted lines in FIG. 4.
Figure 5:
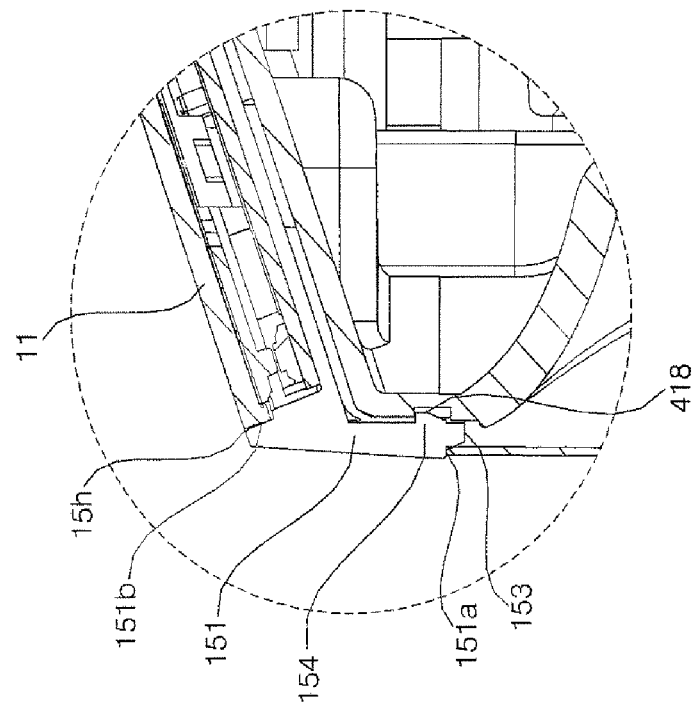

Referring to FIGS. 4 and 5, the cover housing 15 is formed of a synthetic resin, is coupled to the upper portion of the hub body 40, and has an opening 15h formed in the upper surface thereof. The cover housing 15 may include a sidewall 151, which has a cylindrical shape and has an upper end defining the opening 15h, and a partition plate 152, which extends from the inner surface of the sidewall 151 to divide the inside of the sidewall 151 into upper and lower regions. The display PCB 14, the display 13, the window base 12, and the window 11 are disposed above the partition plate 152 (see FIGS. 19 and 20 for a detailed configuration of the cover housing 15).

A lower end 151a of the sidewall 151 may be in contact with the upper end of the grille 20, but a fine clearance due to a tolerance may exist therebetween. When viewed from above, at least a portion of the lower end 151a of the sidewall 151 may overlap the upper end of the grille 20. A gap exists between the outer surface of the sidewall 151 and the outer surface of the grille 20, but the outer surface of the sidewall 151 and the outer surface of the grille 20, excluding the gap, form a unitary continuous outer contour as a whole.

An upper end holding portion 153 extends downwards from the lower end 151a of the sidewall 151 and is coupled to the grille 20. This coupling of the upper end holding portion 153 and the grille 20 does not use a separate fastening member, such as a bolt, but is performed in a manner such that the upper end holding portion 153 is inserted (or fitted) into an opening in the upper end of the grille 20. This coupling may be interference-fit using the elasticity and restoration force of the grille 20 or the upper end holding portion 153.

The upper end holding portion 153 is located inside the lower end portion of the sidewall 151 (i.e. the outer surface of the cover housing 15 is recessed in the lower end 151a of the sidewall 151 so as to form the outer surface of the upper end holding portion 153). Thus, the lower end of the sidewall 151 is formed with a surface that extends from the outer surface of the sidewall 151 to the upper end holding portion 153 so as to face the upper end of the grille 20.

The cover housing 15 may be provided with a protrusion 154, which protrudes from the inner surface of the sidewall 151, and a protrusion insertion groove 418 may be formed in the front surface of the hub body 40 so that the protrusion 154 is coupled into the protrusion insertion groove. In the process of assembling the cover housing 15 and the hub body 40 with each other, the protrusion 154 moves along the outer surface of the hub body 40, and when it reaches the protrusion insertion groove 418, is inserted into the protrusion insertion groove 418 by the elasticity of the hub housing 15, which is formed of a synthetic resin.

Through the contact between the outer surface of the upper end holding portion 153 and the inner surface of the grille 20, the shape of the upper end of the grille 20 is maintained. In particular, in the case in which the grille 20 is formed of a metal material, the grille 20 is deformed so as to correspond to the shape of the upper end holding portion 153, and therefore, the upper end of the grille 20 may remain in a shape that corresponds to that of the upper end holding portion 153.

On the other hand, in the case in which the upper end holding portion 153 extends in an elliptical shape along the lower end 151a of the sidewall 151, after forming the cylindrical grille 20 having a circular cross-sectional shape by rolling a metal plate, the upper end of the grille 20 is fitted into the upper end holding portion 153. In this way, the shape of the grille 20 may also be deformed into an elliptical shape so as to correspond to the shape of the upper end holding portion 153, and may be maintained in the deformed state.

As in the embodiment, in the case in which the circular window 11 having a radius r is tilted at a predetermined angle (denoted by θ1 in FIG. 6A and being an acute angle, hereinafter also referred to as a "first angle") relative to a predetermined horizontal plane, and in which a vector Vh, which is obtained by orthogonally projecting a normal vector Vs to the upper surface of the window 11 onto the horizontal plane, faces forwards, the shape of the window 11 orthogonally projected onto the horizontal plane takes the form of an ellipse having a short radius of r cos θ1 in the longitudinal direction and a long radius of r in the transverse direction. Thus, for a sense of unity of the external appearance of the hub 1, the cross section of the grille 20 may also have a shape corresponding to an ellipse (i.e., a shape in which the ratio of a short radius to a long radius is cos θ1:1), and the upper end holding portion 153 may be formed into a shape corresponding to the ellipse, so that the cross-sectional shape of the grille 20 may be maintained so as to correspond to the ellipse.

Here, the angle θ1, at which the window 11 is tilted relative to the horizontal plane, is determined in consideration of the line of sight of the user in a general use environment. In the case in which the hub 1 is placed on a cradle having a height of about 1 m, such as a kitchen counter or a dining table, the angle is determined such that the line of sight of a general adult who is located in front of the hub 1 forms an angle close to 90 degrees with the upper surface of the window 11. The angle may be approximately 20 degrees, without being necessarily limited thereto.

On the other hand, a display panel 131 may be disposed so as to be tilted at a predetermined angle relative to the horizontal plane so that a displayed screen faces forwards and upwards. The display panel may be tilted at the same angle θ1 as the window 11. A window support plate 121, which will be described below, is also tilted at the same angle as the display panel 131 (or the window 11).

More specifically, referring to FIGS. 6a and 6b, the upper end of the sidewall 151 of the cover housing 15 takes the form of a circle having an outer diameter L1, and the lower end 151a of the sidewall 151 is tilted at an angle θ2 (θ2<θ1, hereinafter also referred to as a "second angle") relative to the horizontal plane to have a shape having a diameter La in the transverse direction and a diameter Lb in the longitudinal direction. Here, since the outer surface of the sidewall 151 is tilted at a predetermined angle θ 3 relative to the vertical line, the shape of a cross section S1 of FIG. 6b orthogonally projected onto the horizontal plane and the shape of a cross section S2 orthogonally projected onto the horizontal plane do not exactly coincide with each other, but "La" has a value close to "L1" as long as "θ3" is sufficiently small (more particularly, 5 degrees or less), and hence it is assumed hereinafter that La=L1. Moreover, "Lb" also has a value close to "L1" as long as the difference between "θ1" and "θ2" is sufficiently small (more particularly, 5 degrees or less), and hence it is assumed hereinafter that Lb=L1.

Here, "θ3" is an angle formed by the outer surface of the sidewall 151 and the vertical line. The angle θ3 may have a constant value across the entire outer surface of the sidewall 151, but may be variable along the circumference of the sidewall 151.

Referring to cross sections S3 and S4 of FIG. 6b, the grille 20 has an elliptical shape (L1>L2) having a long diameter L1 in the transverse direction and a short diameter L2 in the longitudinal direction. Here, assuming that La=L1 and Lb=L1 as described above, "L2" becomes L1 cos θ1. In other words, the contour of the grille 20 orthogonally projected onto the horizontal plane is an elliptical shape in which the diameter L2 in the longitudinal direction is shorter than the diameter L1 in the transverse direction. Even when the window 11 is disposed so as to be tilted, the entire window has an elliptical contour having a sense of unity, when the hub 1 is viewed from above.

Although the sidewall 151 is located above the grille 20, and therefore defines the external appearance of the hub 1, the upper end holding portion 153 is completely inserted into the grille 20 and is covered by the grille 20, so that it is not visible from outside the hub 1.

A positioning protrusion 156 may protrude from the lower end of the sidewall 151, and a positioning groove 26 (see FIG. 38) may be formed in the upper end of the grille 20 such that the positioning protrusion 156 (see FIG. 21) is inserted into the positioning groove in the state in which the grille 20 is correctly positioned.

The window 11 may be disposed in the opening 15h in the cover housing 15. The window 11 is formed by processing a transparent plate having a constant thickness, and the side surface (or the outer peripheral surface) thereof is orthogonal to the upper surface and the lower surface thereof.

In the inner surface of the cover housing 15, a certain portion that extends downwards from the upper end of the cover housing 15 is parallel to the direction that the upper surface of the window 11 faces (i.e., the direction that the normal vector Vs in FIG. 6a faces). The upper end portion inner surface 151a of the sidewall 151 defines the opening 15h, and thus, hereinafter, the upper end portion inner surface 151a of the sidewall 151 is referred to as an opening defining surface. The opening defining surface 151a is formed in a cylindrical shape so as to extend from the periphery of the opening 15h, and the window 11 is disposed inside and is surrounded by the opening defining surface 151a. The upper surface of the window 11 may be within the same plane as the upper end of the cover housing 15 (or the plane in which the opening 15h is provided), so that a sense of unity is created as if the upper surface of the hub 1 were formed of a single planar piece of material.

The opening defining surface 151a is formed in a plane parallel to the vector Vs at any position. That is, even if the cover housing 15 is cut along an arbitrary plane parallel to the vector Vs, the opening defining surface 151a is parallel to the vector Vs on the cross section.

Since the opening defining surface 151a is parallel to the side surface of the window 11, when the center of the window 11 and the center of the opening defining surface 151a are aligned along the vector Vs, it is possible to maintain a constant gap g between the opening defining surface 151a and the entirety of the side surface of the window 11. When the hub 1 is viewed from above, the gap g is maintained between the window 11 and the upper end of the cover housing 15, so that the completeness of a finished product appears high. The gap g may be set to the minimum under the condition in which the side surface of the window 11 does not interfere with the opening defining surface 151a when the window 11 is pressed in order to operate tact switches 181a, 181b, 181c and 181d.

When the cover housing 15 is cut along an arbitrary vertical plane, the outer surface of the sidewall 151 may be parallel to the normal vector Vs on the cut plane, or may be gradually spaced farther apart from the normal vector Vs when moving downwards. When the cover housing 15 is injection-molded, the cover housing 15 is taken out vertically downwards from a first mold that is used to form the sidewall 151. Therefore, in order for the cover housing 15 to be easily separated from the first mold, the outer surface of the sidewall 151 needs to have the above-described shape.

On the other hand, in order to form the opening 15h in the upper surface of the cover housing 15, a separate second mold having a core to be inserted into the opening 15h is required. The cover housing 15 may be separated from the second mold by moving the second mold once the first mold has been removed. At this time, the second mold is moved in the same direction as the normal vector Vs.

Figure 10A:
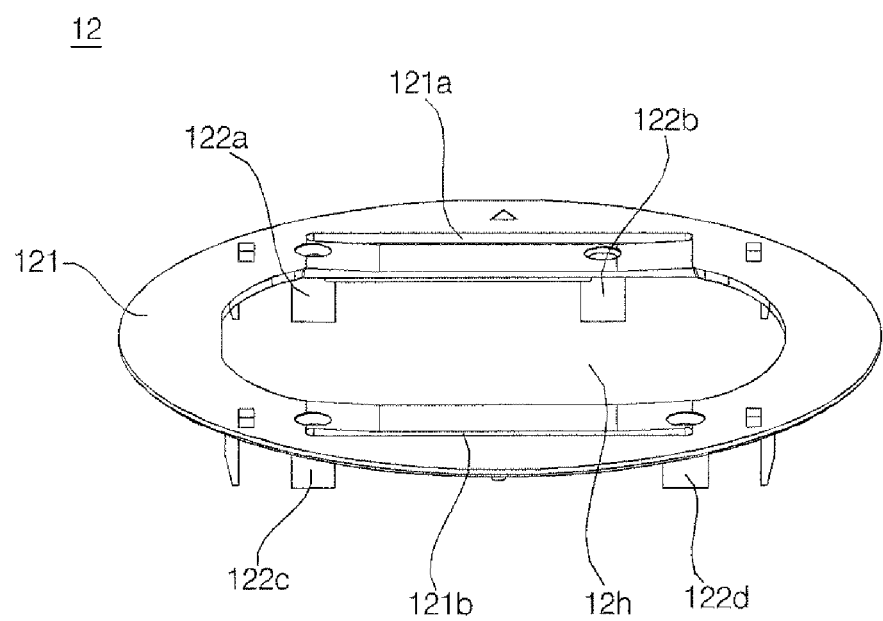
FIG. 10a is a perspective view illustrating the upper surface of a window base.
Figure 10B:
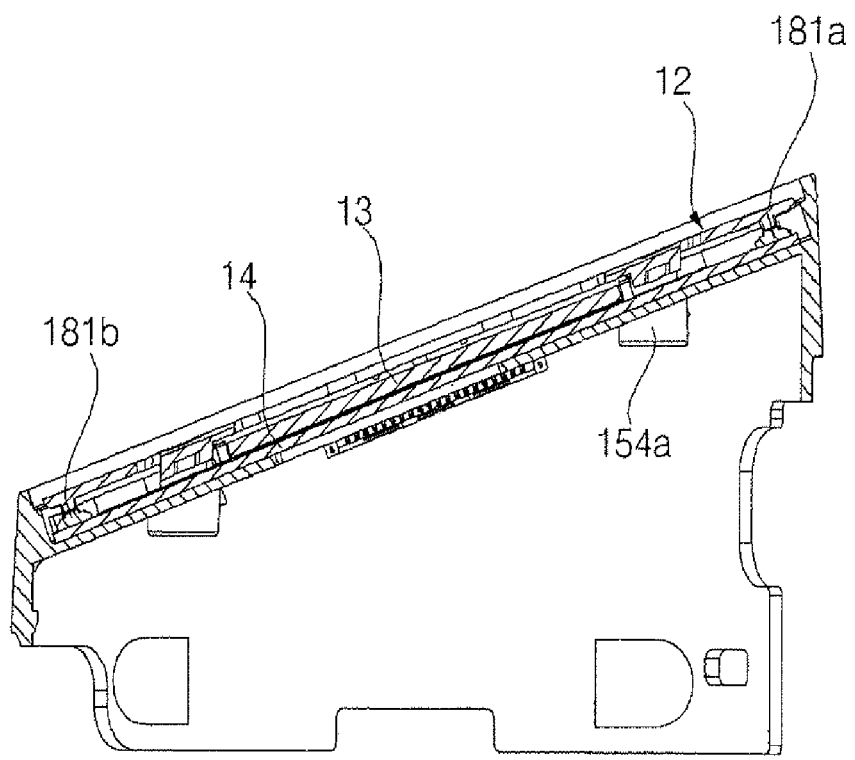
FIG. 10b is a perspective view illustrating the lower surface of the window base.
Figure 10C:
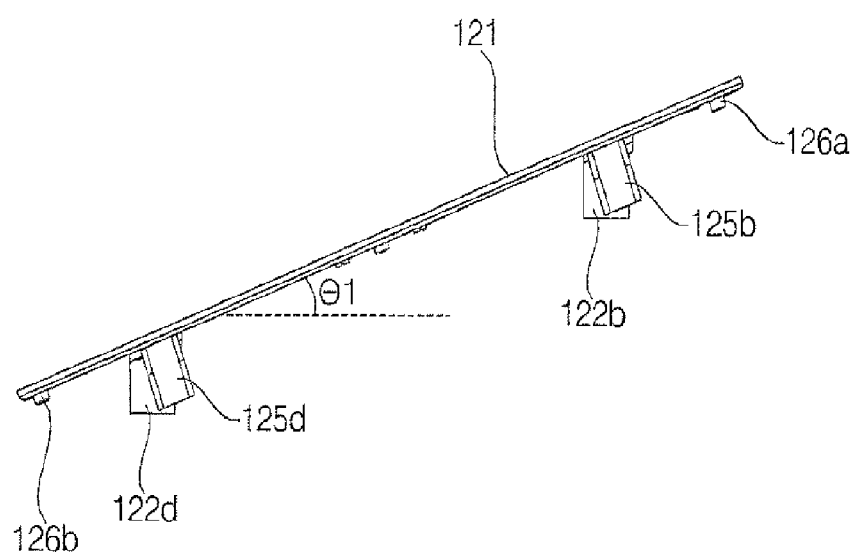
FIG. 10c is a right side view of the window base.
Figure 10D:
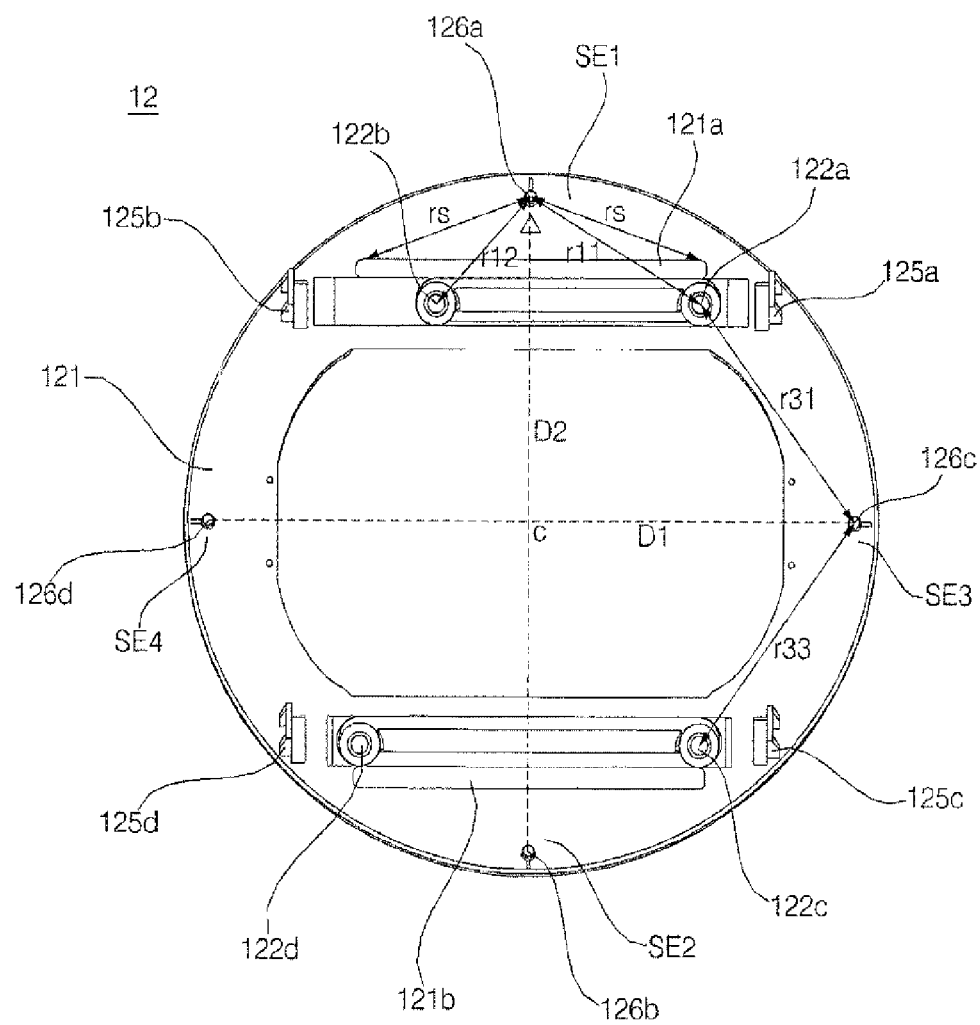
FIG. 10d is a bottom view of the window base.
Figure 11:
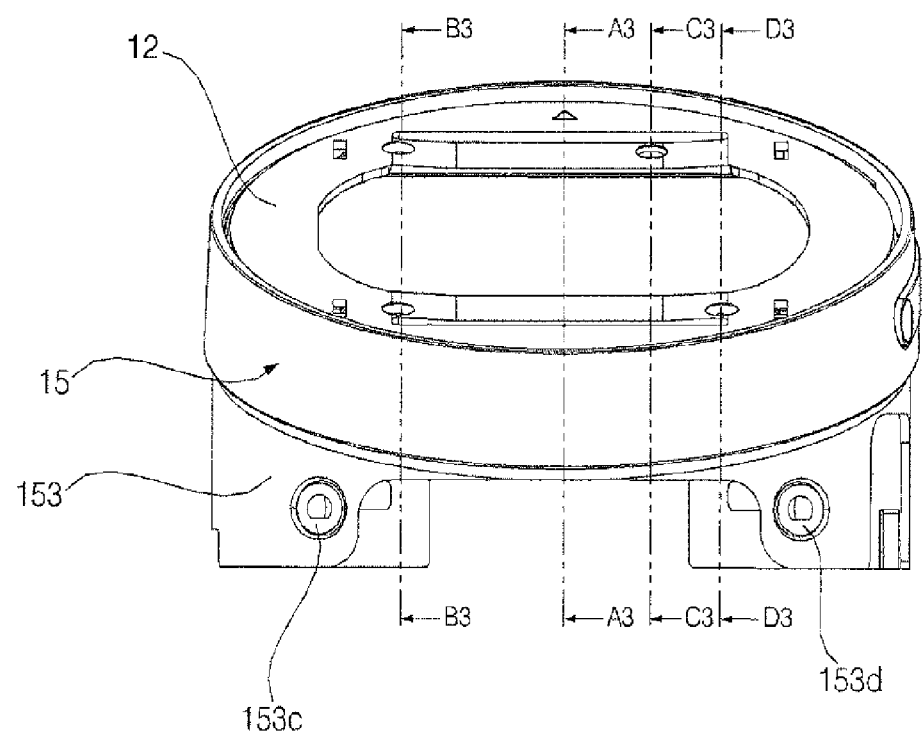
FIG. 11 illustrates the cover of FIG. 9 viewed from the front side.
Figure 12A:
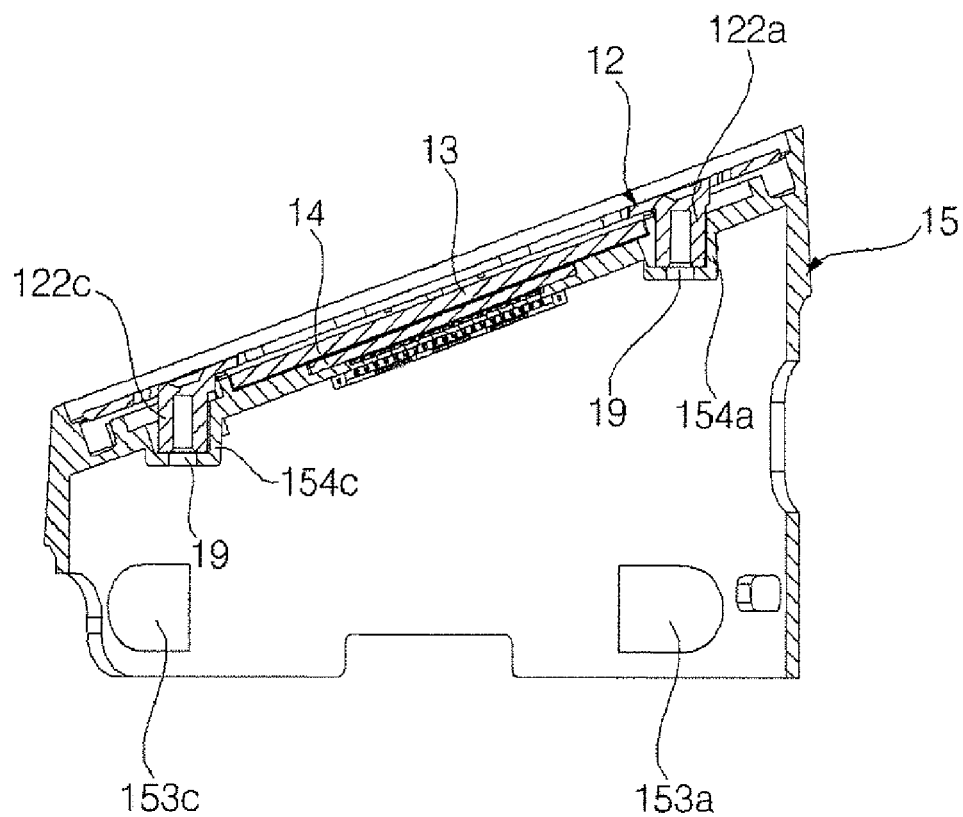
FIG. 12a is a cross-sectional view taken along line B3-B3 illustrated in FIG. 11.
Figure 12B:
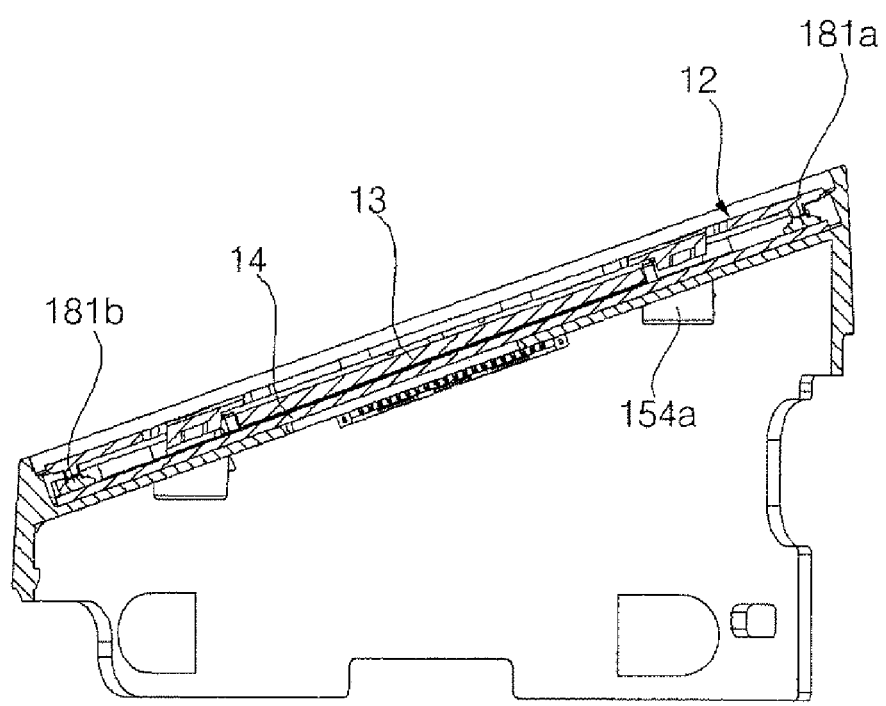
FIG. 12b is a cross-sectional view taken along line A3-A3 illustrated in FIG. 11.
Figure 12C:
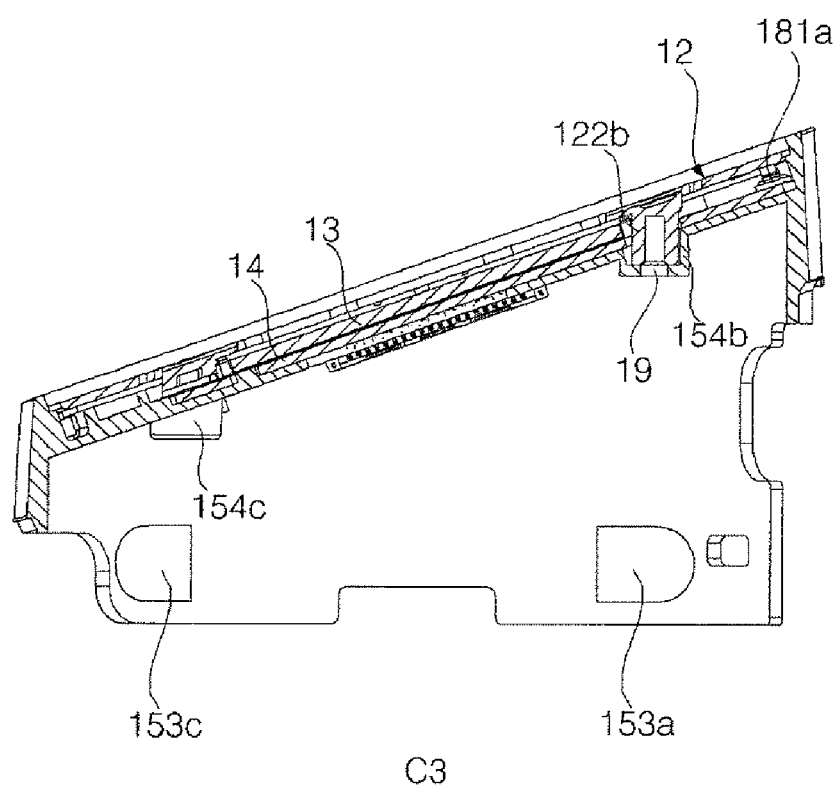
FIG. 12c is a cross-sectional view taken along line C3-C3 illustrated in FIG. 11.
Figure 12D:
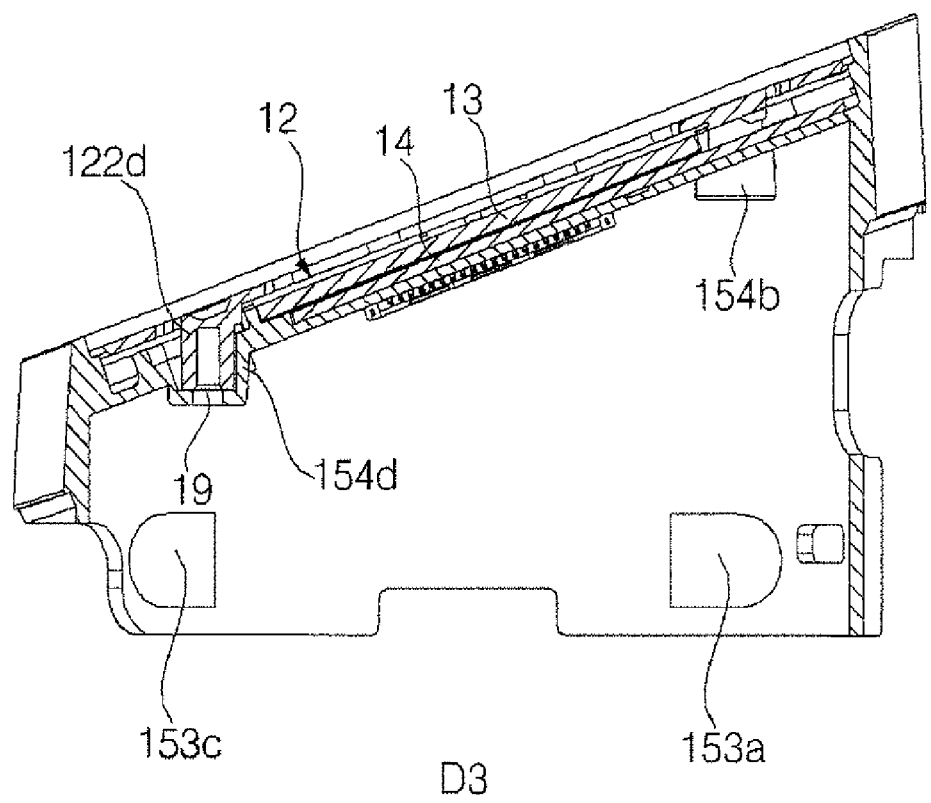
FIG. 12d is a cross-sectional view taken along D3-D3 illustrated in FIG. 11.
Figure 13:
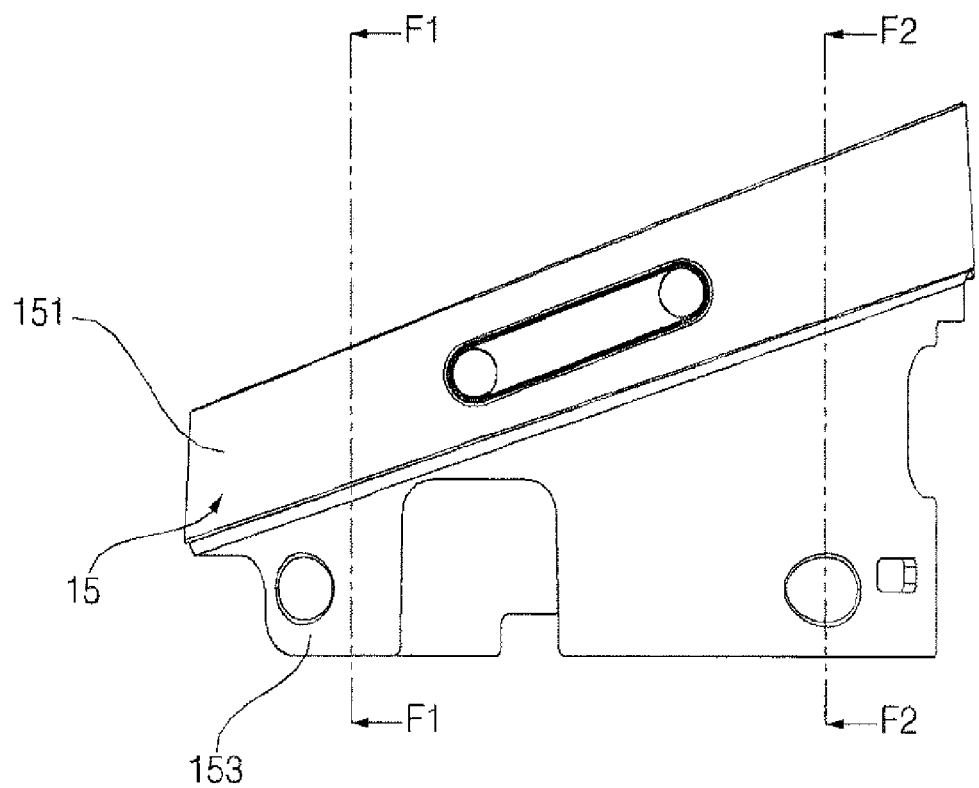
FIG. 13 is a right side view of the cover.
Figure 14A:
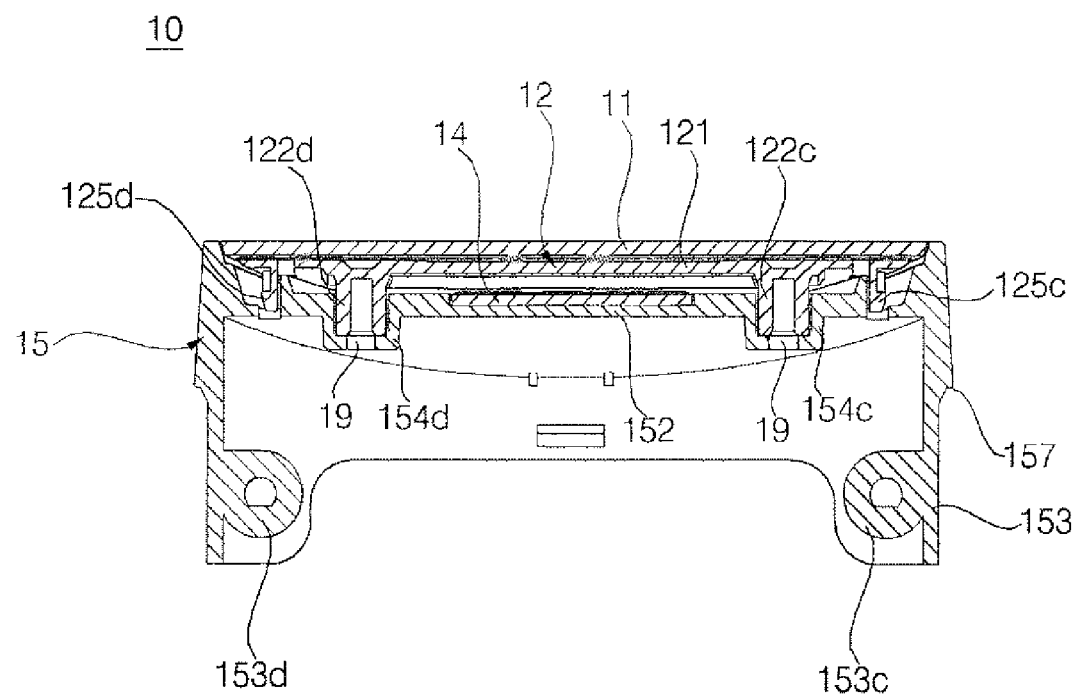
FIG. 14a is a cross-sectional view taken along line F1-F1 of FIG. 13.
Figure 14B:
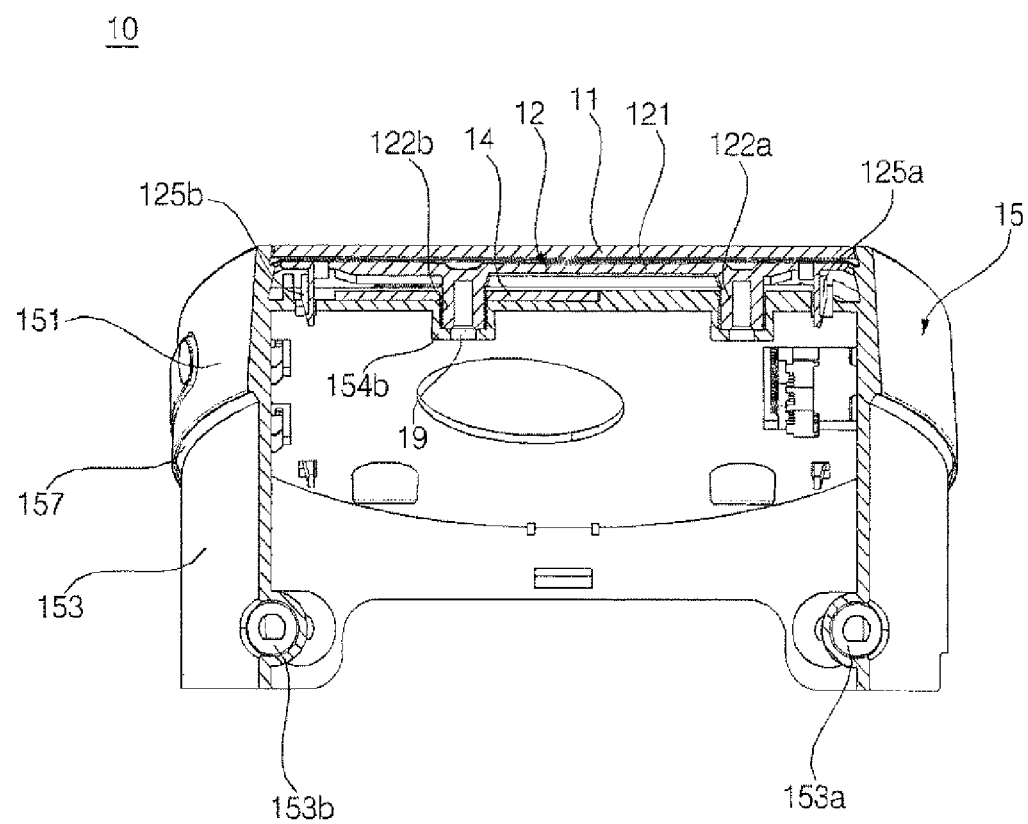
FIG. 14b is a cross-sectional view taken along line F2-F2 of FIG. 13.
Figure 15:
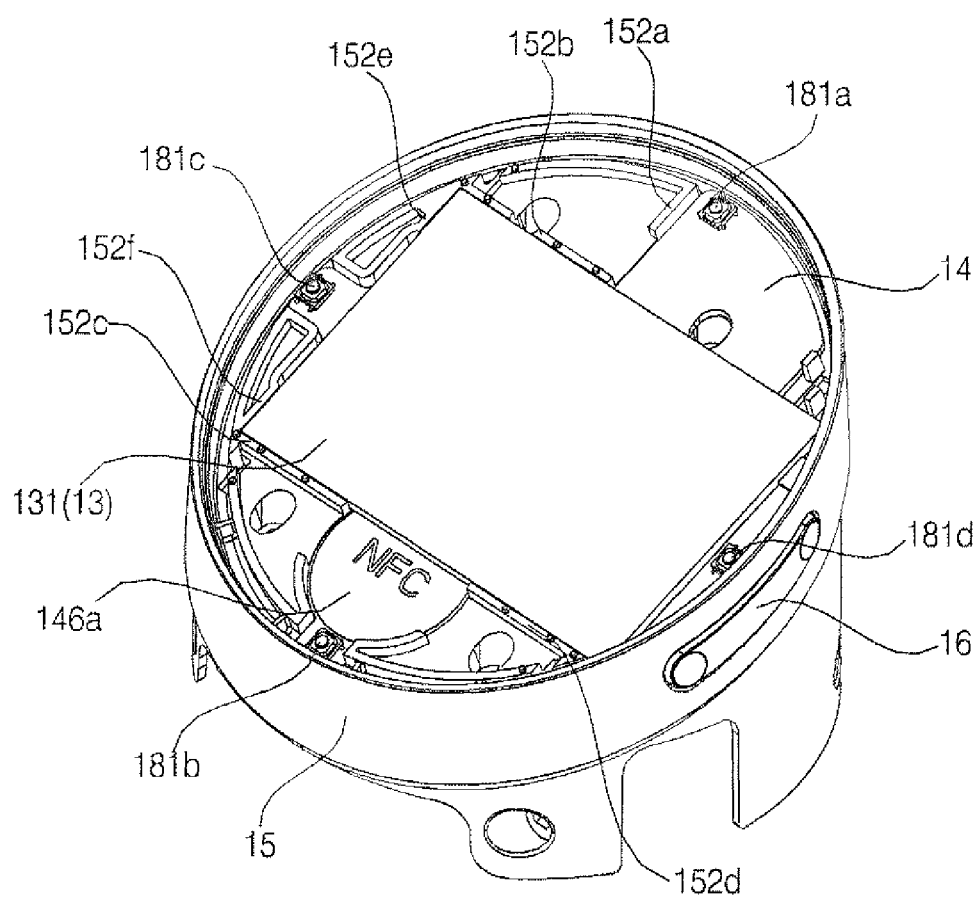
FIG. 15 illustrates the state in which the window base is removed from an assembly illustrated in FIG. 9.
Figure 16:
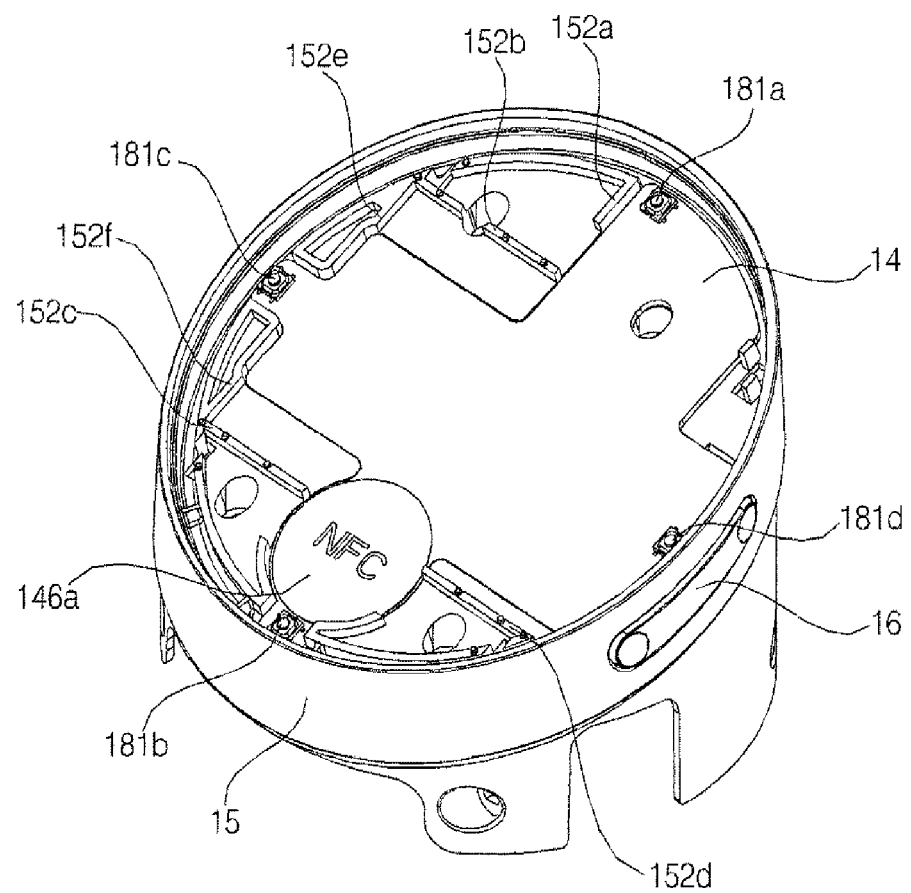
FIG. 16 illustrates the state in which a display is removed from an assembly illustrated in FIG. 15.
Figure 17:
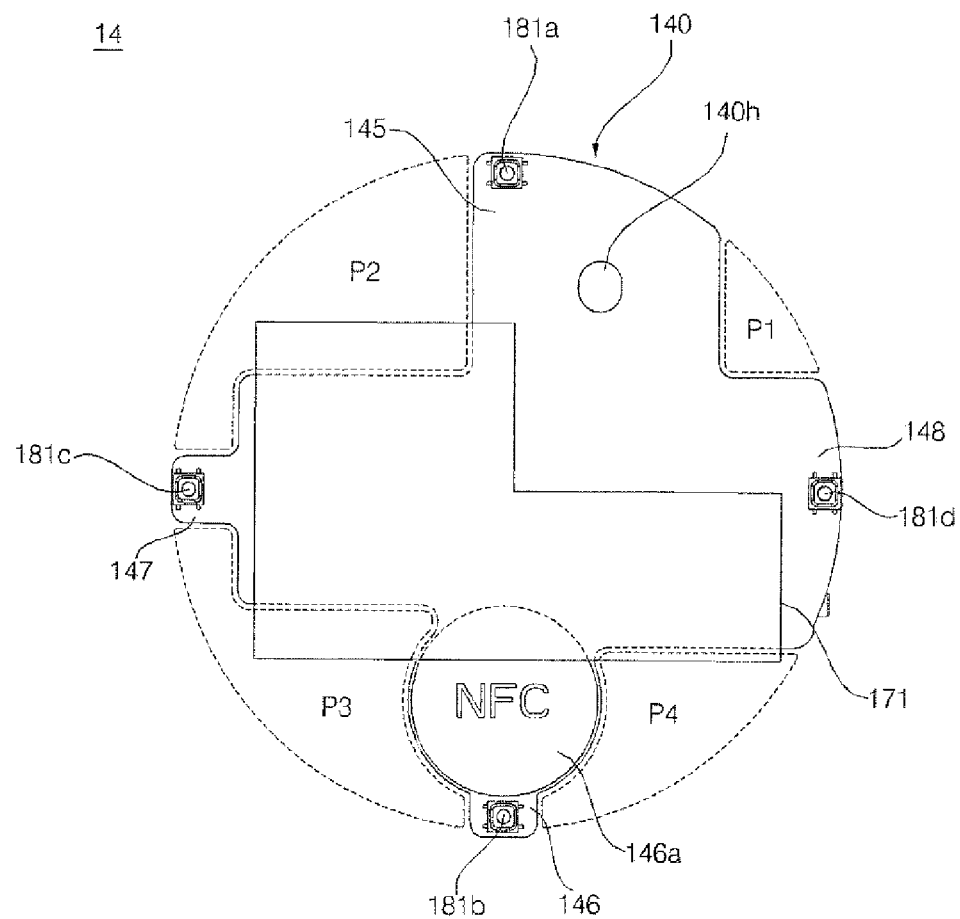
FIG. 17 is a plan view of a display PCB.
Figure 18:
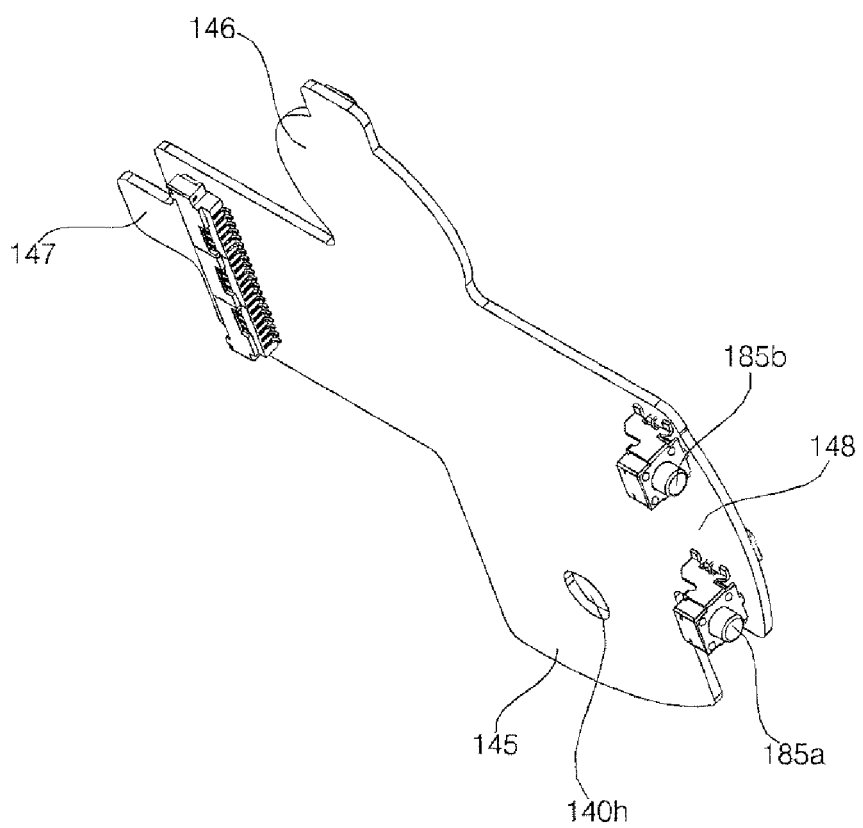
FIG. 18 is a perspective view illustrating the display PCB such that the lower surface thereof is seen.
Figure 19:
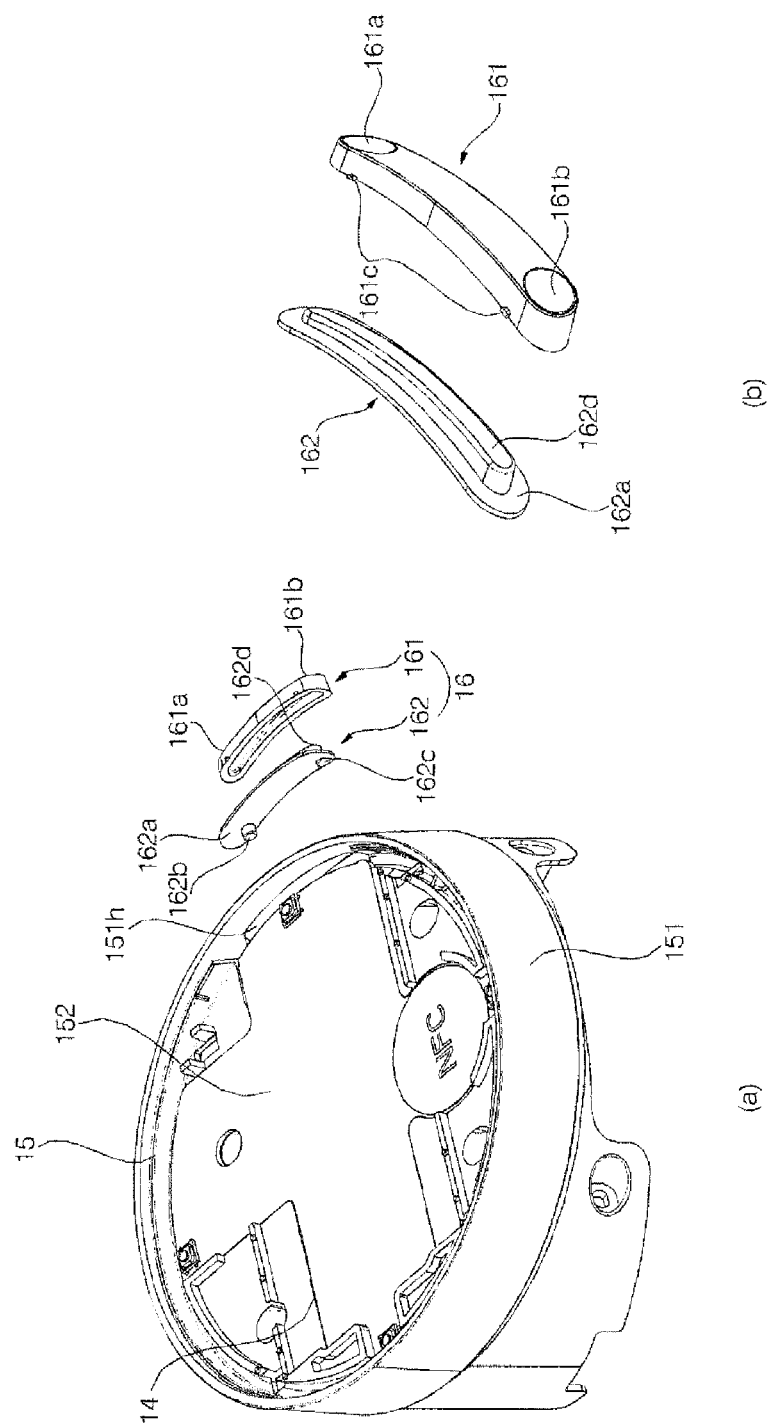
FIG. 19 is an exploded perspective view of the cover and a volume button.
Figure 20:
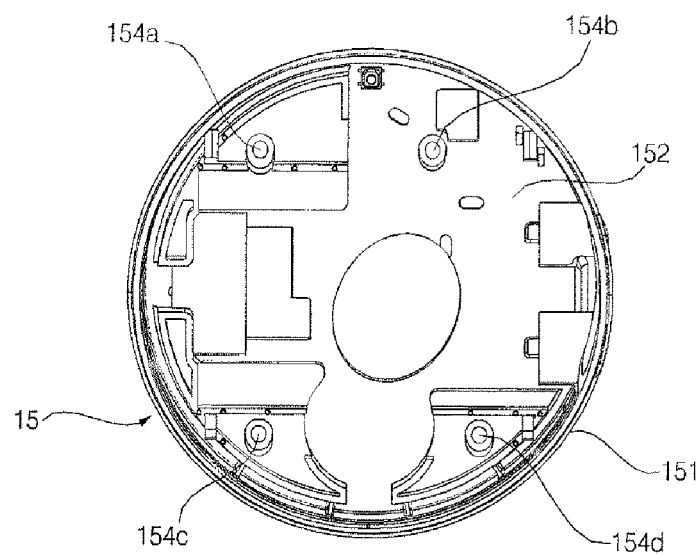
FIG. 20 illustrates a plan view (a) and a perspective view (b) of a cover housing.
Figure 20:
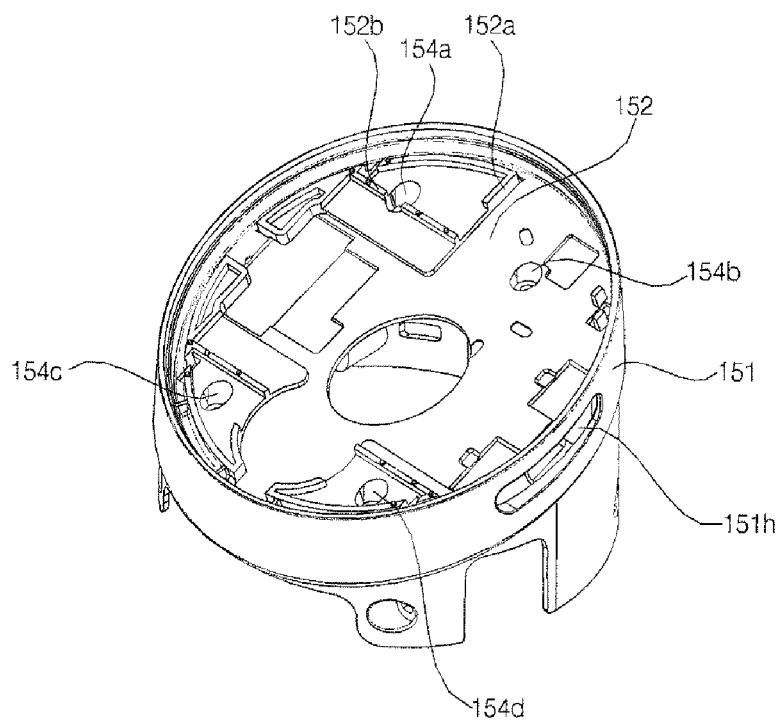
Figure 21:
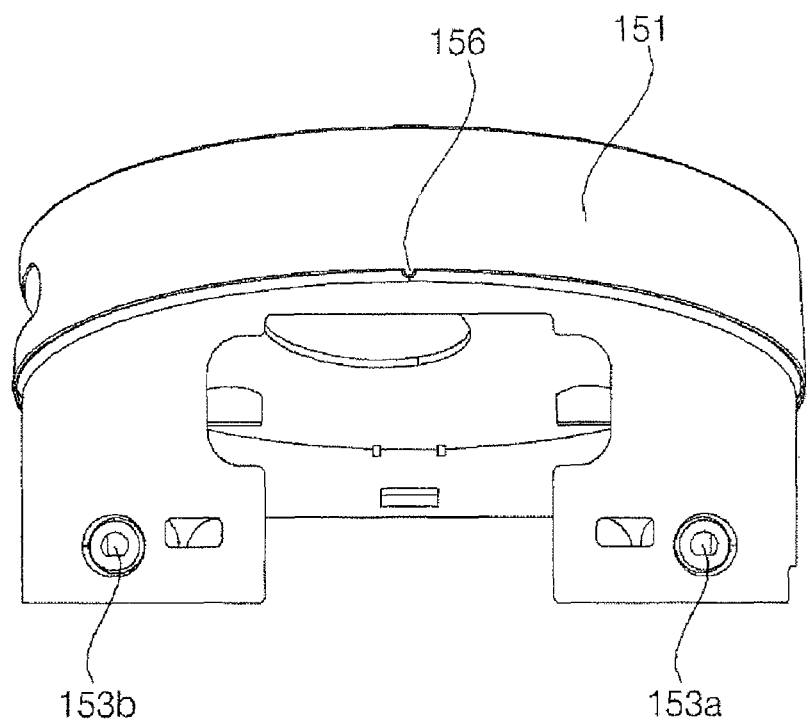
FIG. 21 is a rear view of the cover housing.

FIG. 10a is a perspective view illustrating the upper surface of a window base. FIG. 10b is a perspective view illustrating the lower surface of the window base. FIG. 10c is a right side view of the window base. FIG. 10d is a bottom view of the window base. FIG. 11 illustrates the cover of FIG. 9 viewed from the front side. FIG. 12a is a cross-sectional view taken along line B3-B3 illustrated in FIG. 11. FIG. 12b is a cross-sectional view taken along line A3-A3 illustrated in FIG. 11. FIG. 12c is a cross-sectional view taken along line C3-C3 illustrated in FIG. 11. FIG. 12d is a cross-sectional view taken along line D3-D3 illustrated in FIG. 11. FIG. 13 is a right side view of the cover. FIG. 14a is a cross-sectional view taken along line F1-F1 of FIG. 13. FIG. 14b is a cross-sectional view taken along line F2-F2 of FIG. 13. FIG. 15 illustrates the state in which the window base is removed from an assembly illustrated in FIG. 9. FIG. 16 illustrates the state in which a display is removed from an assembly illustrated in FIG. 15. FIG. 17 is a plan view of a display PCB. FIG. 18 is a perspective view illustrating the display PCB such that the lower surface thereof is seen. FIG. 19 is an exploded perspective view of the cover and a volume button. FIG. 20 illustrates a plan view (a) and a perspective view (b) of a cover housing. FIG. 21 is a rear view of the cover housing. Hereinafter, a description will be made with reference to FIGS. 10 to 21.

Referring to FIGS. 8 and 15 to 18, the display PCB 14 is disposed on the upper surface of the partition plate 152 to support the display 13 from below. The display PCB 14 includes a circuit that is electrically connected to the display 13, and the display 13 is connected to the circuit through a connector 132. Four tact switches 181a, 181b, 181c and 181d may be disposed on the upper surface of the display PCB 14 at front, rear, left and right sides about the display 13.

The display PCB 14 may be formed in a cross shape that extends from the central portion to the front, back, left, and right sides. More specifically, a substrate 140 on which the circuit of the display PCB 14 is formed may include a first substrate arm 145, a second substrate arm 146, a third substrate arm 147, and a fourth substrate arm 148, which extend from the substantially central portion to the front, rear, left, and right sides. The substrate 140 has a substantially cross shape, but this shape need not be symmetrical.

Referring to FIGS. 15 and 16, a rib 152a may be formed on the upper surface of the partition plate 152 of the cover housing 15 so as to protrude from a position at which it comes into contact with the periphery of the display PCB 14. The rib 152a does not necessarily have a shape corresponding to the entire periphery of the display PCB 14, and may come into contact with only a portion of the periphery of the display PCB 14. As in the embodiment, ribs may be formed at multiple positions on the periphery of the display PCB 14. In particular, the ribs 152a may be formed at positions at which they come into contact with the sides of the substrate arms 145, 146, 147 and 148 (i.e., the sides that extend outward from the central portion of the substrate 140).

A first tact switch 181a, a second tact switch 181b, a third tact switch 181c, and a fourth tact switch 181d may be disposed on the respective substrate arms 145, 146, 147 and 148. The tact switches 181a, 181b, 181c, and 181d are electrically connected to the circuit formed on the substrate 140.

An NFC module 540 (see FIG. 7) may be disposed on the display PCB 14. The NFC module 540 enables NFC communication, and may be disposed on an NFC mounting portion 146a formed on the second substrate arm 146. Near Field Communication (NFC) is a non-contact communication technology that uses the frequency band of 13.56 MHz and is one of radio frequency identification (RFID) technologies. NFC is a next-generation near field communication technology that is attracting attention due to relatively excellent security and a relatively low price because it has a short communication distance. Since both data reading and writing functions are available, "NFC" does not require a dongle (reader), which has conventionally been required for the use of RFID. "NFC" is similar to conventional near field communication technologies, such as Bluetooth, but has the advantage of not having to be established between devices like Bluetooth.

The display 13 is a device that receives an electric signal and displays an image. The display 13 is connected to the circuit of the display PCB 14, and displays an image in response to a control signal input through the circuit. The display 13 may include the display panel 131 and the connector 132, which connects the display panel 131 to the circuit of the display PCB 14 (see FIG. 8). The display panel 131 may be attached to the upper surface of the display PCB 14 by an adhesive member (e.g., a piece of double-sided tape 171 (see FIG. 17)).

The display PCB 14 is connected to a main PCB 48, which will be described below, through a predetermined cable (not illustrated). Thus, a controller for controlling the display 13 may be connected to the display PCB 14 or the main PCB 48. Hereinafter, it is assumed that the display 13 is controlled by a controller 82 (see FIG. 7) mounted on the main PCB 48. A groove 429 for receiving the cable may be formed in the side surface of the hub body 40 so as to extend long in the vertical direction.

Various pieces of information may be displayed on the screen of the display panel 131. The controller 82 may control not only the driving of the display panel 131 according to a program stored in the memory 84 but also the overall operation of electrical components constituting the hub 1. A user interface (UI) may be displayed via the display panel 131, and the interface is implemented by executing the program.

The interface may display information exchanged through the communication module 50. For example, the interface may display a menu for controlling the accessories 2, 3a and 3b, which are in communication with the communication module 50, or may display information processed based on the information transmitted from the accessories 2, 3a and 3b. Specifically, information, such as the network connection status of the communication module 50, and for example, the temperature, humidity, and brightness, sensed by the sensors provided in the accessory 2, may be displayed via the interface. In addition, a menu for controlling the output of the speakers 43 and 44 may be displayed via the interface. For example, a menu for selecting a song or an album to be output through the speakers 43 and 44, information related to the album or song (e.g., song title, album name, artist), the magnitude of the volume being output, and the like may be displayed via the interface.

Operations on the menus displayed on the interface are possible via the tact switches 181a, 181b, 181c and 181d. How the output signals of the respective tact switches 181a, 181b, 181c and 181d are processed is determined by a program that is stored in advance in the memory 84. For example, the menus displayed on the left and right sides of the interface may be selected in response to operation signals of the first and second tact switches 181a and 181b, and the menus displayed on the upper and lower sides of the interface may be selected in response to operation signals of the third and fourth tact switches 181c and 181d.

The user may communicate with a Bluetooth module 50b using an external device, such as a smart phone or a laptop computer, so that various data, such as music and images, may be stored in the memory 84. In particular, the controller 82 may control the speakers 43 and 44 so that the music stored in the memory 84 is output, and various functions, such as selection, playback, and stoppage of music may be controlled by the tact switches 181a, 181b, 181c and 181d.

Meanwhile, the substrate 140 of the display PCB 14 may be formed with a through-hole 140h, through which a support boss 122b formed on the window base 12, which will be described below, passes. The through-hole 140h may be formed in the first substrate arm 145.

Referring to FIG. 18, a pair of volume control switches 185a and 185b may be provided on the lower surface of the substrate 140. The volume control switches 185a and 185b are used to adjust the volume of the speakers 43 and 44 provided on the hub body 40. The volume control switches may be configured as tact switches, respectively, and are connected to the circuit of the display PCB 14. The volume control switches 185a and 185b may include a first volume control switch 185a (or a volume increase switch) that increases the volume of the speakers 43 and 44 each time it is pressed, and a second volume control switch 185b (or a volume decrease switch) that decreases the volume of the speakers 43 and 44 each time it is pressed.

The volume control switches 185a and 185b may be disposed on the fourth substrate arm 148 of the display PCB 14, and movable terminals of the volume control switches 185a and 185b (which are portions to be pressed for a switching operation) may protrude toward the sidewall 151 of the cover housing 15.

Referring to FIGS. 19 and 20, the sidewall 151 of the cover housing 15 may be formed with an opening 151h in which a volume button 16 is provided. The volume button 16 may include a dome 161 and an elastic pad 162.

The elastic pad 162 may be formed as a single element using an elastic material (more particularly, rubber). The elastic pad 162 may take the form of a plate 162 that extends long in the circumferential direction of the sidewall 151, and may include a support portion 162a disposed inside the housing 15, a pair of switch moving protrusions 162b and 162c protruding from the inner surface of the support portion 162a, and a dome fixing protrusion 162d protruding from the outer surface of the support portion 162a and exposed to the outside through the opening 151h. Since the support portion 162a is larger than the opening 151h, it is not released to the outside of the cover housing 15 through the opening 151h unless it is bent by an external force.

The dome 161 is formed of a synthetic resin and has a groove formed in one surface thereof, and the dome fixing protrusion 162d is inserted into the groove. The dome fixing protrusion 162d may be interference-fitted into the groove so as not to be easily separated from the dome 161 due to the elasticity or restoration force of the constituent material thereof even if no adhesive member is applied. However, the dome 161 and the dome fixing protrusion 162d may be coupled to each other by an adhesive member, such as a piece of double-sided tape.

The dome 161 may include an anti-separation protrusion 161c protruding from the upper surface and/or the lower surface thereof. The anti-separation protrusion 161c is located inside the cover housing 15 and is caught around the opening 151h, thereby more reliably preventing the dome 161 from being separated from the cover housing 15. In the embodiment, a pair of anti-separation protrusions 161c is formed on each of the upper and lower surfaces of the dome 161, without being necessarily limited thereto.

The switch moving protrusions 162b and 162c are disposed at positions corresponding to the first volume control switch 185a and the second volume control switch 185b, respectively, in the state in which the elastic pad 162 is correctly positioned in the opening 151h. When a volume increasing operation portion 161a or a volume decreasing operation portion 161b of the dome 161 is pressed, the switch moving protrusions 162b and 162c of the elastic pad 162 operate the volume increase switch 185a or the volume decrease switch 185b, whereby the volume of the speakers 43 and 44 is adjusted.

Referring to FIGS. 8 to 14, the window base 12 having a substantially circular shape may be disposed above the display 13. The window base 12 is an injection-molded article of a synthetic resin. The window base may be formed as a single element. An opening 12h is formed in the window base 12, and the screen of the display 13 is exposed through the opening 12h.

The opening 12h is formed at a position corresponding to the display panel 131, which is disposed below the window base 12. The opening may be formed to be slightly smaller than the display panel 131. The screen displayed on the display panel 131 may be visible through the opening 12h.

The display panel 131 is formed in a rectangular shape in which a vertical length thereof in the longitudinal direction is shorter than a horizontal length thereof in the transverse direction. Thus, the opening 12h may also have a shape such that a length in the transverse direction is longer than a length in the longitudinal direction.

The window base 12 includes the window support plate 121, which is formed with the opening 12h in the central portion thereof and on the surface of which the window 11 is disposed, operation protrusions 126a, 126b, 126c and 126d, which protrude downwards from the window support plate 121, and multiple support bosses 122a, 122b, 122c and 122d, which protrude downwards from the window support plate 121.

The support bosses 122a, 122b, 122c and 122d may extend vertically downwards. Similar to the window 11, the window support plate 121 may be disposed so as to be tilted at the first angle θ1 relative to the horizontal plane. In this case, the support bosses 122a, 122b, 122c and 122d may not be perpendicular to the window support plate 121, and may form an angle 90-θ1 complementary to the angle θ1 with the window support plate 121.

Hereinafter, as illustrated in FIG. 9, each portion of the window support plate 121 is divided into a first area SE1 located at the rear side of the opening 12h, a second area SE2 located at the front side of the opening 12h, a third area SE3 located at the left side of the opening 12h, and a fourth area SE4 located at the right side of the opening 12h.

At least one of the support bosses 122a, 122b, 122c and 122d may be formed in the first area SE1 and in the second area SE2. The four support bosses 122a, 122b, 122c and 122d may be formed so as to allow the window support plate 121 to be stably supported without shaking. Among these, the first support boss 122a and the second support boss 122b may be formed in the first area SE1, and the third support boss 122c and the fourth support boss 122d may be formed in the second area SE2.

The support bosses 122a, 122b, 122c and 122d are coupled to the cover housing 151 to support the window support plate 121. Here, the window support plate 121 may be spaced apart from the display PCB 14. At least one of the support bosses 122a, 122b, 122c and 122d may be coupled to the partition plate 152 by passing through the quadrant regions divided by the substrate arms 145, 146, 147 and 148, and at least a remaining one of the support bosses may be coupled to the partition plate 152 by passing through the through-hole 140h formed in the substrate arm 145.

Referring to FIG. 17, the inside of the cover housing 15 is divided into four regions P1, P2, P3 and P4 by the four substrate arms 145, 146, 147 and 148, which have a cross shape. Hereinafter, in order to comply with the usual definition of a quadrant, an order is assigned to each quadrant region such that "P1" is defined as a first quadrant region, "P2" is defined as a second quadrant region, "P3" is defined as a third quadrant region, and "P4" is defined as a fourth quadrant region.

The first support boss 122a, the third support boss 122c, and the fourth support boss 122d pass through the second quadrant region P2, the third quadrant region P3, and the fourth quadrant region P4, respectively, and are coupled to the partition plate 152, and the second support boss 122b passes through the through-hole 140h formed in the first substrate arm 145 and is coupled to the partition plate 152.

The coupling between the support bosses 122a, 122b, 122c and 122d and the partition plate 152 of the cover housing 15 is implemented such that the support bosses 122a, 122b, 122c and 122d are directly coupled to the partition plate 152, but, as in the embodiment, may be implemented such that the support bosses 122a, 122b, 122c, and 122d are coupled to insertion bosses 154a, 154b, 154c and 154d formed on the partition plate 152.

The partition plate 152 of the cover housing 15 may be formed at positions corresponding to the first support boss 122a, the second support boss 122b, the third support boss 122c, and the fourth support boss 122d with a first insertion boss 154a, a second insertion boss 154b, a third insertion boss 154c, and a fourth insertion boss 154d. The insertion bosses 154a, 154b, 154c and 154d may protrude downwards from the partition plate 152, and each may extend parallel to a corresponding one of the support bosses 122a, 122b, 122c and 122d.

The first support boss 122a, the second support boss 122b, the third support boss 122c, and the fourth support boss 122d are inserted respectively into the first insertion boss 154a, the second insertion boss 154b, the third insertion boss 154c, and the fourth insertion boss 154d. The lower ends of the respective insertion bosses 154a, 154b, 154c and 154d may be formed with fastening holes for fastening bolts, and bolts 19 may pass through the respective fastening holes from below so as to be fastened to the support bosses 122a, 122b, 122c and 122d.

Referring to FIGS. 15 to 17, the cover housing 15 may include one or more ribs 152a, 152b, 152c, 152d, 152e and 152f, which protrude upwards from the partition plate 152.

At least one 152b, 152c, 152d, 152e, or 152f of the ribs 152a, 152b, 152c, 152d, 152e and 152f may be in contact with the periphery of the display panel 131. Since the display PCB 14 is disposed on the upper surface of the partition plate 152, the ribs 152*b*, 152*c*, 152*d*, 152*e* and 152*f* need to be prevented from interfering with the display PCB 14 in order to come into contact with the periphery of the display panel 131. To this end, the present invention proposes to utilize the regions P1, P2, P3 and P4, which are quadrant regions divided by the cross-shaped display PCB 14, as paths, through which the ribs 152*b*, 152*c*, 152*d*, 152*e* and 152*f* pass without interfering with the display PCB 14.

The ribs 152*b*, 152*c*, 152*d*, 152*e* and 152*f* may pass through any one of the regions P1, P2, P3 and P4 divided by the substrate arms 145, 146, 147 and 148 of the display PCB 14, and may come into contact with the edge of the display panel 131. The ribs 152*b*, 152*c*, 152*d*, 152*e* and 152*f* function to set the position of the display panel 131, and also maintain the display panel 131 at a correct position without shaking.

The display panel 131 may have a rectangular shape, and at least one of four sides of the display panel 131 may be in contact with the ribs 152*b*, 152*c*, 152*d*, 152*e*, and 152*f*.

Of the four sides of the display panel 131, a pair of mutually parallel sides may be in contact with the ribs. In the embodiment, the horizontal sides of the display panel 131 (or the sides thereof that extend in the transverse direction) are in contact with the ribs 152*b*, 152*c* and 152*d*. The ribs 152*b*, 152*c* and 15*d* may be elongated along the horizontal sides of the display panel 131.

The ribs 152*b*, 152*c* and 152*c* may pass respectively through different regions, among the four regions P1, P2, P3 and P4 divided by the substrate arms 145, 146, 147 and 148. In the embodiment, the rib 152*b* passes through the second quadrant region P2, the rib 152*c* passes through the third quadrant region P3, and the rib 152*d* passes through the fourth quadrant region P4, so that the respective ribs are in contact with the rear side (the upper horizontal side in the drawing), the left side, and the front side (the lower horizontal side in the drawing) of the display panel 131, respectively.

According to the embodiment, a rib may further be formed so as to come into contact with the right side of the display panel 131 by passing through the first quadrant region P1 and/or the fourth quadrant region P4.

The rib (e.g., 152*b*) that is in contact with any one side of the display panel 131 and the rib (e.g., 152*c*) that is in contact with another side of the display panel 131 may respectively pass through different regions (e.g., P2 and P3), among the quadrant regions P1, P2, P3 and P4 divided by the substrate arms 145, 146, 147 and 148.

The window support plate 121 may be bent around the respective support bosses 122*a*, 122*b*, 122*c* and 122*d* when pressure is applied within a predetermined limit due to the characteristics of the material thereof. This is elastic deformation by which the window support plate returns to the original shape thereof when the pressure is removed.

The first operation protrusion 126*a*, the second operation protrusion 126*b*, the third operation protrusion 126*c*, and the fourth operation protrusion 126*d* of the window base 12 are disposed at positions corresponding to the first tact switch 181*a*, the second tact switch 181*b*, the third tact switch 181*c*, and the fourth tact switch 181*d*, which are disposed on the display PCB 14, respectively. Thus, when pressure is applied to any one of the first area SE1, the second area SE2, the third area SE3, and the fourth area SE4 of the window base 12 through the window 11, the operation protrusion (e.g., the first operation projection 126*a*), which is within the area to which the pressure is applied (e.g., the first area SE1), operates the tact switch (e.g. the first tact switch 181*a*) located thereunder.

The window base 12 may further include a first tap 125*a*, a second tap 125*b*, a third tap 125*c*, and a fourth tap 125*d*, which extend downwards from the window support plate 121. The taps 125*a*, 125*b*, 125*c* and 125*d* may protrude in a direction perpendicular to the lower surface of the window support plate 121, respectively. Tap insertion recesses (not illustrated) may be formed in the upper surface of the partition plate 152 of the cover housing 15 at positions corresponding to the taps 125*a*, 125*b*, 125*c* and 125*d*, respectively.

Meanwhile, the window 11 is a circular transparent plate, and allows the screen of the display 13 to be visible therethrough. The material of the window 11 may be acryl. The user may view the screen displayed on the display 13 through the window 11. The entire area of the window 11 does not need to be transparent, and in order to make the window base 12 of the hub 1 be visible from the outside, but to allow only the screen of the display panel 131, which is exposed through the opening 12*h* in the window base 12, to be visible, only a predetermined area 11*b* at a position substantially corresponding to the opening 12*h* may be transparent, and the remaining area 11*a* may be opaquely or translucently colored so as to be concealed, or may include a film attached thereto (see FIG. 3).

The window 11 may be attached to the upper surface of the window support plate 121 of the window base 12 using a piece of double-sided tape, for example. Due to the nature of a synthetic resin, the window 11 may be flexibly bent when pressure is applied within a predetermined range, and this bending may enable smoother operation of the tact switches 181*a*, 181*b*, 181*c* and 181*d*. However, since the bending of the window 11 is elastic, the window 11 of course returns to the original circular shape thereof when the pressing pressure is removed.

Meanwhile, since the opening 12*h* formed in the window support plate 121 has a longer length in the transverse direction (or in the horizontal direction) than the length in the longitudinal direction (or in the vertical direction), the third area SE3 and the fourth area SE4, which correspond to the left and right sides of the opening 12*h*, are not suitable for installing the support bosses. This is because, considering that the window 11 has a circular shape, the third area SE3 and the fourth area SE4 have a shorter distance from the periphery of the opening 12*h* to the third operation protrusion 126*c* or the fourth operation protrusion 126*d* than the distance from the periphery of the opening 12*h* to the first operation protrusion 126*a* or the second operation protrusion 126*b* in the first area SE1 and the second area SE2, and therefore, when the support bosses are formed in the third area SE3 or the fourth area SE4, the operation protrusions may be operated only when a large pressure is applied to the window support plate 121 since the third operation protrusion 126*c* or the fourth operation protrusion 126*d* is too close to the support boss.

For this reason, the first support boss 122*a* and the second support boss 122*b* may be formed in the first area SE1, and the third support boss 122*c* and the fourth support boss 122*d* may be formed in the second area SE2.

Meanwhile, when viewed from above, the first operation protrusion 126*a* is located outside the first support boss 122*a* and the second support boss 122*b* in the cover housing 15, and the second operation protrusion 126*b* is located outside the third support boss 122*c* and the fourth support boss 122*d*.

Slits 121a and 121b may be formed between the operation protrusions 126a and 126b and the support bosses 122a, 122b, 122c and 122d in the first area SE1 and the second area SE2, respectively.

Referring to FIG. 10d, since the support bosses 122a, 122b, 122c and 122d are located in the first area SE1 or the second area SE2, the support bosses are closer to the first operation protrusion 126a or the second operation protrusion 126b than the first operation protrusion 126c or the fourth operation protrusion 126d. For example, when pressure is applied to the first area SE1 of the window support plate 121, the window support plate 121 is bent around the first support boss 122a and the second support boss 122b. At this time, the turning radius (moment arm) of the first operation protrusion 126a about the first support boss 122a is "r11", and the turning radius of the first operation protrusion about the second support boss 122b is "r12". In the embodiment, "r12" is shorter than "r11" because the first operation protrusion 126a is closer to the second support boss 122b than the first support boss 122a. In addition, the third operation protrusion 126c has a distance r31 to the first support boss 122a(r31>r11>r12), and a distance r33 to the third support boss 122c, and "r33" is substantially equal to "r31".

Since the operability of each of the operation protrusions 126a, 126b, 126c and 126d is greatly influenced by the distance to the closest support boss, assuming that there are no slits 121a and 121b, when "r31" is greater than "r12" as in the above example, even if the same pressure is applied to the first area SE1 and the third area SE3, the third area SE3 is more easily bent than the first area SE1 so that the third operation protrusion 126c is more easily moved downwards than the first operation protrusion 126a. Thereby, the third tact switch 181c is more smoothly operated than the first tact switch 181a. For the same reason, the operation of the second tact switch 181b may not be smoothly performed compared with the operation of the third tact switch 181c or the fourth tact switch 181d.

In order to solve this problem, the first slit 121a and the second slit 121b are formed respectively in the first area SE1 and the second area SE2 of the window support plate 121. In these areas SE1 and SE2, the slits 121a and 121b are located between the support bosses 122a, 122b, 122c and 122d and the operation protrusions 126a, 126b, 126c and 126d.

As illustrated in FIG. 10d, when the diameter of the window support plate 121 that passes through the center c and extends in the transverse direction is referred to as a horizontal diameter D1 and the diameter that extends in the longitudinal direction is defined as a vertical diameter D2, the first support boss 122a and the second support boss 122b may be arranged in the first area SE1 in a direction substantially parallel to the horizontal diameter D1, and the third support boss 122c and the fourth support boss 122d may be arranged in the second area SE2 in a direction substantially parallel to the horizontal diameter D1. Then, the first slit 121a and the second slit 121b may extend in a direction substantially parallel to the horizontal diameter D1.

Through the formation of the slits 121a and 121b, when the first area SE1 or the second area SE2 is pressed, the bending of the window support plate 121 occurs at a position adjacent to both ends of the slits 121a and 121b. In particular, this bending mainly occurs in a narrow region between the ends of the slits 121a and 121b and the outer periphery of the window support plate 121, as compared with the case in which the slits 121a and 121b are not formed, the window support plate 121 may be bent more smoothly.

In addition, the distance between the operation protrusions 126a and 126b and the portions in which bending occurs is increased. For example, the distance rs between the first operation protrusion 126a and one end of the first slit 121a is longer than the distance r12 between the first operation protrusion 126a and the second support boss 122b. This is the result of an increase in the length of the moment arm of the force applied to the first area SE1 relative to the portion of the first area SE1 in which bending occurs, and contributes to making the first operation protrusion 126a move downwards more smoothly.

In addition, even when the support bosses 122a, 122b, 122c and 122d of the first area SE1 and the second area SE2 are arranged asymmetrically as in the embodiment, the slits 121a and 121b are formed between the support bosses 122a, 122b, 122c and 122d and the operation protrusions 126a and 126b, whereby the bending of the window support plate 121 in the first area SE1 and the second area SE2 is substantially influenced more heavily by the position and shape of the slits 121a and 122b than by the positions of the support bosses 122a, 122b, 122c and 122d. Thus, when the first slit 121a and the second slit 121b are arranged substantially symmetrically with each other, the operability of the first tact switch 181a and the second tact switch 181b is equalized.

Referring to FIGS. 3 to 5, the hub body 40 may be supported by the hub base 30 disposed thereunder, and the upper end portion thereof may be coupled to the cover housing 15. The hub body 40 may include the speaker cases 41 and 42 defining a cavity 49 therein, and one or more speakers 43 and 44 disposed in the cavity 49. In the embodiment, two speakers 43 and 44 are arranged at upper and lower positions in the speaker cases 41 and 42. The speaker 43 disposed at the upper position is a tweeter that outputs a high-frequency band, and the speaker 44 disposed at the lower position is a woofer that outputs a low-frequency band.

Figure 22:
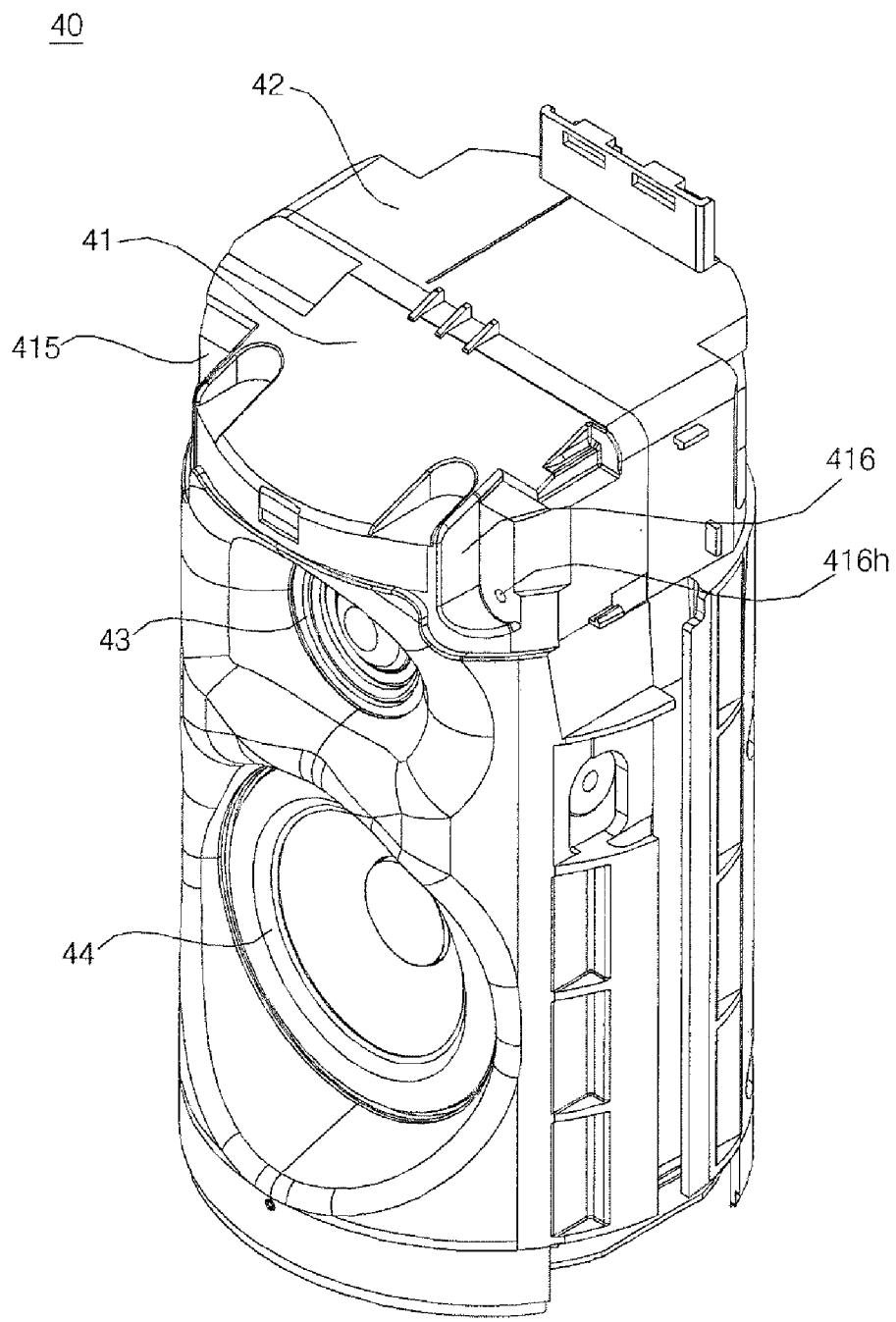
FIG. 22 is a perspective view illustrating a hub body such that the upper surface thereof is seen.
Figure 23:
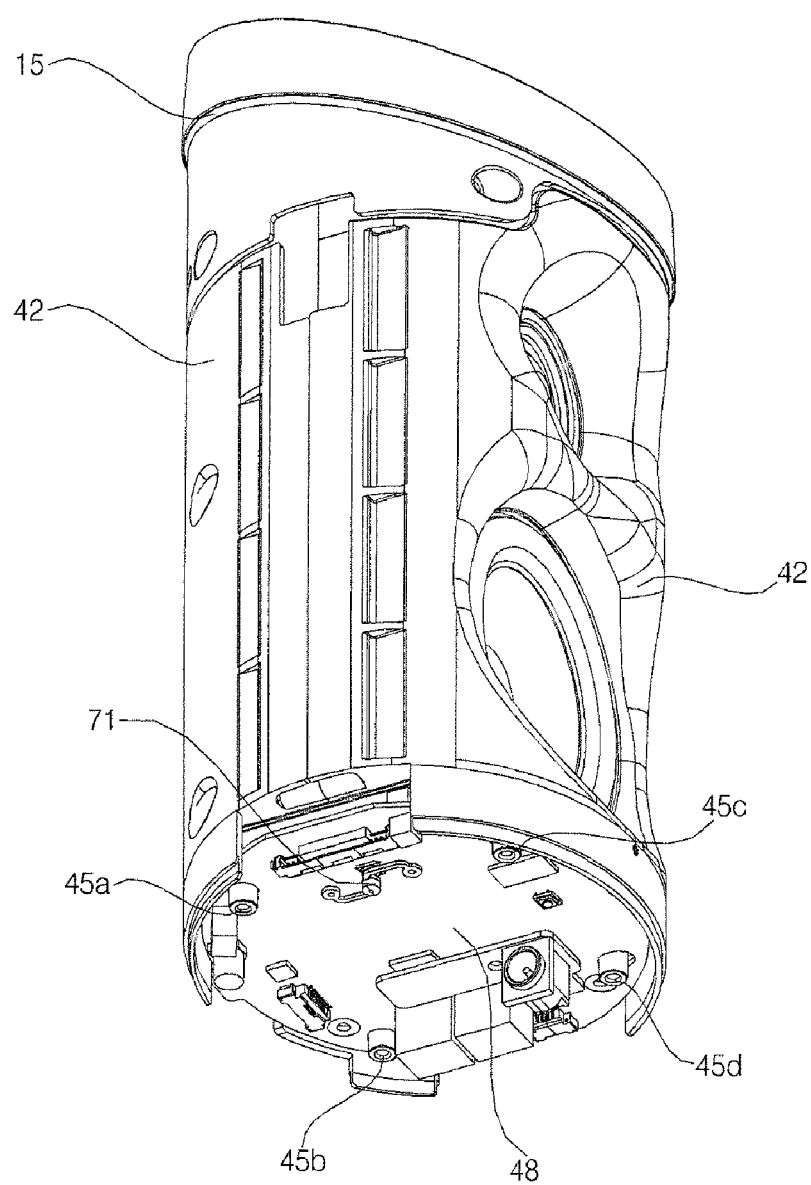
FIG. 23 is a perspective view illustrating the hub body such that the lower surface thereof is seen.
Figure 24:
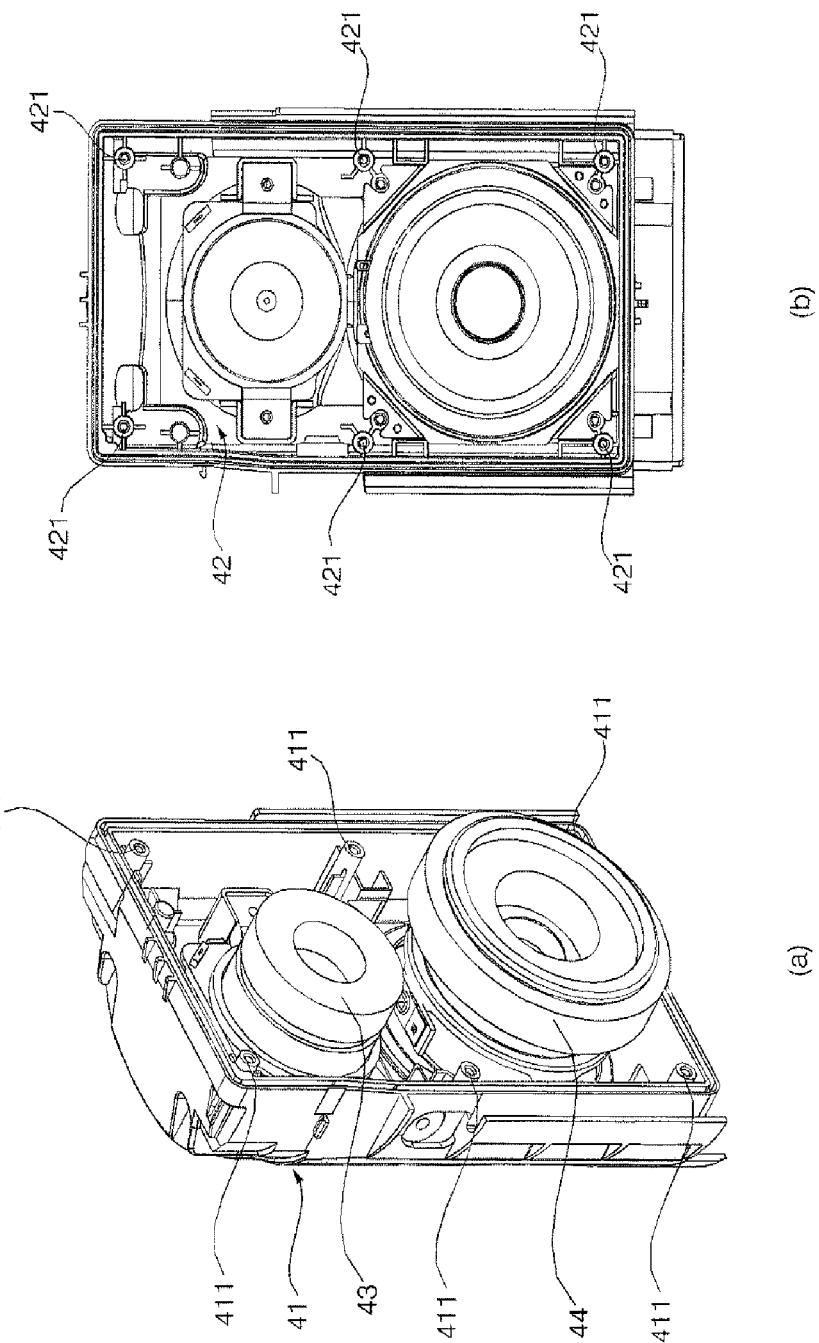
FIG. 24 illustrates a front case in (a) and a rear case in (b).
Figure 25:
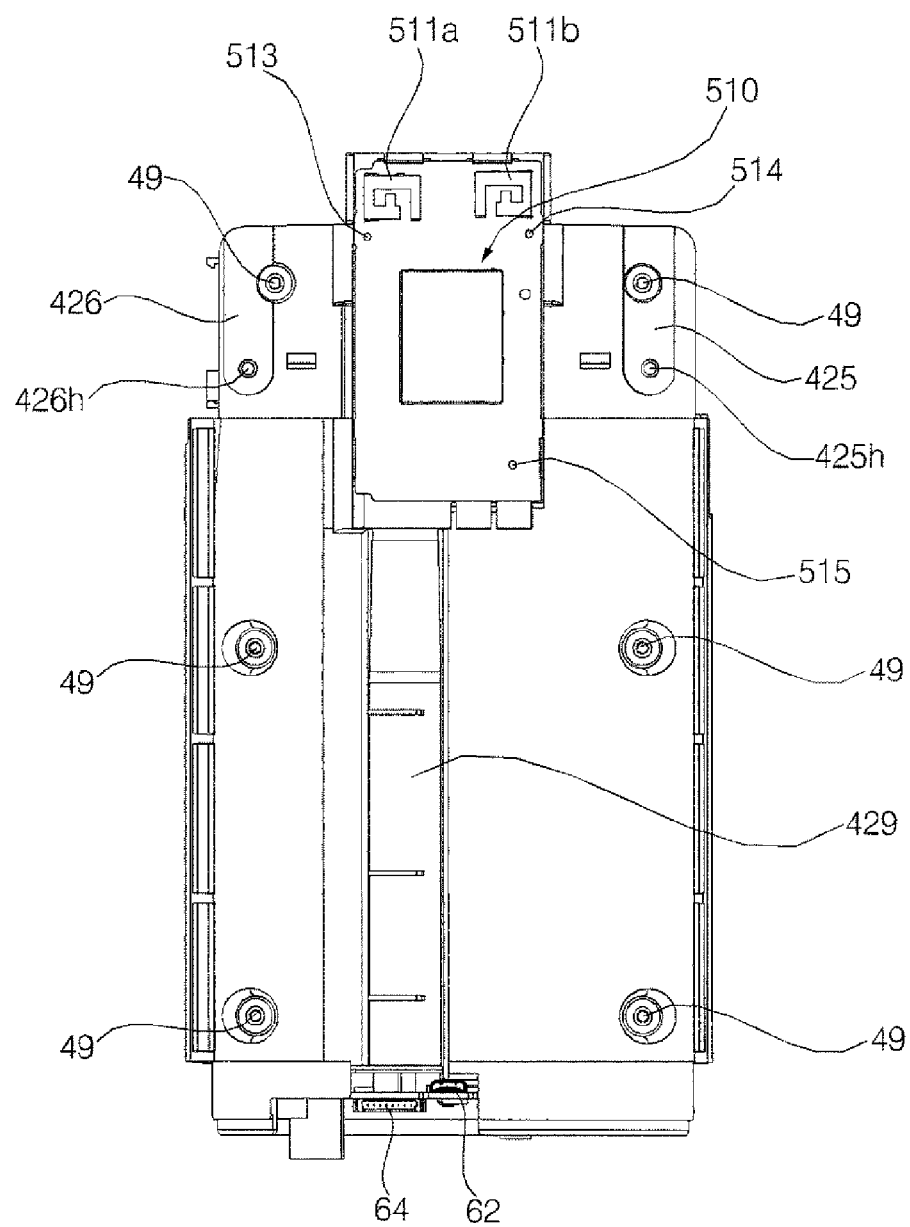
FIG. 25 illustrates the rear surface of the hub body.
Figure 26:
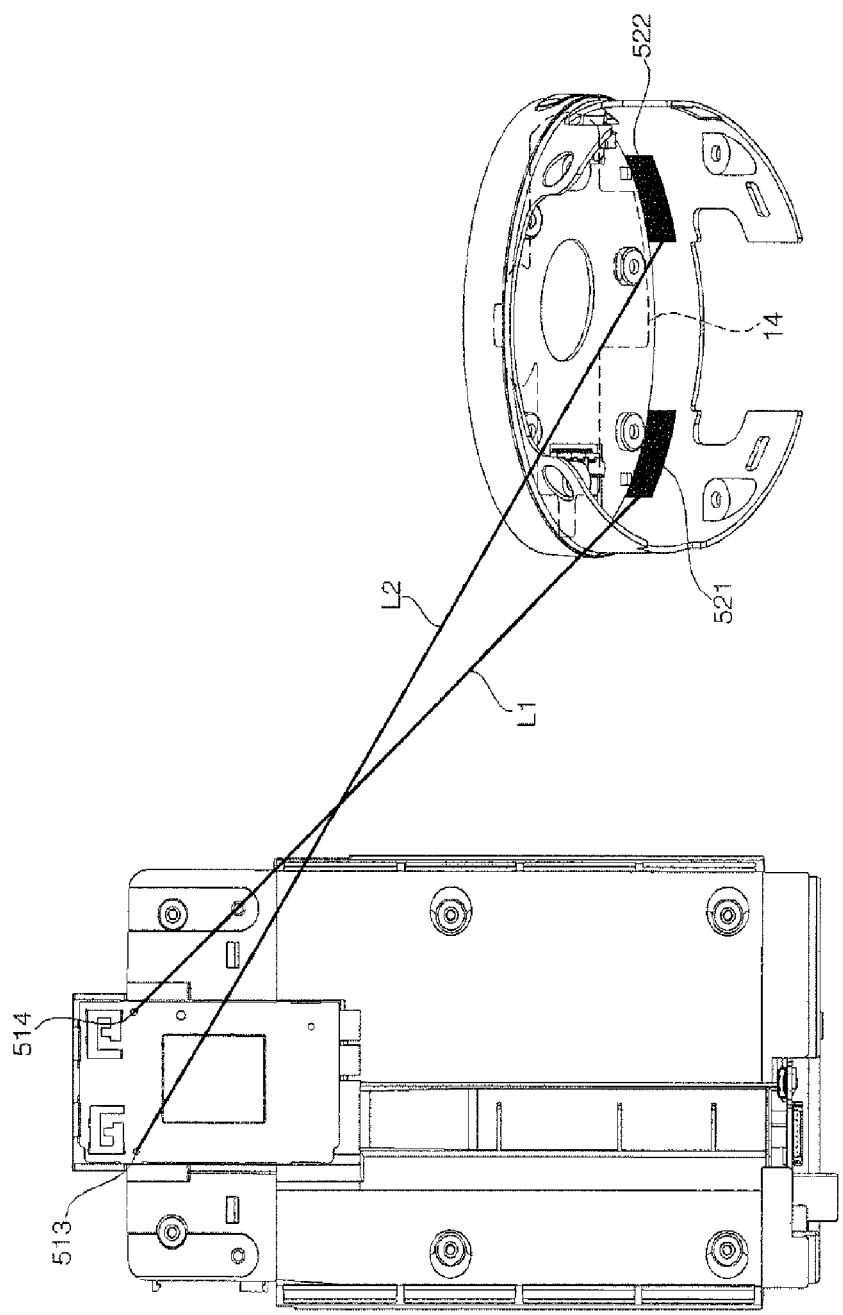
FIG. 26 is a view illustrating positions of antennas connected to a Wi-Fi module.
Figure 27:
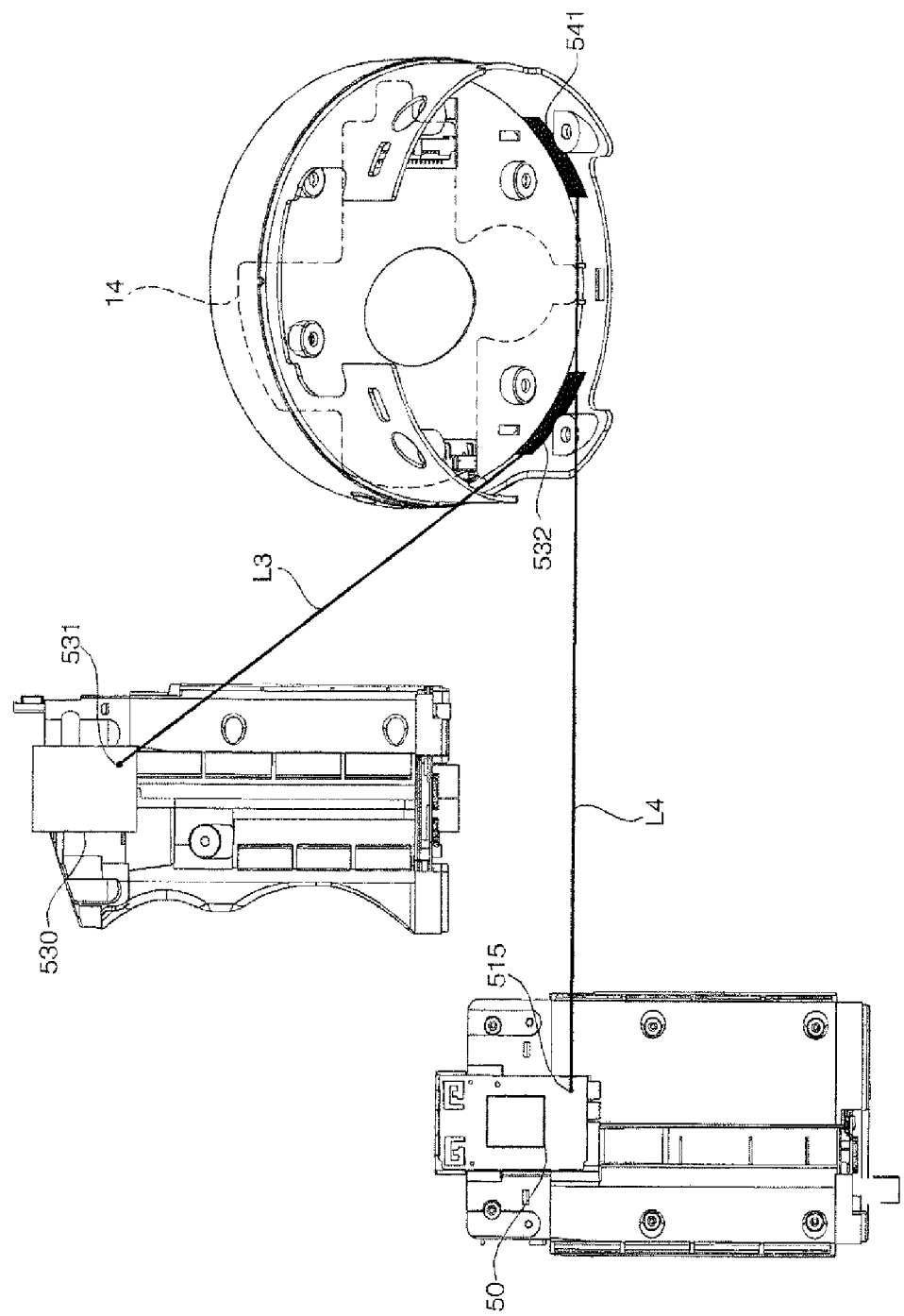
FIG. 27 is a view illustrating positions of an antenna connected to a Bluetooth module and an antenna connected to a ZigBee module.
Figure 28:
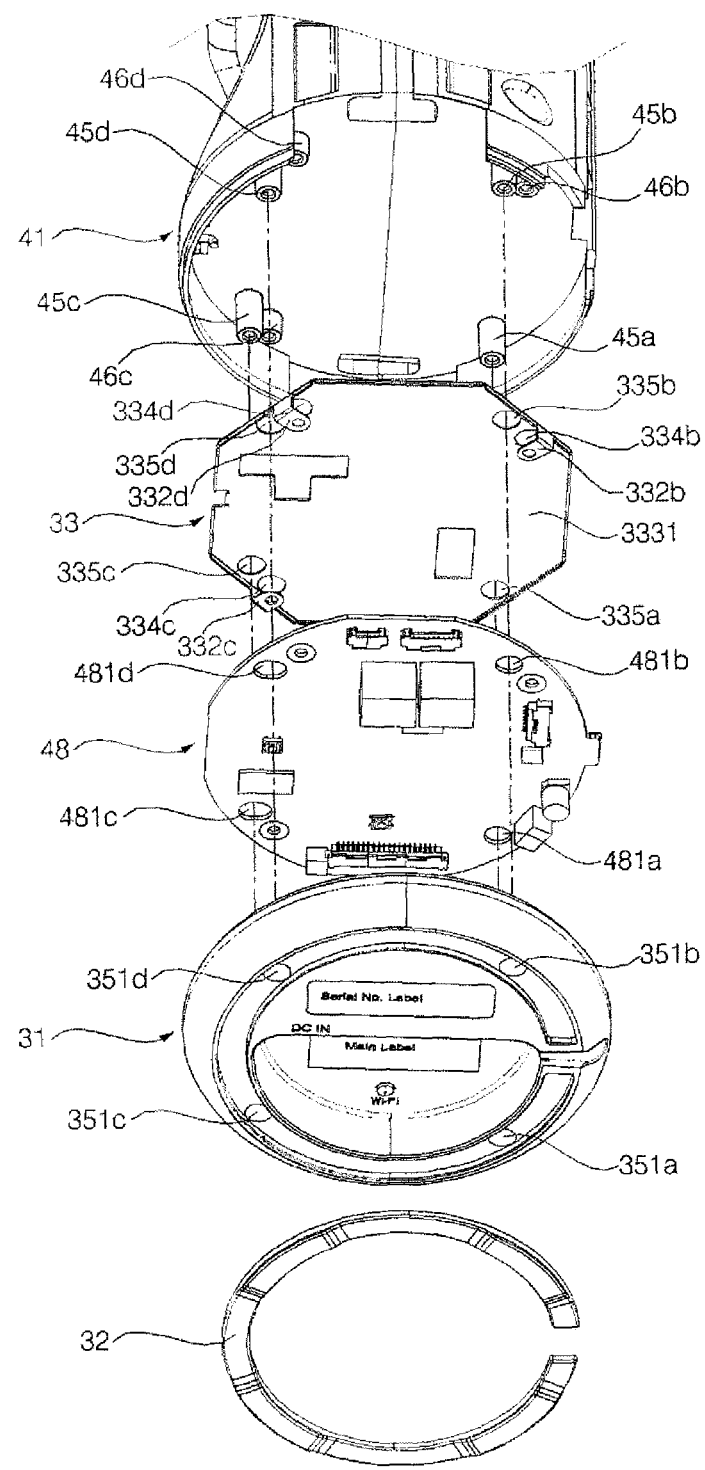
FIG. 28 is an exploded perspective view of the hub body, a radiation plate, a main PCB, a base body, and a support rubber.
Figure 29:
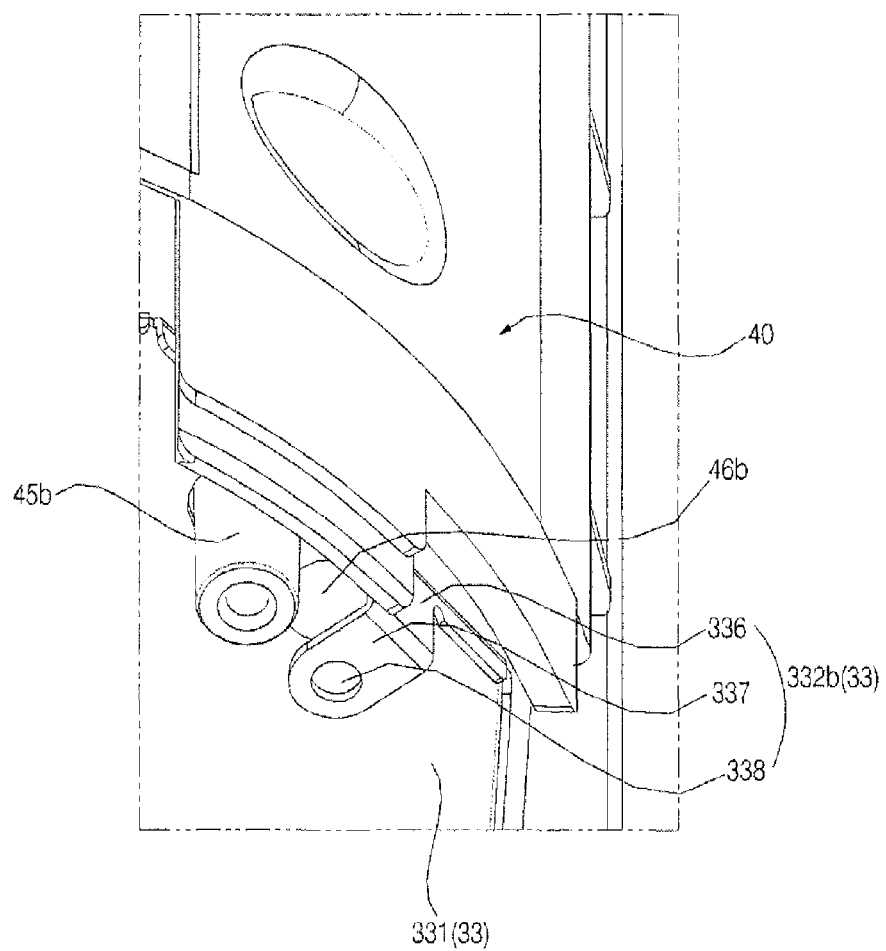
FIG. 29 is an enlarged perspective view of a support tap of the radiation plate.
Figure 30:
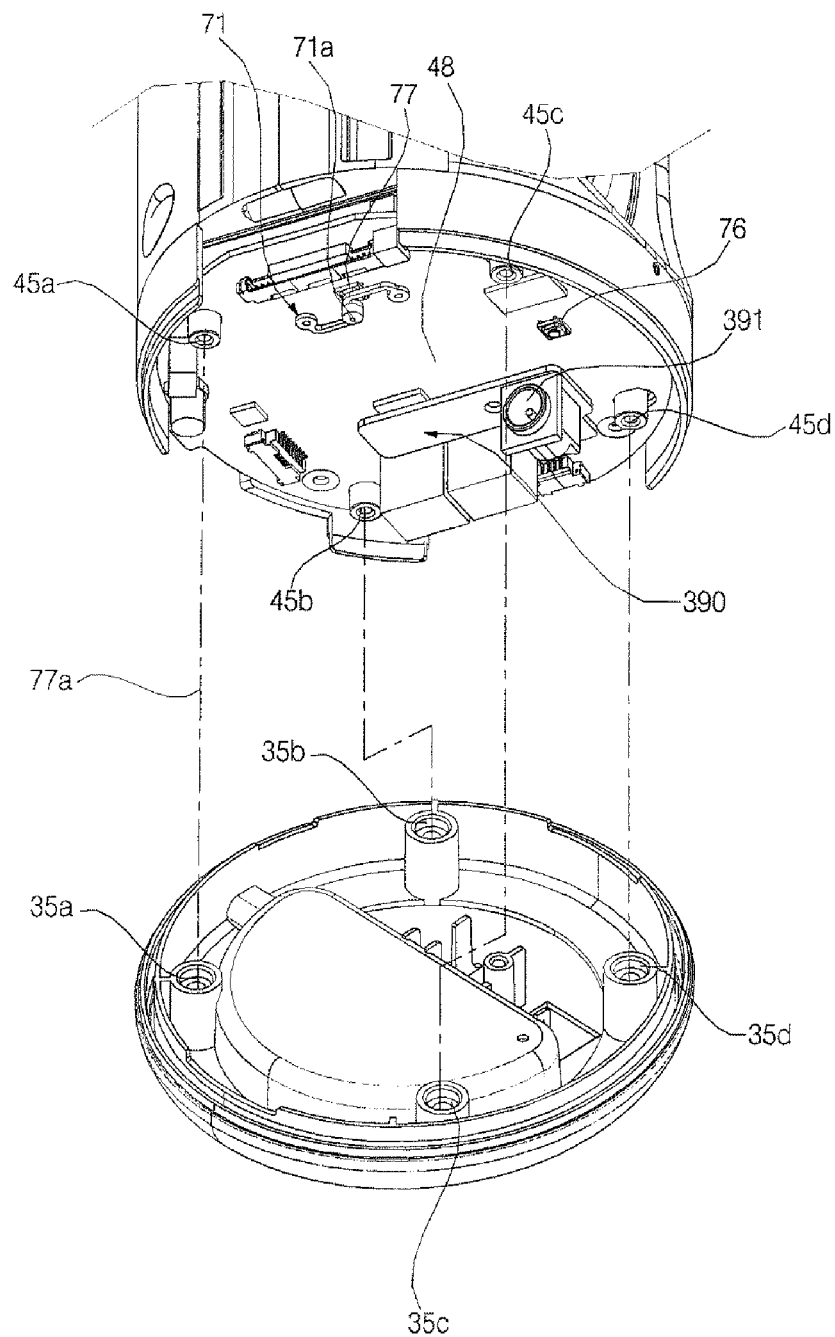
FIG. 30 is a view illustrating the coupling structure between the hub body and the hub base.
Figure 31:
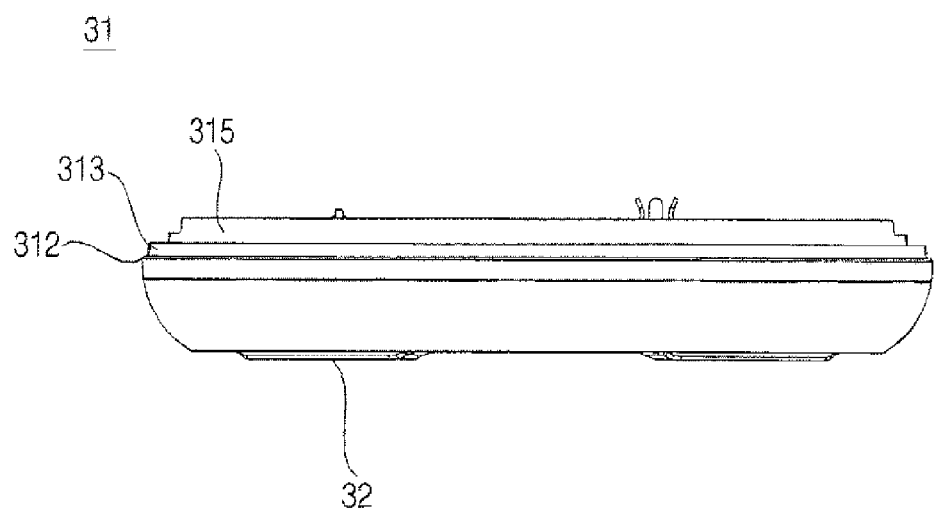
FIG. 31 is a front view of the hub base.
Figure 32:
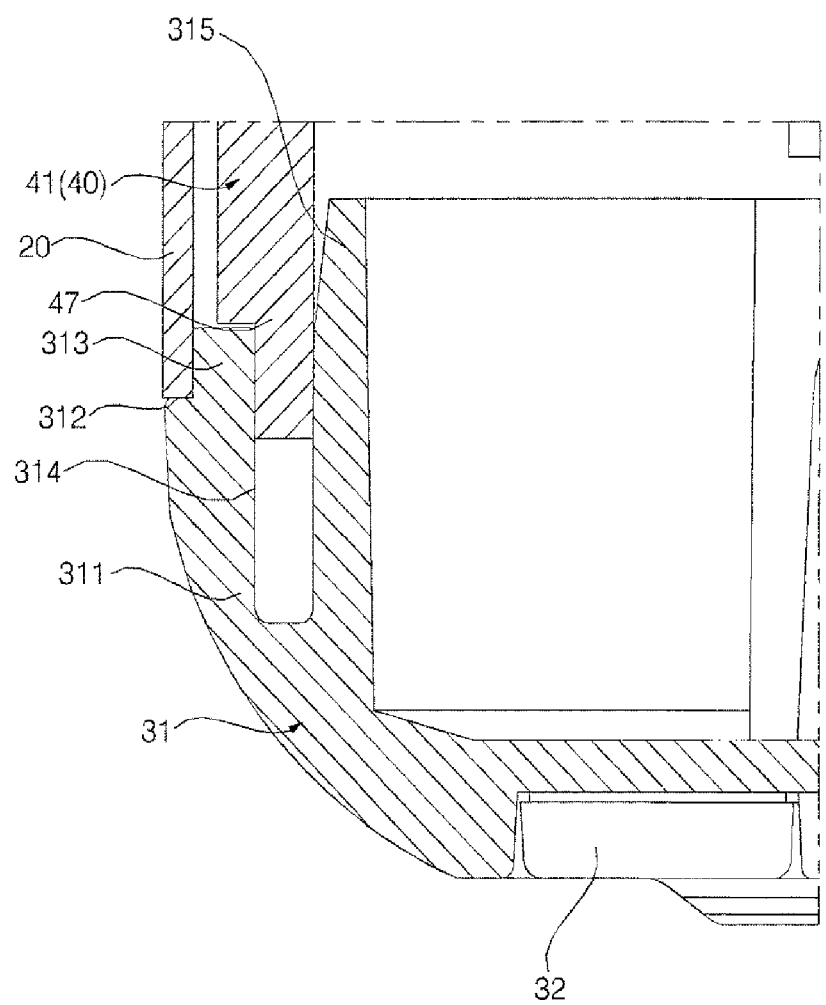
FIG. 32 is a cross-sectional view showing the coupling structure of the hub body, the grille, and a speaker case.
Figure 33:
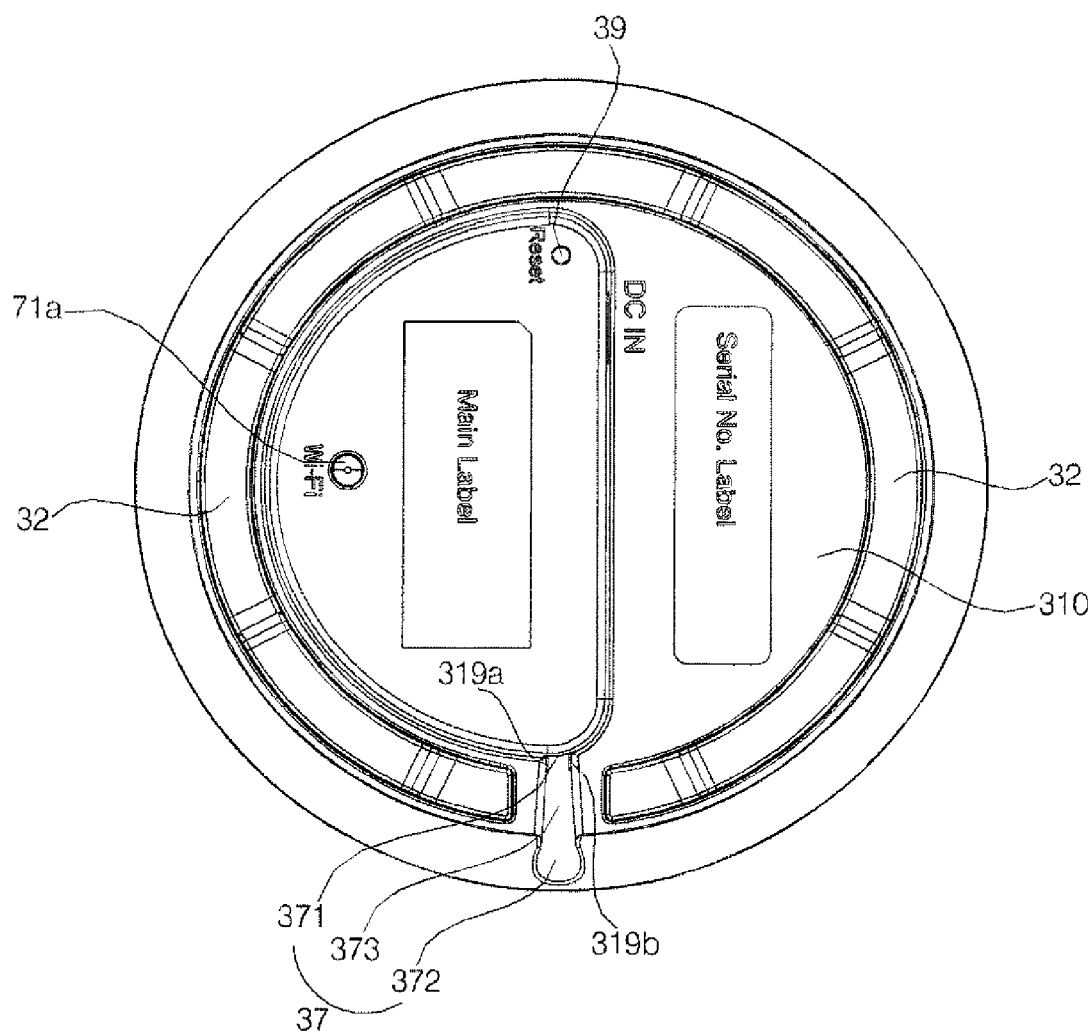
FIG. 33 illustrates the lower surface of the hub base.
Figure 34:
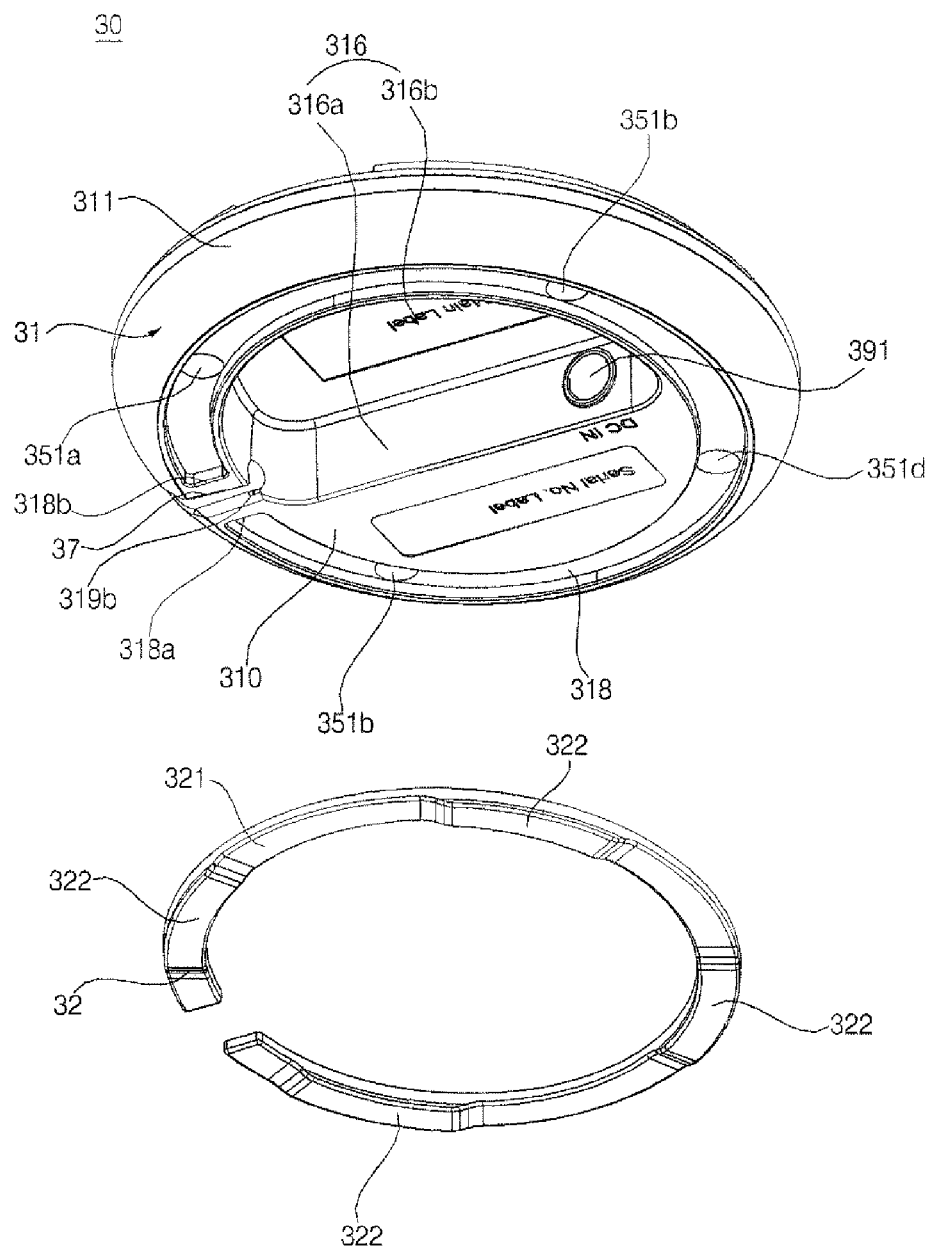
FIG. 34 is an exploded perspective view of the hub base.

FIG. 22 is a perspective view illustrating a hub body such that the upper surface thereof is seen. FIG. 23 is a perspective view illustrating the hub body such that the lower surface thereof is seen. FIG. 24 illustrates a front case in (a) and a rear case in (b). FIG. 25 illustrates the rear surface of the hub body. FIG. 26 is a view illustrating positions of antennas connected to a Wi-Fi module. FIG. 27 is a view illustrating positions of an antenna connected to a Bluetooth module and an antenna connected to a ZigBee module. FIG. 28 is an exploded perspective view of the hub body, a radiation plate, a main PCB, a base body, and a support rubber. FIG. 29 is an enlarged perspective view of a support tap of the radiation plate. FIG. 30 is a view illustrating the coupling structure between the hub body and the hub base. FIG. 31 is a front view of the hub base. FIG. 32 is a cross-sectional view showing the coupling structure of the hub body, the grille, and a speaker case. FIG. 33 illustrates the lower surface of the hub base. FIG. 34 is an exploded perspective view of the hub base.

Referring to FIGS. 22 to 25, the speaker cases 41 and 42 may include a front case 41 and a rear case 42, which form a cavity 49 therebetween. The front case 41 may be formed with a pair of sound output openings, which respectively expose vibrating plates (e.g., membranes) of the tweeter 43 and the woofer 44 disposed at upper and lower positions, so that the sound output openings face forwards.

Case coupling bosses 411 may be formed at multiple positions on the inner surface of the front case 41 so as to protrude rearwards. In the embodiment, the case coupling bosses 411 are formed at two positions on the left and right sides at a predetermined height, and in the same manner, the case coupling bosses 411 are formed at a total of six positions at three different heights, without being necessarily limited thereto.

The rear case 42 may be formed with insertion bosses 421 at positions corresponding to the case coupling bosses 411 formed on the front case 41, and bolts may be fastened from the rear of the rear case 42 into the case coupling bosses 411 by passing through the respective insertion bosses 421.

A pair of fastening bosses 153c and 153d may be recessed rearwards in the left and right sides of the front surface of the upper end holding portion 153 of the cover housing 15 (see FIGS. 11 to 14), and a pair of fastening bosses 153a and 153b may be recessed forwards in the left and right sides of the rear surface.

A first boss insertion recess 415 and a second boss insertion recess 416 may be formed in the front case 41 of the hub body 40, and a third boss insertion recess 425 and a fourth boss insertion recess 426 may be formed in the rear case 42, so as to correspond to the fastening bosses 153a, 153b, 153c and 153d formed on the cover housing 15.

Referring to FIG. 22, the first boss insertion recess 415 and the second boss insertion recess 416 are respectively recessed rearwards from the front surface of the front case 41 (the surface of the hub 1 that faces forwards), and upper end portions thereof are open so as to allow the fastening bosses 153c and 153d to be respectively inserted thereinto from above.

Referring to FIG. 25, the third boss insertion recess 425 and the fourth boss insertion recess 426 are respectively recessed forwards from the rear surface of the rear case 42 (the surface of the hub 1 that faces rearwards), and upper end portions thereof are open so as to allow the fastening bosses 153a and 153b to be respectively inserted thereinto from above.

Each of the boss insertion recesses 415, 416, 425 and 426 may be formed with a fastening hole, through which a bolt passes. Although only the fastening hole 416h formed in the second boss insertion recess 416 is illustrated in the drawing, a fastening hole (hereinafter, although not illustrated in the drawing, denoted by reference numeral 416h in order to avoid confusion of description) is also formed in the first boss insertion recess 415. The other boss insertion recesses 425 and 426 may also be formed with fastening holes 425h and 426h (see FIG. 25).

The fastening bosses 153a, 153b, 153c and 153d reach positions corresponding to the fastening holes 415h, 416h, 425h and 426h in the state in which they are inserted into the respective corresponding boss insertion recesses 415, 416, 425 and 426, and the bolts may be fastened to the fastening bosses 153a, 153b, 153c and 153d through the respective fastening holes 415h, 416h, 425h and 426h.

Referring to FIGS. 25 to 27, at least one communication module 50 may be disposed in the hub body 40. The communication module 50 may be connected to the main PCB 48 and/or the circuit of the display PCB 14 and controlled by the controller 82. In the embodiment, the communication module 50 includes a Wi-Fi module 50a, a Bluetooth module 50b, and a ZigBee module 530. However, the present invention is not limited to this, and a Z-wave module may also be provided.

A module assembly 510 may be a collection of the WiFi module 50a and the Bluetooth module 50b, and may be disposed behind the hub body 40. The module assembly 510 may be disposed in the rear case 42.

The module assembly 510 may be integrally coupled to the rear case 42, or may be detached from the rear case 42. However, the present invention is not limited to this, and the WiFi module 50a and the Bluetooth module 50b may be provided separately from each other, and each of them may be independently coupled to the hub body 40 or separated from the hub body 40.

The module assembly 510 may include a pair of antennas 511a and 511b, which transmit and receive signals. The pair of antennas 511a and 511b may be basically provided in the module assembly 510, but at least one antenna 521 or 522 may further be provided at a position spaced apart from the module assembly 510 (see FIGS. 25 to 27).

The module assembly 510 may include a first antenna connection terminal 513 and a second antenna connection terminal 514 of the WiFi module 50a, and an antenna connection terminal 515 of the Bluetooth module 50b. Then, the first antenna 521 and the second antenna 522 may be disposed on the left and right sides of the rear portion of the inner surface of the sidewall 151 of the cover housing 15. The first antenna 521 may be connected to the first antenna connection terminal 513 through a first lead wire L1, and the second antenna 522 may be connected to the second antenna connection terminal 514 through a second lead wire L2.

The first antenna 521 and the second antenna 522 are each formed by bonding a conductor having a predetermined pattern to a thin film, and the lead wires L1 and L2 are each connected to the conductor. The first antenna 521 and the second antenna 522 may be attached to the sidewall 151 of the cover housing 15 by a piece of double-sided tape.

The sidewall 151 of the cover housing 15 is not surrounded by the grille 20 because the sidewall 151 is located above the grille 20. Therefore, by disposing the first antenna 521 and the second antenna 522 on the sidewall 151, it is possible to reduce the signal interference by the grille 20, which is a metallic material, so as to enable signal transmission and reception to be performed more accurately.

In addition, the sidewall 151 may be formed such that the height of the upper end thereof is gradually spaced farther apart from the partition plate 152 from the front to the rear. In this case, the rear portion of the sidewall 151 may form a larger gap with the display PCB 14 mounted on the partition plate 152, as compared with the front portion. Accordingly, by disposing the first antenna 521 and the second antenna 522 on the rear portion of the sidewall 151, it is possible to separate the antennas 521 and 522 farther away from the display PCB 14, and to thus reduce signal interference due to a magnetic field generated by the current flowing through the circuit of the display PCB 14.

Meanwhile, the ZigBee module 530 may be provided on one of the left and right sides of the hub body 40. A third antenna 532, which is connected to an antenna connection terminal 531 of the ZigBee module 530 via a lead wire L3, and a fourth antenna 541, which is connected to the antenna connection terminal 515 of the Bluetooth module 50b via a lead wire L4, may be provided on the inner surface of the front portion of the sidewall 151 of the cover housing 15.

The third antenna 532 and the fourth antenna 541 are each formed by bonding a conductor having a predetermined pattern to a thin film, and the lead wires L3 and L4 are each connected to the conductor. The third antenna 532 and the fourth antenna 541 may be attached to the sidewall 151 of the cover housing 15 by a piece of double-sided tape.

Referring to FIGS. 28 and 29, the main PCB 48 may be disposed in a space formed between the hub body 40 and the hub base 30. The main PCB 48 controls the overall operation of the hub 1. For example, the controller 82, an USB port 62, a data transmission port 64, various switches 76 and 77, and a receptacle 390 are mounted on the main PCB 48, and the main PCB 48 is connected to various electrical devices, such as the communication modules 50a and 530, the display PCB 14, the tweeter 43, and the woofer 44.

A radiation plate 33 may be disposed between the main PCB 48 and the hub body 40. The radiation plate 33 is formed by processing a metal plate. The radiation plate may be formed of aluminum. The radiation plate 33 dissipates the heat emitted from the main PCB 48 into the upper space (i.e., the space between the lower surface of the hub body 40 and the radiation plate 33).

Multiple fastening bosses 45a, 45b, 45c and 45d may protrude from the lower surface of the hub body 40. The first fastening boss 45a and the second fastening boss 45b may protrude from the lower surface of the rear case 42, and the third fastening boss 45c and the fourth fastening boss 45d may protrude from the lower surface of the front case 41. The fastening bosses 45a, 45b, 45c and 45d may be coupled to the hub base 30.

When the lower surface of the hub body 40 is divided by a horizontal line and a vertical line that pass through the center thereof, the fastening bosses 45a, 45b, 45c and 45d may be formed respectively in four quadrants that are divided by the horizontal line and the vertical line.

The hub base 30 may be formed with insertion bosses 35a, 35b, 35c and 35d at positions corresponding to the respective fastening bosses 45a, 45b, 45c and 45d. The fastening bosses 45a, 45b, 45c and 45d may be inserted into the insertion bosses 35a, 35b, 35c and 35d, respectively, and may be fastened to bolts, which pass through the respective insertion bosses 35a, 35b, 35c and 35d from below, in the inserted state thereof.

Multiple radiation plate coupling bosses 46b, 46c and 46d may further protrude from the lower surface of the hub body 40. The radiation plate support bosses 46b, 46c and 46d may be disposed at positions close to the fastening bosses 45a, 45b, 45c and 45d. In the embodiment, three of the four quadrant regions are provided with the radiation plate support bosses 46b, 46c and 46d, but the number of the radiation plate support bosses is not necessarily limited thereto.

The radiation plate 33 is formed by processing a metal plate. The radiation plate may be formed of aluminum or stainless steel. However, other metal materials may also be used. The radiation plate 33 may include a horizontal flat plate portion 331 and multiple support taps 332b, 332c and 332d, which extend from the periphery of the flat plate portion 331.

The flat plate portion 331 may be formed with through-holes 335a, 335b, 335c and 335d, through which the respective fastening bosses 45a, 45b, 45c and 45d pass, (hereinafter referred to as "fastening boss through-holes" when it is required to distinguish the same from other components) and through-holes 334b, 334c and 334d, through which the respective support bosses 46b, 46c and 46d pass, (hereinafter referred to as "support boss through-holes" when it is required to be distinguished from other components).

Referring to FIG. 29, the support bosses 46b, 46c and 46d may be coupled to the support taps 332b, 332c and 332d, respectively, on the upper side of the main PCB 48. Each of the support taps 332b, 332c and 332d may include a vertical portion 336, which extends downwards from the flat plate portion 331, and a horizontal portion 337, which is bent horizontally from the vertical portion 336. A fastening hole 338 for the passage of a bolt may be formed in the horizontal portion 337 of each of the support taps 332b, 332c and 332d, and a bolt may pass through the fastening holes 338 from below, and then be fastened to each of the support bosses 46b, 46c and 46d.

The flat plate portion 331 is spaced apart from the lower surface of the hub body 40 located thereabove and is also spaced apart from the main PCB 48 located thereunder in the state in which the support bosses 36b, 36c and 36d are fastened to the support taps 332b, 332c and 332d. Even if the hub body 40 vibrates due to the output of the speakers 43 and 44, no striking noise due to the contact between the lower surface of the hub body 40 and the flat plate portion 331 occurs since the flat plate portion 331 is spaced apart from the lower surface of the hub body 40.

The main PCB 48 may be formed with through-holes 481a, 481b, 481c and 481d at positions corresponding to the respective through-holes 335a, 335b, 335c and 335d in the radiation plate 33. The length of the fastening bosses 45a, 45b, 45c and 45d is longer than the length of the support bosses 46b, 46c and 46d, and each of the fastening bosses 45a, 45b, 45c and 45d may pass through the through-holes 335a, 335b, 335c and 335d in the radiation plate 33 and the through-holes 481a, 481b, 481c, and 481d in the main PCB 48, and thereafter may be inserted into the insertion bosses 35a, 35b, 35c and 35d of the hub base 30.

Referring to FIGS. 28 to 34, the hub base 30 includes a base body 31, which has an open upper surface and defines a predetermined space therein, and a support rubber 32, which is fixed to the lower surface of the base body 31. The hub 1 may be formed in a small size so that the user can carry the hub, and may be placed on a horizontal surface, such as a table or a shelf. The support rubber 32 provided on the lower side of the base body 31 increases the friction with the floor so as to prevent the hub 1 from falling or overturning.

The insertion bosses 35a, 35b, 35c and 35d may protrude upwards from the inner surface of the base body 31, and a base bottom portion 310 of the base body 31 may be formed with fastening holes 351a, 351b, 351c and 351d, which are respectively in communication with the insertion bosses 35a, 35b, 35c and 35d.

After the hub body 40 and the radiation plate 33 are assembled with each other, the fastening bosses 45a, 45b, 45c and 45d pass through the fastening boss through-holes 481a, 481b, 481c and 481d formed in the main PCB 48. Then, the respective fastening bosses 45a, 45b, 45c and 45d are inserted into the insertion bosses 35a, 35b, 35c and 35d formed in the hub base 30, respectively. Thereafter, bolts (not illustrated) may be inserted into the fastening holes 351a, 351b, 351c and 351d from the lower side of the hub base 30, and may be fastened to the fastening bosses 45a, 45b, 45c and 45d in the insertion bosses 35a, 35b, 35c and 35d.

A rubber insertion groove 318 may be formed in the base bottom portion 310 of the hub base 30. The rubber insertion groove 318 may extend along a predetermined circumference on the base bottom portion 310. The rubber insertion groove 318 may take the form of an arc that extends from one end 318a to the other end 318b with a constant curvature, and the fastening holes 351a, 351b, 351c and 351d may be located in the rubber insertion groove 318.

The support rubber 32 is inserted into the rubber insertion groove 318. The upper surface of the support rubber 32 may be attached to the bottom of the rubber insertion groove 318 by a piece of double-sided tape.

The support rubber 32 may include a rubber body 321, which extends long so as to correspond to the rubber insert groove 318, and multiple support protrusions 322, which protrude from the rubber body 321 to the outside of the rubber insertion groove 318. When the support protrusions 322 are placed on the floor on which the hub 1 is placed (e.g., a living room or a sink), the hub 1 is upright, and at this time, the base body 31 is spaced apart from the floor according to the length by which the support protrusions 322 protrude from the rubber body 321. The base body 31 is prevented from being wetted with water when the hub 1 is mounted in a place, such as a countertop of a kitchen, having water thereon.

The support protrusions 322 are disposed at a constant interval along the longitudinal direction of the rubber body 321. The support protrusions 322 may be arranged symmetrically with respect to the center of the base bottom portion 310 of the base body 31. In the embodiment, four support protrusions 322 are arranged at an interval of 90 degrees, but the number of support protrusions 322 is not necessarily limited thereto.

The base body 31 may include a base outer wall portion 311, which extends upwards from the periphery of the base bottom portion 310. The base outer wall portion 311 is gradually increased in the outer diameter toward the upper side, and the outer diameter at the uppermost end thereof is substantially the same as the outer diameter of the lower end of the grille 20.

The base body 31 may include a lower end holding portion 313, which extends upwards from the base outer wall portion 311 and is coupled to the grille 20. This coupling of the lower end holding portion 313 and the grille 20 does not use a separate fastening member, such as a bolt, but is performed in a manner such that the lower end holding portion 313 is inserted (or fitted) into an opening in the lower end of the grille 20, and may be interference fitted using the elasticity and restoration force of the grille 20 or the lower end holding portion 313.

Referring to FIG. 32, the lower end holding portion 313 is located inside the upper end of the base outer wall portion 311 (i.e., the outer surface of the base body 31 being recessed from the upper end of the outer wall portion 311 to form the outer surface of the lower end holding portion 313). Thus, the upper end of the outer wall portion 311 is formed with a surface 312, which extends from the outer surface of the outer wall portion 311 to the lower end holding portion 311 so as to face the lower end of the grille 20. The lower end of the grille 20 may be positioned on the surface 312. The surface 312 may be formed at the upper end of the base outer wall 311 to have a shape corresponding to the lower end of the grille 20, and the width of the surface 312 is substantially the same as the thickness of the grille 20.

When the outer surface of the lower end holding portion 313 comes into contact with the inner surface of the grille 20, the shape of the lower end of the grille 20 is maintained. In particular, when the grille 20 is formed of a metal material, the lower end of the grille 20 may remain in the shape corresponding to the shape of the lower end holding portion 313 since the grille 20 is deformed so as to correspond to the shape of the lower end holding portion 313.

In the case in which the lower end holding portion 313 extends in an elliptical shape along the upper end of the outer wall portion 311, when the cylindrical grille 20 having a circular cross-sectional shape is formed by rolling a metal plate, and thereafter the lower end of the grille 20 is fitted into the lower end holding portion 313, the grille 20 may also be deformed into an elliptical shape so as to correspond to the shape of the lower end holding portion 313, and may be maintained in the deformed state.

An annular rib 315 may protrude upwards from the inner surface of the base body 31. The rib 315 is formed on the inner side of the lower end holding portion 313. The hub body 40 may include an insertion rib 47, which protrudes downwards from the lower surface of the cases 41 and 42, and the insertion rib 47 may be inserted into a groove 314 between the lower end holding portion 313 and the rib 315.

The base bottom portion 310 of the base body 31 may be provided with a depression 316 in an inner region thereof surrounded by the rubber insertion groove 318. The depression 316 may include a groove side portion 316a, which extends upwards from the periphery of an opening formed in the lower surface of the base bottom portion 310, and a groove bottom portion 316a, which extends horizontally from the groove side portion 316a to form the bottom of a groove. The adapter may be received in the depression 316. Although not illustrated, the hub 1 may include an adapter, which receives an external commercial AC voltage and supplies a DC voltage required for the operation of the hub 1. The groove side portion 316a may be provided with a socket 391, into which an output terminal of a cord connected to the adapter is inserted.

The receptacle 390 having the socket 391 may be disposed in the lower surface of the main PCB 48. The receptacle 390 electrically connects the socket 391 to the circuit of the main PCB 48.

A code fixing groove 37 may be formed in the base body 31. The code fixing groove 37 may be formed between one end 318a and the other end 318b of the rubber insertion groove 318. The cord fixing groove 37 extends from an inner opening 371 formed in the side surface portion 316a to an outer opening 372 formed in the base outer wall portion 311, and a cord insertion hole 373 is formed in the lower surface of the base bottom portion 310 to interconnect the inner opening 371 and the outer opening 372. That is, the cord fixing groove 37 has a form in which an arbitrary cross section perpendicular to the longitudinal direction of the groove is not closed, but a portion of the cross section is opened by the cord insertion hole 373. In addition, the cross section may have a maximum inner diameter larger than the length of an open section of the cross section (i.e., the width of the cord insertion hole 373) inside the code fixing groove 37. Generally, since the outer shape of the cord is defined by a coating formed of a slightly elastic material, even when the cord has an outer diameter larger than the width of the cord insertion hole 373, as long as the difference therebetween does not exceed a certain range, the cord may be deformed by the flexibility of the material so as to pass through the cord insertion hole 373. Thus, since the shape of the cord returns to the original shape thereof once it is inserted into the code fixing groove 37, it is impossible for the cord to pass through the cord insertion hole 373, and thus, the cord is prevented from being detached from the cord fixing groove 37.

The outer opening 372 may be larger than the inner opening 371, and the cord fixing groove 37 may be formed in a manner such that the size of the cross section gradually decreases from the outer opening 372 to the inner opening 371.

The insertion hole reduction protrusions 319a and 319b may be formed on the inner surface of the code fixing groove 37. The insertion hole reduction protrusions 319a and 319b may be formed on at least one of opposite portions that define the cord insertion hole 373. It is possible to more effectively prevent the cord from being separated from the cord fixing groove 37 since the width of the cord insertion hole 373 is reduced at the portion in which the insertion hole reduction protrusions 319a and 319b are formed.

Meanwhile, a Wi-Fi reset switch 77 may be provided on the lower surface of the main PCB 48. The Wi-Fi reset switch 77 may be configured as a tact switch. When the Wi-Fi reset switch 77 is pressed, the controller 82 may initialize (reset) the Wi-Fi module 50a.

Referring to FIG. 30, a Wi-Fi reset button 71 may be coupled to the lower surface of the main PCB 48. The Wi-Fi reset button 71 is formed of a synthetic resin, and includes a button portion 71a, arms of which extend in opposite directions so as to be coupled to the lower surface of the main PCB 48. In the state in which the button portion 71a is elastically supported by the arms, the button portion is positioned in a hole formed in the base bottom portion 310 at the lower side of the Wi-Fi reset switch 77. When the button portion 71a is pressed, the Wi-Fi reset switch 77 is switched.

A hub reset switch 76 may be disposed on the lower surface of the main PCB 48. The hub reset switch 76 may be configured as a tact switch, and is exposed through a hole formed in the base bottom portion 310. When the hub reset switch 76 is pressed, the controller 82 is initialized (reset).

Figure 35:
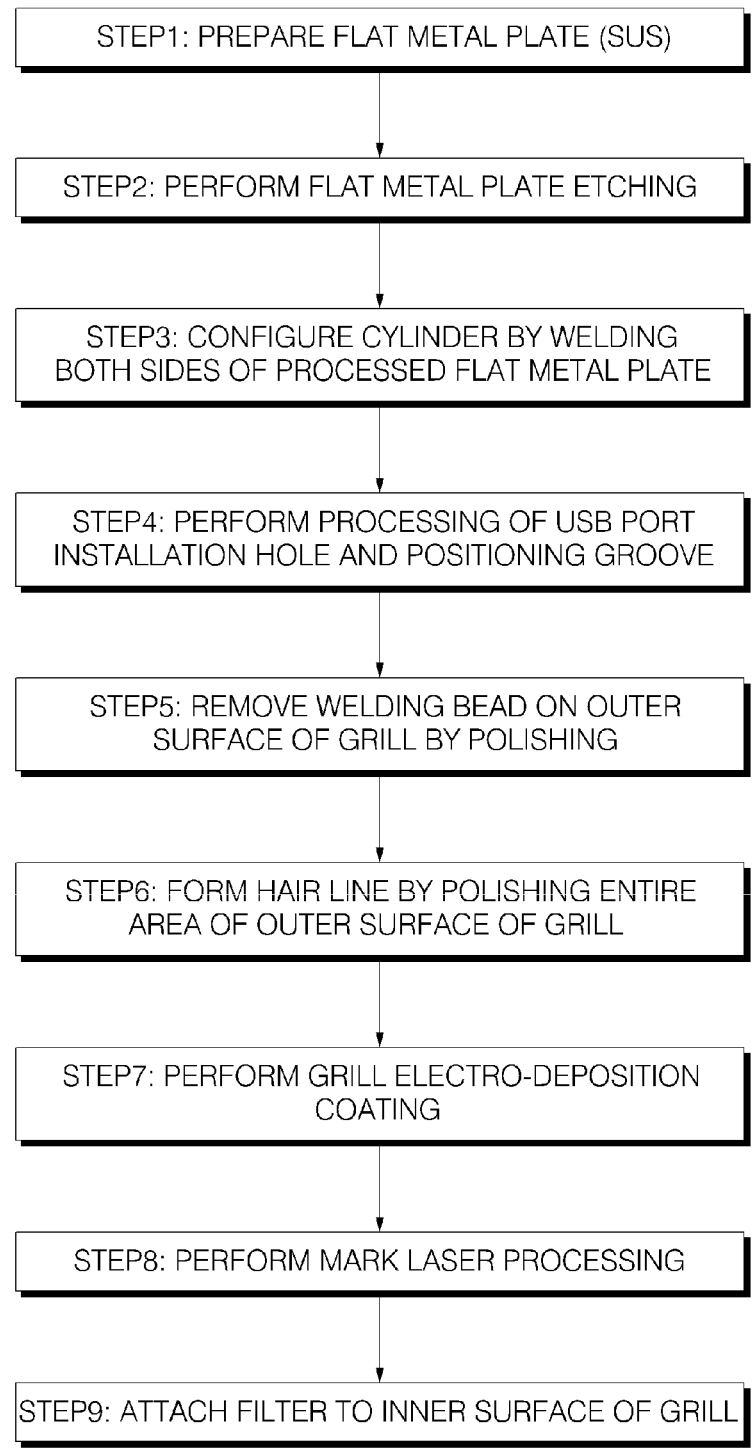
FIG. 35 is a flowchart illustrating a method of manufacturing a hub according to an embodiment of the present invention.
Figure 36:
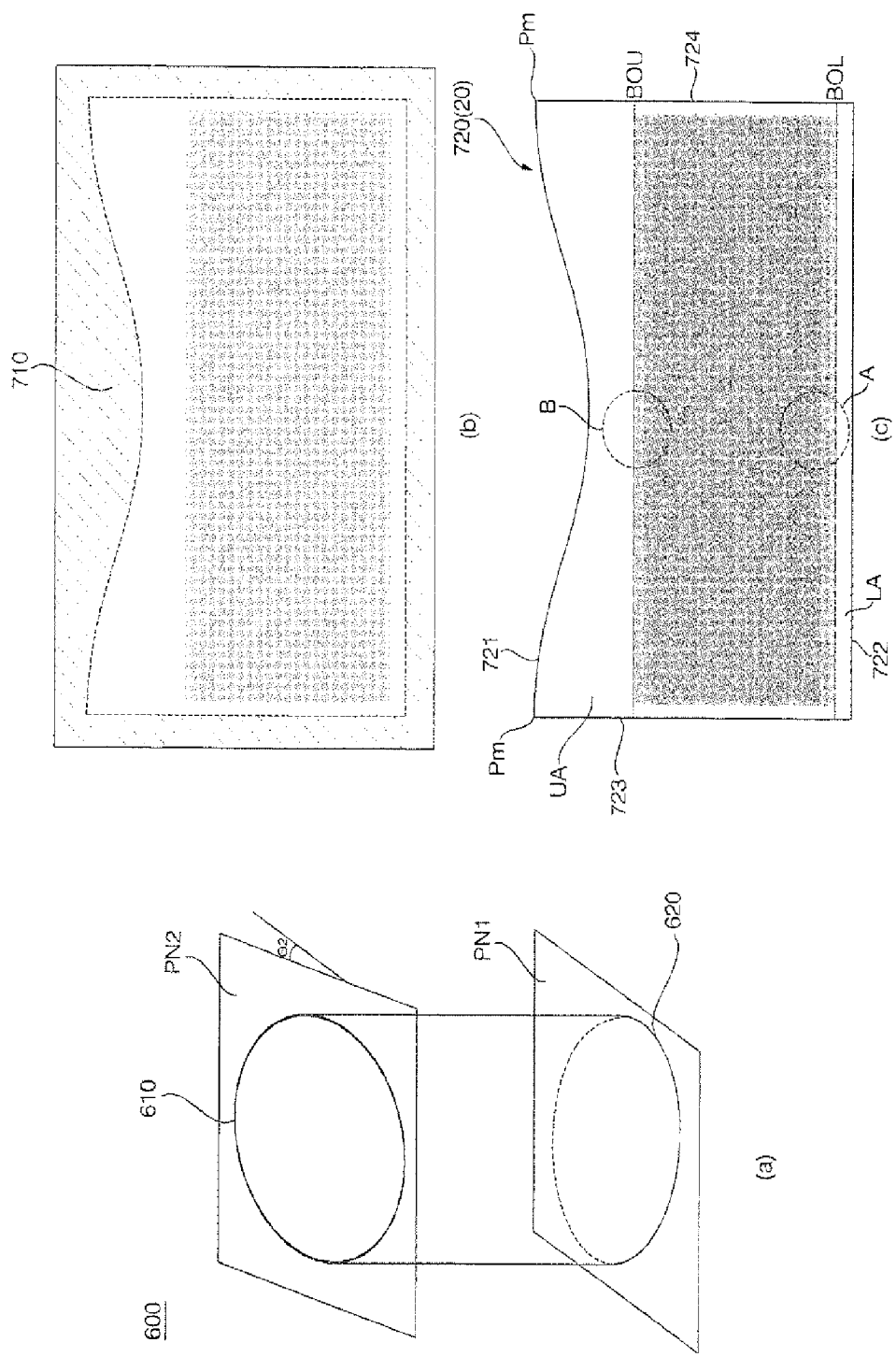
FIG. 36 illustrates a main mold in a perspective view (a), a metal flat plate used for processing the grille in (b), and the grille formed by etching the metal flat plate in (c).
Figure 37:
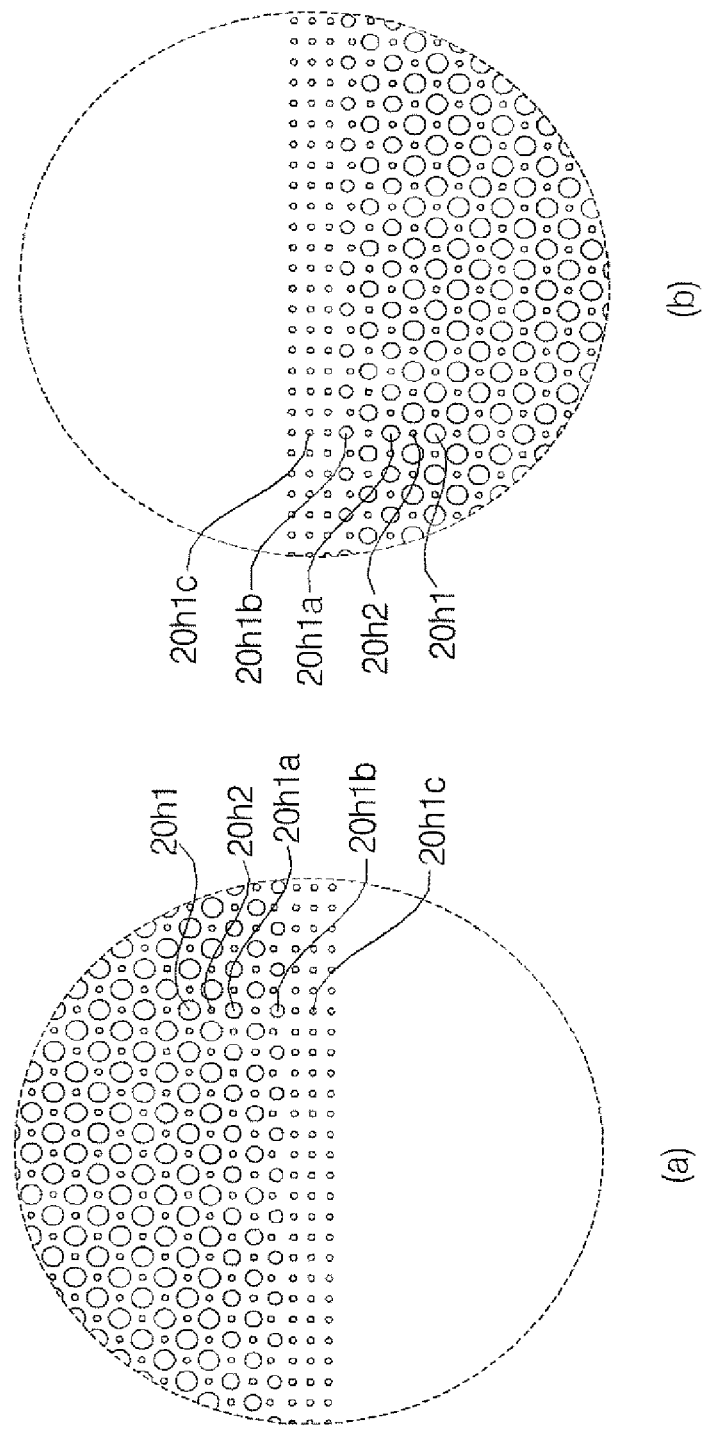
FIG. 37 illustrates an enlarged view of portion "A" illustrated in (c) of FIG. 36 in (a) and an enlarged view (b) of portion "B".
Figure 38:
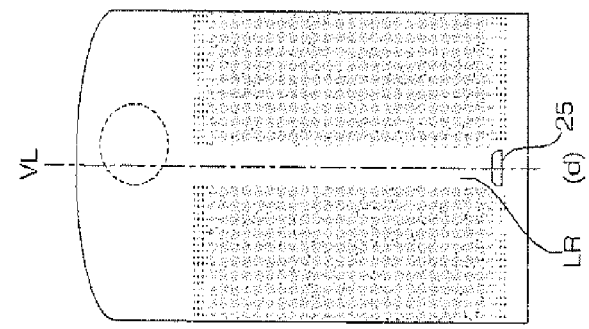
FIG. 38 illustrates a perspective view (a), a plan view (b), a front view (c), and a rear view (d) of the grille.
Figure 38:
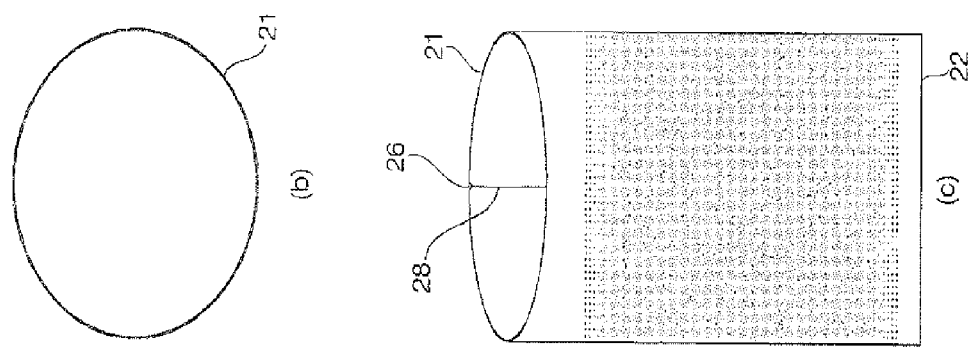
Figure 38:
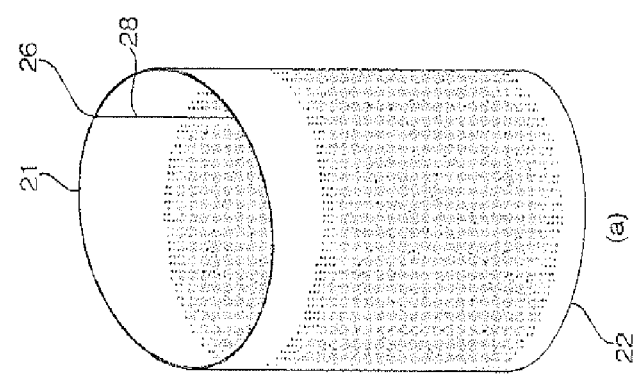
Figure 39:
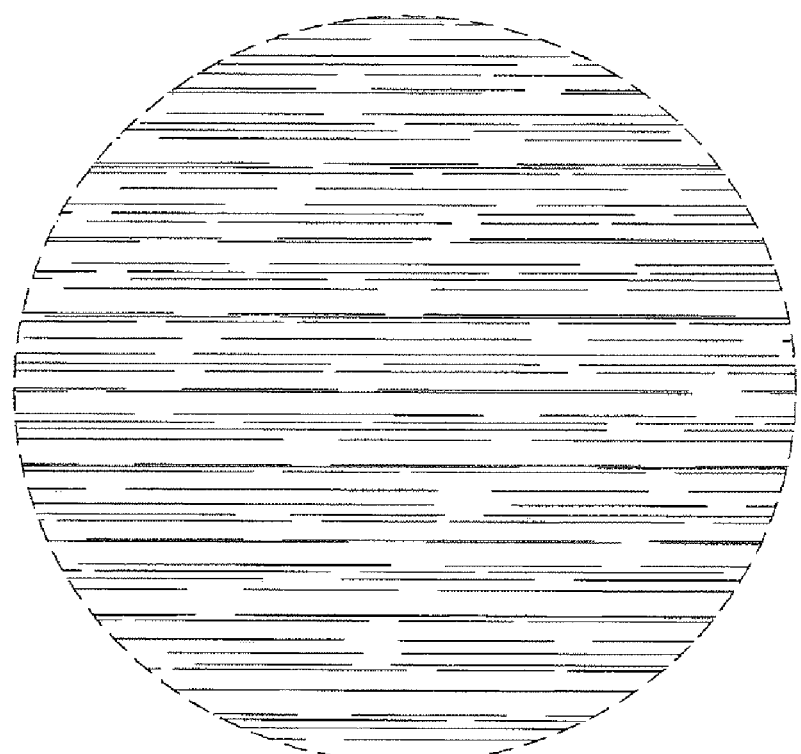
FIG. 39 is an enlarged view of a portion indicated by a dotted line in FIG. 38.

FIG. 35 is a flowchart illustrating a method of manufacturing a hub according to an embodiment of the present invention. FIG. 36 illustrates a main mold in a perspective view (a), a metal flat plate used for processing the grille in (b), and the grille formed by etching the metal flat plate in (c). FIG. 37 illustrates an enlarged view of portion "A" illustrated in (c) of FIG. 36 in (a) and an enlarged view (b) of portion "B". FIG. 38 illustrates a perspective view (a), a plan view (b), a front view (c), and a rear view (d) of the grille. FIG. 39 is an enlarged view of a portion indicated by a dotted line in FIG. 38.

Referring to FIGS. 35 to 38, as described above, the hub 1 may include the cylindrical metal grille 20 having the multiple through-holes 20h (see FIG. 3) formed therein, the hub body 40 disposed inside the grille 20 and including one or more speakers 43 and 44 (see FIG. 2), the cover 10 coupled to the upper portion of the hub body 40 to display the interface screen through the upper surface thereof, and the hub base 30 (see FIG. 3) configured to support the hub body 40 from below.

Hereinafter, a cylinder, which includes an upper end 610 formed by a circular opening on a plane PN2 tilted at a predetermined angle θ2 (see FIG. 6A) relative to a horizontal plane PN1 and an elliptical lower end 620 having a shape obtained by orthogonally projecting the upper end 610 onto the horizontal plane PN1, is defined as a "main mold". The main mold 600 has a shape corresponding to the grille 20 illustrated in FIG. 6A, and specifically has the cross-section illustrated in FIG. 6B.

A method of manufacturing the hub 1 is as follows.

First, a flat metal plate 710 is prepared (steel). The material may be stainless steel (SUS). In the embodiment, the flat metal plate 710 has a rectangular shape, but the shape thereof is not limited thereto.

Thereafter, the flat metal plate 710 has a deployed shape of a main mold 300, and is processed to have multiple through-holes 20h therein (step 2). Such processing may be performed by etching. That is, a flat metal plate 720 processed to have a shape illustrated in (c) of FIG. 36 may be obtained by corroding the area, indicated by creases in (b) of FIG. 36, in which the through-holes 20h are formed.

Referring to FIG. 37, the through-holes 20h formed in the grille 20 may include first through-holes 20h1 and second through-holes 20h2 having a smaller diameter than that of the first through-holes 20h1. Patterns composed of the first through-holes 20h1 and the second through-holes 20h2 may be repeatedly arranged in all directions. That is, four-directional continuous patterns may be formed by the through-holes 20h1 and 20h2.

More specifically, defining the through-holes 20h1 and 20h1 that are consecutive in the vertical direction as columns and the through-holes 20h1 and 20h1 that are consecutive in the horizontal direction as rows, the respective columns and rows have a configuration in which the first through-holes 20h1 and the second through-holes 20h2 having a diameter smaller than that of the first through-hole 20h1 are repeatedly arranged.

The four-directional continuous pattern has the effect of further increasing the area in which sound is output from the speakers 43 and 44 by forming the second through-holes 20h2 having a small diameter between the first through-holes 20h1 having a relatively large diameter. This also has the effect of allowing the deformation of the grille 20 (i.e., rolling into a cylindrical shape) to be smoothly performed and improving structural stability by increasing the number of links that interconnect the through-holes 20h1 and 20h2.

Referring to (b) in FIG. 36, a lower end peripheral portion LA, in which the through-holes 20h1 and 20h2 are not formed, may be formed in a region from a lower end 722 of the grille 20 to a first boundary BOL (imaginary line) parallel to the lower end 722. The lower end holding portion 313 of the hub base 30 may be brought into close contact with the inner surface of the lower end peripheral portion LA. Since the lower end peripheral portion LA is deformed while being fitted to the lower end holding portion 313, the through-holes 20h1 and 20h2 are not formed in the lower end peripheral portion in order to secure sufficient rigidity thereof.

An upper end peripheral portion UA, in which the through-holes 20h1 and 20h2 are not formed, may be formed in a region from an upper end 721 of the grille 20 to a second boundary BOU. Here, the second boundary BOU is an imaginary line located above the first boundary BOL, and is parallel to the first boundary BOL. Since the upper end peripheral portion UA is deformed while being fitted to the upper end holding portion 153, the through-holes 20h1 and 20h2 are not formed in the upper end peripheral portion to secure sufficient rigidity.

Referring to (a) in FIG. 37, in any one column in which the first through-holes 20h1 and the through-holes 20h2 are repeated, two or more first through-holes 20h1a, 20h1b and 20h1c are gradually reduced in diameter with decreasing distance to the first boundary BOL, and the first through-hole 20h1c that is closest to the first boundary BOL has the minimum diameter. That is, the through-holes are formed in the grille 20 in a pattern in which the first through-holes 20h1 and the second through-holes 20h2 are repeated. The first through-holes 20h1 are gradually reduced in diameter in a portion adjacent to the first boundary BOL, and as illustrated, the diameter is reduced in the order of the through-holes 20h1a (having a smaller diameter than that denoted by 20h1), the through-holes 20h1b, and the through-holes 20h1c.

Referring to (b) in FIG. 37, in any one column in which the first through-holes 20h1 and the through-holes 20h2 are repeated, two or more first through-holes 20h1a, 20h1b and 20h1c are gradually reduced in diameter with decreasing a distance to the second boundary BOL, and the first through-hole 20h1c that is closest to the second boundary BOL has the minimum diameter. That is, the through-holes are formed in the grille 20 in a pattern in which the first through-holes 20*h*1 and the second through-holes 20*h*2 are repeated. The first through-holes 20*h*1 are gradually reduced in diameter in a portion adjacent to the second boundary BOL, and as illustrated, the diameter is reduced in the order of the through-holes 20*h*1*a* (having a smaller diameter than that denoted by 20*h*1), the through-holes 20*h*1*b*, and the through-holes 20*h*1*c*.

The contour of the flat metal plate 720 is processed such that both sides 723 and 724 are straight lines that extend vertically at the center of the rear surface of the grille 20. That is, when the processed flat metal plate 720 is rolled to have a cylindrical shape, the two sides 723 and 724 meet each other at a vertical line VL that extends downwards perpendicular to the uppermost point Pm.

The two sides 723 and 724 of the processed flat metal plate 720 are bonded to each other to configure the cylindrical grille 20 in which the side 721 corresponding to the upper end 610 of the main mold 600 forms the upper end 21, and the side 722 corresponding to the lower end 620 of the main mold 600 forms the lower end 22 (step 3). At this time, since the configured cylindrical grille 20 is obtained via deformation by rolling the flat metal plate 720, the shape of the grille 20 is determined by the plasticity and elasticity/restoration force of the material of the flat metal plate, and therefore, the upper end 21 and the lower end 22 of the grille 20 have irregular shapes. However, when the thickness of the flat metal plate 720 is constant, the grille 20 is almost uniformly deformed in the entire area thereof, and therefore, has a substantially circular cross section, as illustrated in (b) of FIG. 37.

The grille 20 has a horizontally symmetrical shape about a predetermined vertical line VL when viewed from the rear, and in a portion LR of the grille, which extends from the lower end 22 to the upper end 21 along the vertical line VL and has a constant width, is not formed with the through-holes 20*h*.

The rear area LR of the grille 20, in which the through-holes 20*h* are not formed, is formed by the left and right portions of the flat metal plate 720 in which the through-holes 20*h* are not formed in (c) of FIG. 36.

In step 3, bonding between the two sides 723 and 724 of the flat metal plate 720 may be accomplished by welding. This welding may be performed using a welding rod. In this case, a band-shaped welding bead is formed by melting a base material (flat metal plate) and the welding rod.

However, the present invention is not limited to this, and it is possible to perform resistance welding (e.g., spot or projection welding) or laser welding. In the case of resistance welding, the welding bead is limited to a specific portion, as compared with welding using a welding rod. In the case of laser welding, highly precise bonding between members is possible since input welding heat is significantly small, the range of influence of heat is narrow, and welding beads usually do not remain.

The grille 20, formed through the above steps, may be provided with a hole 25 for installing a USB port 62 (see FIG. 25) and/or a positioning groove 26, into which the positioning protrusion 156 (see FIG. 21) formed on the sidewall 151 of the cover housing 150 is inserted. The hole 25 for the installation of the USB port and the positioning groove 26 may be formed in the area LR (see (d) in FIG. 38) in which the through-holes 20*h* are not formed in the rear surface of the grille 20. The hole 25 and the groove 26 may be formed through any of various known processing methods, such as pressing, punching, or drilling.

The hole 25 may be processed in a welded portion of the sides 723 and 724 of the flat metal plate 720 (step 4). The USB port 62 may be disposed on the main PCB 48 (see FIG. 28).

The groove 26 may be recessed from the upper end 21 of the grille 20, and may be formed in the welded portion.

Thereafter, the welded portion of the sides 723 and 724 of the metal plate 720 on the outer surface of the grille 20 is polished (step 5). The welded portion may be polished by an abrasive paper having a predetermined particle size, which is wound around the outer peripheral surface of a rotating roller, so that a smooth surface, from which the welding bead is removed, may be obtained.

However, since the inner surface of the grille 20 is not polished, a welding bead 28 still remains.

After removing the welding bead, the entire area of the outer surface of the grille 20 may be polished to form a hair line (see FIG. 39) (step 6). The hair line is formed by cutting a metal surface with an abrasive paper having a predetermined particle size, and may extend in the horizontal direction. The luster and texture unique to the metal is accentuated on the outer surface of the grille 20 by the hairline.

The grille on which the hairline has been formed may be coated (step 7). The coating of the grille 20 may be performed by electro-deposition. In the case of the electro-deposition, a coating film can be formed on the entire surface of the grille 20 by putting the grille 20 into a tank, containing a water-soluble resin paint, and applying electric current to the grille 20.

A step of laser engraving a mark in the outer surface of the coated grille 20 (step 8) may be further performed. The mark may include symbols, characters, graphics, and the like.

A filter may be attached to the inner surface of the grille 20 formed through the above steps (step 9). The filter may be formed of a material having fine pores such as a mesh or a nonwoven fabric, and may be attached by an adhesive member such as a piece of double-sided tape.

On the other hand, referring to FIGS. 5 and 32, as described above, the cover 1 may be formed with the upper end holding portion 153 having a shape that corresponds to the upper end 610 of the main mold 600 and the lower end holding portion 313 having a shape that corresponds to the lower end 620 of the main mold 600.

A step of fitting the grille 20 between the upper end holding portion 153 and the lower end holding portion 313 may be further performed. The upper end holding portion 153 is inserted into an opening formed in the upper surface of the grille 20 (i.e., the area surrounded by the upper end of the grille 20) after the hub body 40 is inserted into the grille 20 in the state in which the cover 10 and the hub body 40 are coupled to each other, as described above with reference to FIG. 5, the inner surface of the upper portion of the grille 20 is brought into close contact with the outer surface of the upper end holding portion 153 so that the upper end of the grille 20 is deformed so as to correspond to the shape of the upper end holding portion 153, thereby forming substantially the same shape as the upper end 610 of the main mold 600.

Likewise, when the lower end holding portion 313 is inserted into an opening formed in the lower surface of the grille 20 (i.e., the area surrounded by the lower end of the grille 20), as described above with reference to FIG. 32, the inner surface of the lower portion of the grille 20 is brought into close contact with the outer surface of the lower end holding portion 313 so that the lower end of the grille 20 is deformed so as to correspond to the shape of the lower end holding portion 153, thereby forming substantially the same as the lower end 620 of the main mold 600.

The invention claimed is:

1. A hub comprising:
   a hub body comprising a speaker configured to output sound;
   communication circuitry disposed in the hub body and configured to perform wireless communication with a peripheral device;
   a hub base configured to support the hub body from below;
   a cover coupled to an upper portion of the hub body and configured to display an interface screen, configured based on information exchanged through the communication circuitry through an upper surface thereof; and
   a grille having a vertically elongated cylindrical shape and formed with a plurality of through-holes, the hub body being disposed inside the grille, the grille comprising an upper end coupled to the cover and a lower end coupled to the hub base, the grille being formed of a metal material,
   wherein the cover comprises a cover housing coupled to the hub body and formed with an opening in an upper surface thereof,
   wherein the cover housing comprises a cylindrical sidewall extending in a vertical direction and disposed at an upper side of the grille, and
   wherein the communication circuitry includes at least one antenna, and the at least one antenna is disposed on a rear portion of an inner surface of the cylindrical sidewall.

2. The hub according to claim 1, wherein the cover further comprises:
   a display disposed in the cover housing to output the interface screen; and
   a window disposed in the opening in the cover housing and configured to project the interface screen at an upper side of the display.

3. The hub according to claim 2, wherein the cover housing comprises:
   an upper end holding portion extending from the sidewall and inserted into the grille from the upper side of the grille, the upper end holding portion coming into contact with an inner surface of the grille to hold a shape of the upper end of the grille.

4. The hub according to claim 3, wherein the cover further comprises:
   a display printed circuit board (PCB) disposed in the cover housing, the display being provided on an upper surface of the display PCB; and
   a window base disposed at a lower side of the window to support the window,
   wherein the window base comprises:
      a window support plate disposed at the upper side of the display to support the window and formed with an opening, through which a screen of the display is exposed; and
      a support boss protruding downwards from the window support plate and coupled to the cover housing.

5. The hub according to claim 4, wherein the cover housing further comprises a partition plate extending from an inner peripheral surface of the sidewall to divide an inside of the sidewall into upper and lower regions, the display PCB being provided on an upper surface of the partition plate, and
   wherein the partition plate is formed with an insertion boss into which the support boss is inserted.

6. The hub according to claim 5, wherein the window support plate and the partition plate are disposed parallel to the window.

7. The hub according to claim 4, wherein the opening in the window support plate has a longer length in a transverse direction than a length in a longitudinal direction, and
   wherein the support boss is formed in an area of the window support plate located behind the opening and in an area of the window support plate located in front of the opening.

8. The hub according to claim 7, wherein the display PCB is formed with a through-hole, through which the support boss passes, at a position corresponding to at least one of a plurality of support bosses.

9. The hub according to claim 4, wherein, on the upper surface of the display PCB, four tact switches are disposed in respective four-directional areas about the display, and
   wherein the window base is formed with operation protrusions, which protrude downwards from the window support plate at positions corresponding to the four tact switches, respectively, to operate the tact switches by a pressure applied through the window.

10. The hub according to claim 4, further comprising:
    a volume switch disposed on the display PCB to increase or decrease a volume of the speaker; and
    a volume button fixed in an opening formed in the sidewall of the cover housing and operated by an external force to operate the volume switch.

11. The hub according to claim 3, wherein the cover housing comprises a plurality of fastening bosses protruding from the upper end holding portion and coupled to the hub body.

12. The hub according to claim 11, wherein the hub body comprises a speaker case in which the speaker is accommodated, and
    wherein the speaker case is formed with boss insertion grooves into which the fastening bosses are respectively inserted.

13. The hub according to claim 12, wherein the speaker case comprises:
    a front case formed with a sound output hole through which a vibrating plate of the speaker is exposed; and
    a rear case coupled to the front case to define a space, in which the speaker is accommodated, between the front case and the rear case,
    wherein at least one of the fastening bosses protrudes rearwards from a front portion of the upper end holding portion, and at least a remaining one of the fastening bosses protrudes forwards from a rear portion of the upper end holding portion, and
    wherein at least one of the boss insertion grooves is recessed rearwards from a front surface of the front case, and an opening is formed in an upper surface of the front case so that the fastening boss, which protrudes rearwards from the front portion of the upper end holding portion, is inserted into the boss insertion groove from above, and at least a remaining one of the boss insertion grooves is recessed forwards from a rear surface of the rear case, and an opening is formed in an upper surface of the rear case so that the fastening boss, which protrudes forwards from a rear portion of the upper end holding portion, is inserted into the boss insertion groove from above.

14. The hub according to claim 12, wherein the plurality of fastening bosses protrudes downwards from a lower surface of the speaker case, and wherein the hub base comprises a plurality of insertion bosses into which the fastening bosses are inserted, respectively.

15. The hub according to claim 3, wherein the cover comprises a display printed circuit board (PCB) disposed in the cover housing, the display being provided on an upper surface of the display PCB, wherein the hub body comprises a speaker case in which the speaker is accommodated, and wherein the hub further comprises a main PCB disposed between a lower surface of the speaker case and the base body and having a circuit connection with the display PCB.

16. The hub according to claim 2, wherein the window is disposed to tilt upwards from a front side to a rear side, and is disposed such that a vector, obtained by orthogonally projecting a normal vector to an upper surface on a predetermined horizontal plane, faces forwards, and wherein a shape obtained by orthogonally projecting the grille on the horizontal plane corresponds to a shape obtained by orthogonally projecting the window on the horizontal plane.

17. The hub according to claim 16, wherein the window has a circular shape.

18. The hub according to claim 1, wherein the hub base comprises:

a base body comprising an open upper surface and defining a predetermined space therein; and a support rubber fixed to a lower surface of the base body.

19. The hub according to claim 18, wherein the base body comprises:

a bottom portion formed with a rubber insertion groove into which the support rubber is inserted;

a base outer wall portion extending upwards from a periphery of the bottom portion and disposed at a lower side of the grille; and a lower end holding portion extending from the base outer wall portion and inserted into the grille from the lower side of the grille, the lower end holding portion coming into contact with an inner surface of the grille to maintain a shape of the lower end of the grille.

20. The hub according to claim 1, wherein the communication circuitry comprises a Wi-Fi circuitry and a Bluetooth circuitry, and wherein the Bluetooth circuitry and the Wi-Fi circuitry are detachably attached to the hub body together.

21. The hub according to claim 1, wherein the communication circuitry comprises a ZigBee communication circuitry disposed on a side surface of the hub body.

* * * * *